US010440936B2

(12) United States Patent
Yajima et al.

(10) Patent No.: US 10,440,936 B2
(45) Date of Patent: Oct. 15, 2019

(54) LIVESTOCK REGISTRATION SYSTEM AND REGISTRATION METHOD FOR LIVESTOCK

(71) Applicant: SONY CORPORATION, Tokyo (JP)

(72) Inventors: Masakazu Yajima, Kanagawa (JP); Yoshihisa Tsuchida, Kanagawa (JP); Chisako Kajihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/750,765

(22) PCT Filed: Jul. 21, 2016

(86) PCT No.: PCT/JP2016/003415
§ 371 (c)(1),
(2) Date: Feb. 6, 2018

(87) PCT Pub. No.: WO2017/033394
PCT Pub. Date: Mar. 2, 2017

(65) Prior Publication Data
US 2018/0228129 A1   Aug. 16, 2018

(30) Foreign Application Priority Data

Aug. 25, 2015   (JP) ................................ 2015-165496

(51) Int. Cl.
*A01K 11/00* (2006.01)
*G06F 16/58* (2019.01)
(Continued)

(52) U.S. Cl.
CPC ............ *A01K 11/006* (2013.01); *A01K 11/00* (2013.01); *G06F 16/58* (2019.01);
(Continued)

(58) Field of Classification Search
CPC ....... A01K 11/006; A01K 11/00; G06F 16/58; G06F 17/30265; G06K 9/00362; G06T 7/00
See application file for complete search history.

(56) References Cited

U.S. PATENT DOCUMENTS 6,081,607 A    6/2000  Mori et al.
6,892,671 B1   5/2005  Miyawaki
(Continued)

FOREIGN PATENT DOCUMENTS

AU    756051 B2    1/2003
DE    69724713 T2  7/2004
(Continued)

OTHER PUBLICATIONS

"Cattle individual identification information search service." Accessed Dec. 9, 2015. https://www.id.nlbc.go.jp/top.html.
(Continued)

*Primary Examiner* — Gevell V Selby
(74) *Attorney, Agent, or Firm* — Chip Law Group

(57) ABSTRACT

A livestock registration system according to an embodiment of the present technology includes an image data acquisition unit, a signal acquisition unit, and a registration unit. The image data acquisition unit acquires image data obtained by capturing an image of a target livestock animal. The signal acquisition unit acquires an individual identification signal transmitted from a transmission apparatus attached to the target livestock animal, the individual identification signal including an identifier for identifying the target livestock animal. The registration unit registers the identifier of the individual identification signal and the image data in association with each other, the identifier of the individual
(Continued)

identification signal being received at a reception timing corresponding to a timing at which the image of the target livestock animal is captured.

16 Claims, 37 Drawing Sheets

(51) Int. Cl.
 *G06T 7/00* (2017.01)
 *G06K 9/00* (2006.01)
(52) U.S. Cl.
 CPC ..... *G06K 9/00362* (2013.01); *G06K 9/00979* (2013.01); *G06K 9/00993* (2013.01); *G06T 7/00* (2013.01)

(56) References Cited

U.S. PATENT DOCUMENTS

| | | | | |
|---|---|---|---|---|
| 9,226,481 | B1* | 1/2016 | Paripati | G06T 7/0004 |
| 2004/0119831 | A1 | 6/2004 | Miyawaki | |
| 2004/0199831 | A1* | 10/2004 | Shibata | G05B 23/0272 |
| | | | | 714/47.1 |
| 2012/0274442 | A1 | 11/2012 | Mottram | |
| 2014/0015945 | A1* | 1/2014 | Bench | A01K 29/005 |
| | | | | 348/61 |
| 2015/0302241 | A1* | 10/2015 | Eineren | A01J 5/007 |
| | | | | 382/110 |
| 2016/0125276 | A1 | 5/2016 | Spicola, Sr. et al. | |

FOREIGN PATENT DOCUMENTS

| | | | | |
|---|---|---|---|---|
| EP | 0821912 | A2 | 2/1998 | |
| EP | 1212939 | A1 | 6/2002 | |
| EP | 2488012 | A1 | 8/2012 | |
| EP | 2496075 | A1 | 9/2012 | |
| IL | 138065 | A | 8/2004 | |
| JP | 10-040375 | A | 2/1998 | |
| JP | 10-40375 | A | 2/1998 | |
| JP | 2001-161199 | A | 6/2001 | |
| JP | 2003-132115 | A | 5/2003 | |
| JP | 2010-004861 | A | 1/2010 | |
| JP | 2010004861 | * | 1/2010 | ............ A01K 11/00 |
| JP | 2012-060972 | A | 3/2012 | |
| NL | 1016836 | C2 | 6/2002 | |
| NL | 2003641 | C2 | 4/2011 | |
| ZA | 200004331 | B | 3/2001 | |

OTHER PUBLICATIONS

International Search Report and Written Opinion of PCT Application No. PCT/JP2016/003415, dated Oct. 18, 2016, 09 pages.
Extended European Search Report of EP Patent Application No. 16838746.2, dated Mar. 20, 2019, 09 pages.

* cited by examiner

─ Identifier of individual identification signal ─

| Photographing date and time | Image data | BCS |
|---|---|---|
| YYYYMMDDTT | image | 2.5 |
| YYYYMMDDTT | image | 2.9 |
| | | |

─ Identifier of individual identification signal ─

| Photographing date and time | Image data | BCS |
|---|---|---|
| YYYYMMDDTT | image | 2.3 |
| YYYYMMDDTT | image | 3.5 |
| | | |

●
●
●

─ Identifier of individual identification signal ─

| Photographing date and time | Image data | BCS |
|---|---|---|
| YYYYMMDDTT | image | 2.3 |
| YYYYMMDDTT | image | 3.5 |
| | | |

Diagram showing example of data structure of information stored by registration information storage unit 109

FIG.33

FIG. 36(A)
FIG. 36(B)
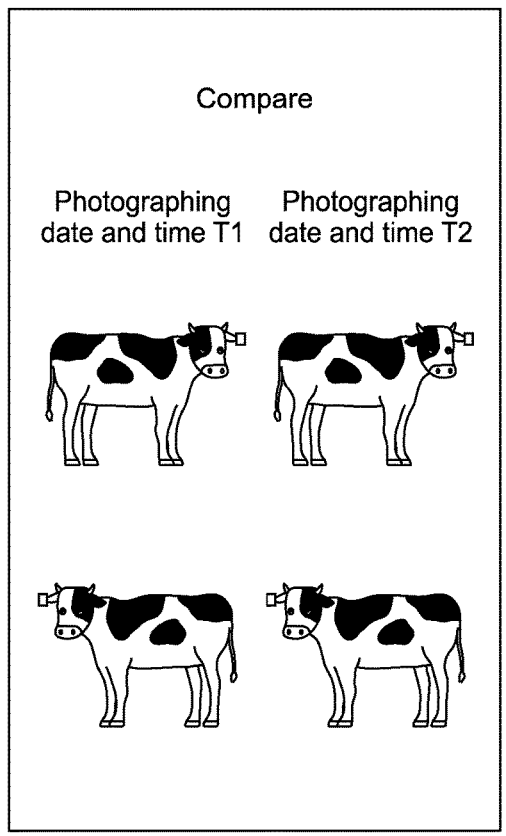
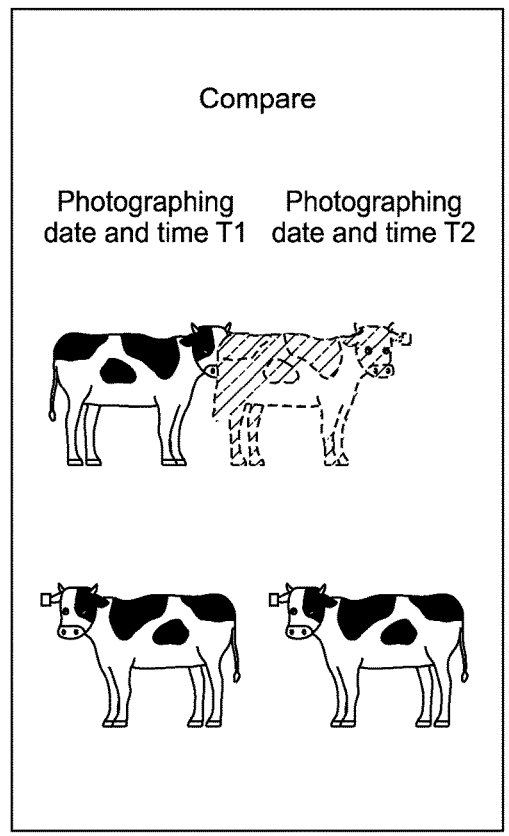

LIVESTOCK REGISTRATION SYSTEM AND REGISTRATION METHOD FOR LIVESTOCK

CROSS REFERENCE TO RELATED APPLICATIONS

This application is a U.S. National Phase of International Patent Application No. PCT/JP2016/003415 filed on Jul. 21, 2016, which claims priority benefit of Japanese Patent Application No. JP 2015-165496 filed in the Japan Patent Office on Aug. 25, 2015. Each of the above-referenced applications is hereby incorporated herein by reference in its entirety.

TECHNICAL FIELD

The present technology relates to a livestock registration system and a registration method for livestock that can be applied to management of livestock.

BACKGROUND ART

Livestock such as cattle can be managed with individually-set individual identification numbers. For example, the cattle is managed with ear-tags attached to the ears, in which the individual identification numbers are described (see Non-Patent Literature 1). Further, in recent years, due to downsizing of communication modules, there is also known an ear-tag with which individual identification can be wirelessly performed with respect to a transmitter attached to the body of a livestock animal (e.g., see Patent Literature 1).

On the other hand, in management only with the ear-tags, individual identification sometimes becomes difficult if the ear-tags are detached.

CITATION LIST

Patent Literature

Patent Literature 1: Japanese Patent Application Laid-open No. 2012-60972

Non-Patent Literature

Non-Patent Literature 1: "Search service of Individual Identification Information of Cattle", [online], National Livestock Breeding Center (Incorporated Administrative Agency), [searched on Aug. 10, 2015], Internet <URL: https://www.id.nlbc.go.jp/top.html>

Technical Problem

However, in management with the ear-tags, individual identification sometimes becomes difficult if the ear-tags are detached. Therefore, it is desirable to provide a technology for easily performing individual identification of many livestock by using means other than the ear-tags.

In view of the above-mentioned circumstances, it is an object of the present technology to provide a livestock registration system and a registration method for livestock, which facilitate individual identification and management of livestock.

Solution to Problem

In order to accomplish the above-mentioned object, a livestock registration system according to an embodiment of the present technology includes an image data acquisition unit, a signal acquisition unit, and a registration unit.

The image data acquisition unit acquires image data obtained by capturing an image of a target livestock animal.

The signal acquisition unit acquires an individual identification signal transmitted from a transmission apparatus attached to the target livestock animal, the individual identification signal including an identifier for identifying the target livestock animal. The registration unit registers the identifier of the individual identification signal and the image data in association with each other, the identifier of the individual identification signal being received at a reception timing corresponding to a timing at which the image of the target livestock animal is captured.

A registration method for livestock according to another embodiment of the present technology includes a step of acquiring image data obtained by capturing an image of a target livestock animal.

An individual identification signal transmitted from a transmission apparatus attached to the target livestock animal is acquired, the individual identification signal including an identifier for identifying the target livestock animal.

The identifier of the individual identification signal received at a reception timing corresponding to a timing at which the image of the target livestock animal is captured and the image data are registered in association with each other.

Advantageous Effects of Invention

As described above, in accordance with the present technology, it is possible to facilitate individual identification and management of livestock.

It should be noted that effects described here are not necessarily limitative and any effect described in the present disclosure may be provided.

BRIEF DESCRIPTION OF DRAWINGS

FIG. 33 A conceptual diagram showing an example of a data structure of information stored by a registration information storage unit in a sixth embodiment of the present technology.

FIGS. 36(A) and 36(B) Diagrams (Part 3) showing an example of GUI in the sixth embodiment of the present technology.

MODE(S) FOR CARRYING OUT THE INVENTION

Hereinafter, embodiments according to the present technology will be described with reference to the drawings.

First Embodiment (Outline of Livestock Registration System)

Figure 1:
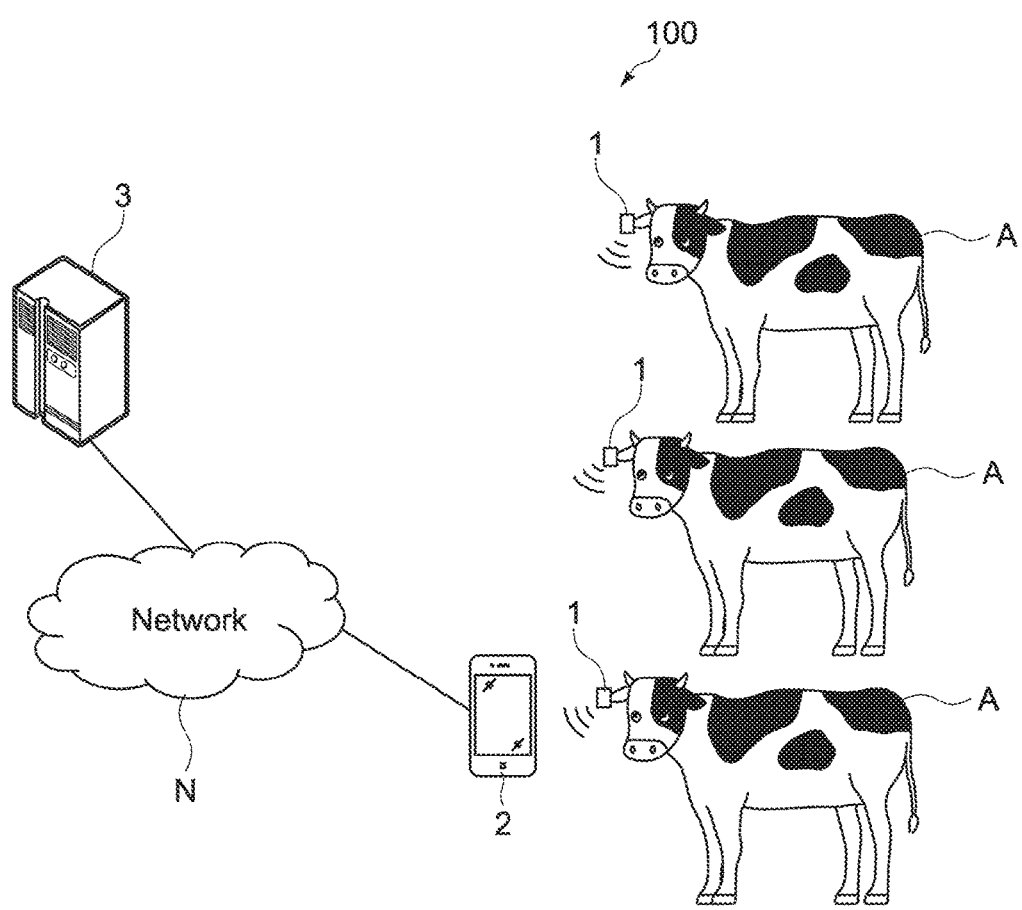
FIG. 1 A schematic diagram showing a schematic configuration of a livestock registration system of a first embodiment of the present technology.

FIG. 1 is a schematic diagram showing a schematic configuration of a livestock registration system of a first embodiment of the present technology.

As shown in the figure, a livestock registration system 100 includes a plurality of transmission apparatuses 1, a terminal apparatus 2, and a server apparatus 3.

The livestock registration system 100 is, for example, a system that can be utilized by a dairy farmer/stock-raising farmer or an employee of dairy facilities/stock-raising facilities. The livestock registration system 100 executes processing of automatically associating an identifier for identifying each livestock animal A with image data and registering them.

Examples of the livestock animals can include beef cattle, cows, pigs, horses, sheep, goats, chickens, ostriches, and poultry that are industrial animals and dogs, cats, and rabbits that are companion animals. Hereinafter, cows will be taken as an example.

The plurality of transmission apparatuses 1 are respectively attachable to a plurality of livestock animals A. The plurality of transmission apparatuses 1 transmit individual identification signals including an identifier for identifying a target livestock animal. The transmission apparatus 1 can be configured as a tag attachable to the livestock animal A.

The identifier set forth herein is an identifier for identifying a livestock animal, and may be an identifier specific to the transmission apparatus 1 in this embodiment. Alternatively, in another embodiment, the identifier may be any one or more of check-in information (information in which information indicating that a livestock animal enters/exits a barn or the like is associated with time information), position information, information regarding an activity amount, and information regarding a body temperature.

Further, the individual identification signal set forth herein is a signal including the identifier and transmitted from the transmission apparatus 1.

For example, the transmission apparatus 1 is attached to an ear of each livestock animal A. The attachment position is not limited to the ear, and it can also be attached to a site other than the ear, such as the neck, the back, a leg, the tail, and an internal site of the body. It is favorable to attach the transmission apparatus 1 to the ear or the internal site of the body rather than the neck or leg if it is desirable to lower the possibility that transmission apparatus 1 may be detached due to behavior of the livestock animal A to rub itself against a fence or the like or its collision with another livestock animal.

Further, in addition to the transmission apparatus 1, the livestock animal A may wear an accessory in which information for identifying an individual, such as an individual identification number, is described, the accessory not including the function of communication or the like. Hereinafter, such an accessory attached to the ear will be referred to as an "ear-tag". The ear-tag includes a resin plate on which an individual identification number and a bar code thereof are printed as an example.

Further, the individual identification number set forth herein refers to, for example, a number of a country, a livestock management association, and the like, which is given by an employee and universally used. Hereinafter, the individual identification number will be referred to as a "universal identification number" in order to differentiate it from the identifier and the like.

The identifier may be a number identical to the universal identification number or may be a number, a symbol, or the like different from it.

Note that, regarding the transmission apparatus 1, the universal identification number is described on a surface of a casing to be described later and it may also have the function of the ear-tag.

The terminal apparatus 2 is an information processing apparatus that is operated by a user who performs registration processing of the livestock animals A. The terminal apparatus 2 is configured to be capable of communicating with the transmission apparatus 1 and the server apparatus 3 in a network N. The terminal apparatus 2 includes, for example, a smartphone, a tablet terminal, a digital camera, a wearable device, a PC (Personal Computer), and the like. The wearable device may be, for example, a see-through display, a non-see-through display, or a head-mounted display apparatus of, for example, an eye-glasses-type including a retinal projection type display. The network N can be, for example, the Internet, a local area network, or the like. In the storage unit 22 of the terminal apparatus 2, livestock registration application software (hereinafter, abbreviated as livestock registration app) is installed. The terminal apparatus 2 executes livestock registration processing in accordance with this livestock registration app.

The server apparatus 3 is a server apparatus in the network N. The server apparatus 3 provides a livestock registration service to the terminal apparatus 2 having the livestock registration app installed therein. The server apparatus 3 may include a single information processing apparatus or may include a plurality of information processing apparatuses.

The server apparatus 3 may be connected to a plurality of terminal apparatuses other than the terminal apparatus 2 in which the livestock registration app has been installed, via the network N.

[Hardware Configuration of Livestock Registration System]

Figure 2:
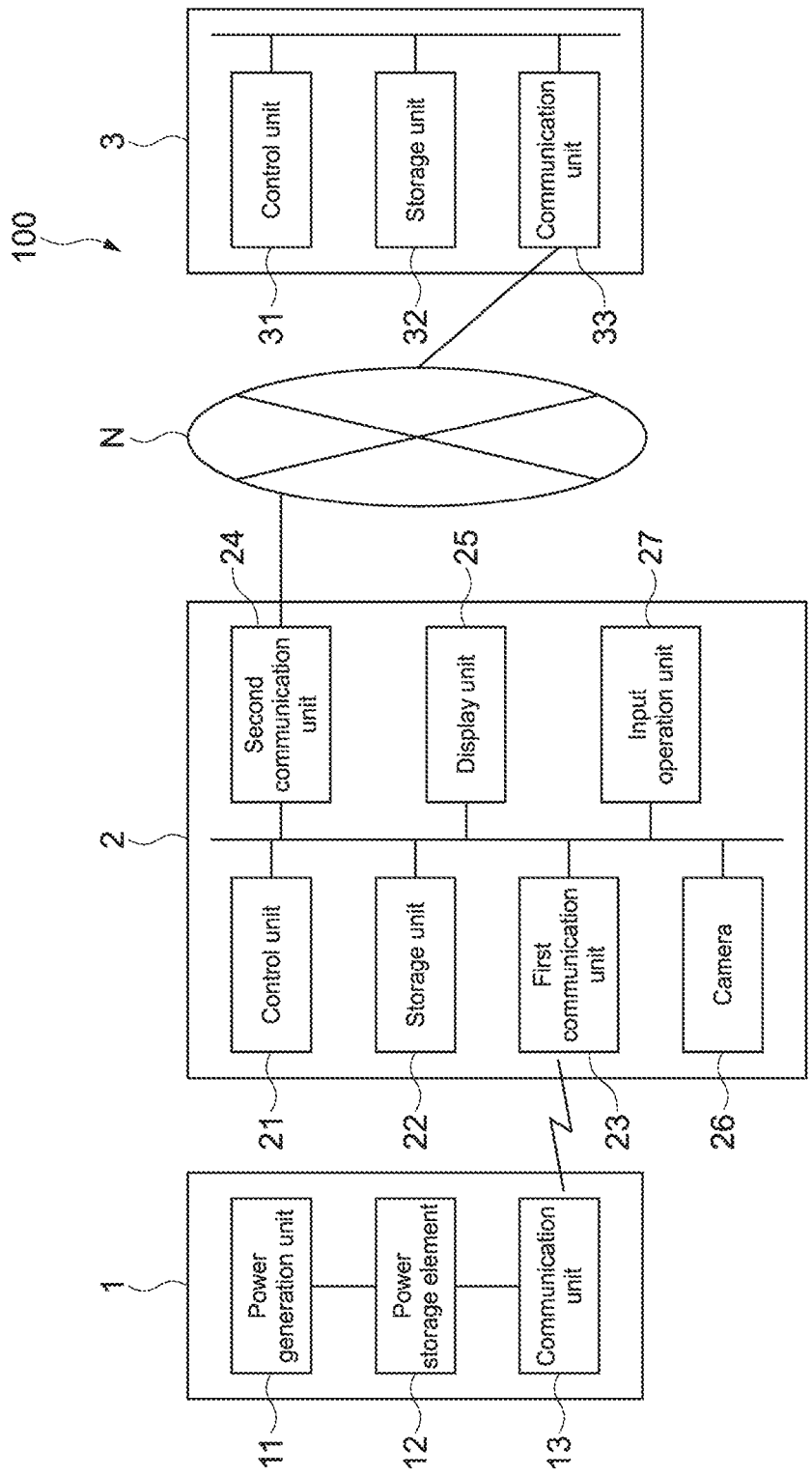
FIG. 2 A block diagram showing a hardware configuration of each of apparatuses of the livestock registration system shown in FIG. 1.

FIG. 2 is a block diagram showing a hardware configuration of each of apparatuses of the livestock registration system 100.

(Transmission Apparatus)

As shown in FIG. 2, the transmission apparatus 1 includes a power generation unit 11, a power storage element 12, and a communication unit 13. The transmission apparatus 1 further includes a casing (not shown) and a mounting mechanism (not shown). The casing houses the power generation unit 11, the power storage element 12, and the communication unit 13. The mounting mechanism is for mounting the casing on the livestock animal. The mounting mechanism may be configured integrally with the casing.

The power generation unit 11 is a power generator that generates electric power in a manner that depends on a surrounding environment. The power generation unit 11 may perform power generation perform power generation with energy based on at least any one of, for example, light, heat, vibration, radio waves including far electromagnetic field and near electromagnetic field, and particular organic matter and inorganic matter. The power generation unit 11 may perform power generation with two or more of the above-enumerated types of energy. Any power generation methods can be employed and, for example, an electrostatic type, electromagnetic type, an inverse magnetostrictive type, or a piezoelectric type can be employed.

The power generation unit 11 may perform power generation with light (e.g., indoor light bulb and solar light).

The power generation unit 11 may be a thermoelectric generator that performs power generation by utilizing a temperature difference (heat) (e.g., one that performs power generation by using the Seebeck effect and the Thomson effect, thermionic power generation element, or one that performs thermomagnetic generation). Such a power generation unit 11 performs power generation by utilizing a temperature difference between a body temperature of a livestock animal and an ambient temperature, for example.

The power generation unit 11 may be an enzymatic cell (also called bio-cell or the like) that performs power generation by utilizing glucose.

The power generation unit 11 utilizes any of LCR (inductance, capacitance, and reactance) components or a combination thereof and capacitive coupling or electromagnetic coupling with a capacitor, an antenna, a rectenna, and the like. The power generation unit 11 may perform power generation with radio waves, for example.

The power generation unit 11 may perform near electromagnetic field power generation, in other words, perform power generation with energy obtained by bringing a transmission apparatus into the proximity of a predetermined device. A well-known method such as a magnetic field resonance method, an electromagnetic induction method, electric field coupling, and an electric field resonance method can be applied to a method for near electromagnetic field power generation.

A well-known power generation element other than those exemplified above can be applied to the power generation unit 11.

The power storage element 12 is used in a manner that depends on purposes, for example, storing electric power generated by the power generation unit 11. The electric power generated by the power generation unit 11 is stored in the power storage element 12 and used as electric power for actuating the communication unit 13.

Besides various secondary batteries such as a lithium-ion secondary battery, the power storage element 12 includes an electric double layer capacitor, a lithium ion capacitor, a polyacenic semiconductor (PAS) capacitor, a Nanogate capacitor ("Nanogate" is a registered trademark of Nanogate Aktiengesellschaft),
a ceramic capacitor, a film capacitor, an aluminum electrolytic capacitor, a tantalum capacitor, and the like. Depending on purposes, a combination of these power storage elements may be used.

The communication unit 13 transmits the individual identification signal including the identifier with electric power generated by the power generation unit 11.

In this embodiment, the communication unit 13 is configured to be switchable between a stand-by state and an output state in which power generation information can be output in a manner that depends on electric power supplied from the power generation unit 11. With this, if a power generation amount of the power generation unit 11 becomes equal to or larger than a predetermined amount, it becomes possible to output the individual identification signal as the power generation information indicating the fact of power generation of a power generation amount equal to or larger than the predetermined amount.

In addition to the identifier, the individual identification signal of this embodiment may include information about an amount of electric power generated (power generation amount) in a manner that depends on a surrounding environment. The information about the power generation amount may include a transmission or reception pattern of a signal, which is based on the amount of electric power generated in a manner that depends on the surrounding environment, or may include a numerical value of the power generation amount. The individual identification signal may further include information indicating the type of power generation. The information indicating the type of power generation includes information indicating, for example, whether the source of power generation performed by the communication unit 13 is one of light, vibration (kinetic energy), a temperature difference, and radio waves or a combination thereof.

An identifier specific to the transmission apparatus 1, which is assigned in advance, is typically used as the identifier. With this, the identifier corresponds to a livestock animal wearing the transmission apparatus 1 in a one-to-one relationship, and can identify the livestock animal. Further, the identifier may be an identifier assigned every time it is necessary as long as it can identify the livestock animal.

The communication unit 13 includes, for example, an integrated circuit (IC) formed of one or more elements, a processor that controls transmission, and communication circuit and antenna for communicating with the terminal apparatus 2.

Examples of the integrated circuit used in the communication unit 13 can include a switching element such as a transistor, a diode, a reset IC, a regulator IC, a logic IC, and various arithmetic circuits. A circuit configuration inside the IC can be changed in a manner that depends on needs as long as it can realize the function of the communication unit 13. Further, although the communication unit 13 is favorably configured to be capable of retaining a state after shift and, for example, history of information about the number of times of change of the shifted state to thereby store that state, the communication unit 13 may be configured to be incapable of retaining and storing that state due to reset or the like.

Further, electric power generated by the power generation unit 11 may be appropriately supplied to the communication unit 13 after the voltage is increased or decreased.

The processor used in the communication unit 13 controls the communication module. Examples of that processor can include an MPU (Micro Processing Unit) and a CPU (Central Processing Unit). The MPU is more favorable as the processor because of the throughput of the communication unit 13 and a requirement for downsizing in the transmission apparatus 1.

The communication performed by the communication module of the communication unit 13 may be wireless or may be wired. Further, a wireless module may be single, may be of various types, or may be a composite module including the various types. The wireless communication may be communication utilizing electromagnetic waves or infrared rays, may be communication utilizing an electric field, or may be communication utilizing acoustic waves. Examples of a specific method therefor can include a communication method utilizing a band of several hundreds MHz (megahertz) to several GHz (gigahertz) such as "Wi-Fi (registered trademark)", "ZigBee (registered trademark)", "Bluetooth (registered trademark)", "Bluetooth Low Energy", "ANT (registered trademark)", "ANT+(registered trademark)", and "EnOcean (registered trademark)". Proximity wireless communication such as NFC (Near Field Communication) may be employed.

(Terminal Apparatus)

The terminal apparatus 2 includes a control unit 21, a storage unit 22, a first communication unit 23, a second communication unit 24, a display unit 25, a camera 26, and an input operation unit 27. The terminal apparatus 2 further includes a casing (not shown) that houses the control unit 21, the storage unit 22, the first communication unit 23, the second communication unit 24, the display unit 25, the camera 26, and the input operation unit 27. The casing is configured to be portable by the user, for example.

The control unit 21 is realized by the CPU and generally controls the respective units of the terminal apparatus 2. The control unit 21 executes predetermined processing in accordance with a livestock management app and other control programs which are stored in the storage unit 22.

The storage unit 22 includes, for example, a ROM (Read Only Memory) in which programs to be executed by the control unit 21 are stored and a RAM (Random Access Memory) to be used as a work memory or the like when the control unit 21 executes processing. The storage unit 22 may further include an HDD (Hard Disk Drive) and a nonvolatile memory such as a flash memory (SSD; Solid State Drive).

The first communication unit 23 is configured to be capable of communicating with the communication unit 13 of the transmission apparatus 1. The first communication unit 23 has, for example, a configuration capable of communication utilizing electromagnetic waves or infrared rays, wireless communication such as communication utilizing an electric field, or wired communication.

The second communication unit 24 is connected to the network N and is configured to be capable of communicating with the server apparatus 3. Specifically, the second communication unit 24 is connected to the network N and capable of communicating with the server apparatus 3 by a wireless LAN (IEEE802.11, etc.) such as WiFi (Wireless Fidelity) or a 3G or 4G network for mobile communication.

The display unit 25 may be realized by a display element such as an LCD (Liquid Crystal Display) and an organic EL (Electroluminescence) panel and function as a viewfinder of the camera 26. The display unit 25 may include a D/A conversion circuit and the like in addition to the display element.

The camera 26 is capable of obtaining image data from a light image of an object. Specifically, the camera 26 may include an imaging optical system and an image sensor (not shown). The imaging optical system forms the light image of the object on an imaging plane of the image sensor. The image sensor is realized by a CCD (Charge Coupled Device) sensor, a CMOS (Complementary Metal Semiconductor) sensor, or the like. The image sensor converts the formed light image into electrical signals and obtains image data.

The input operation unit 27 is, for example, a touch panel, a keyboard, a pointing device such as a mouse, or another input apparatus. If the input operation unit 27 is a touch panel, that touch panel can be integral with the display unit 25.

Note that the terminal apparatus 2 may include a microphone, a speaker, and the like in addition to the above-mentioned configurations.

(Server Apparatus)

The server apparatus 3 includes a control unit 31, a storage unit 32, and a communication unit 33.

The control unit 31 is a processor realized by the CPU. The control unit 31 generally controls the respective units of the server apparatus 3.

The storage unit 32 includes a ROM, a RAM, a nonvolatile memory, and the like. The storage unit 32 may store a plurality of databases as will be described later.

The communication unit 33 is connected to the network N and is configured to be capable of communicating with the terminal apparatus 2. The communication unit 33 is connectable to the network N via a network interface of hardware such as a wireless LAN (IEEE802.11, etc.) such as WiFi (Wireless Fidelity) and a wired LAN.

In addition to the above-mentioned configurations, the server apparatus 3 may include a configuration such as a display unit and an input operation unit in a manner that depends on needs.

[Functional Configurations of Livestock Registration System]

Figure 3:
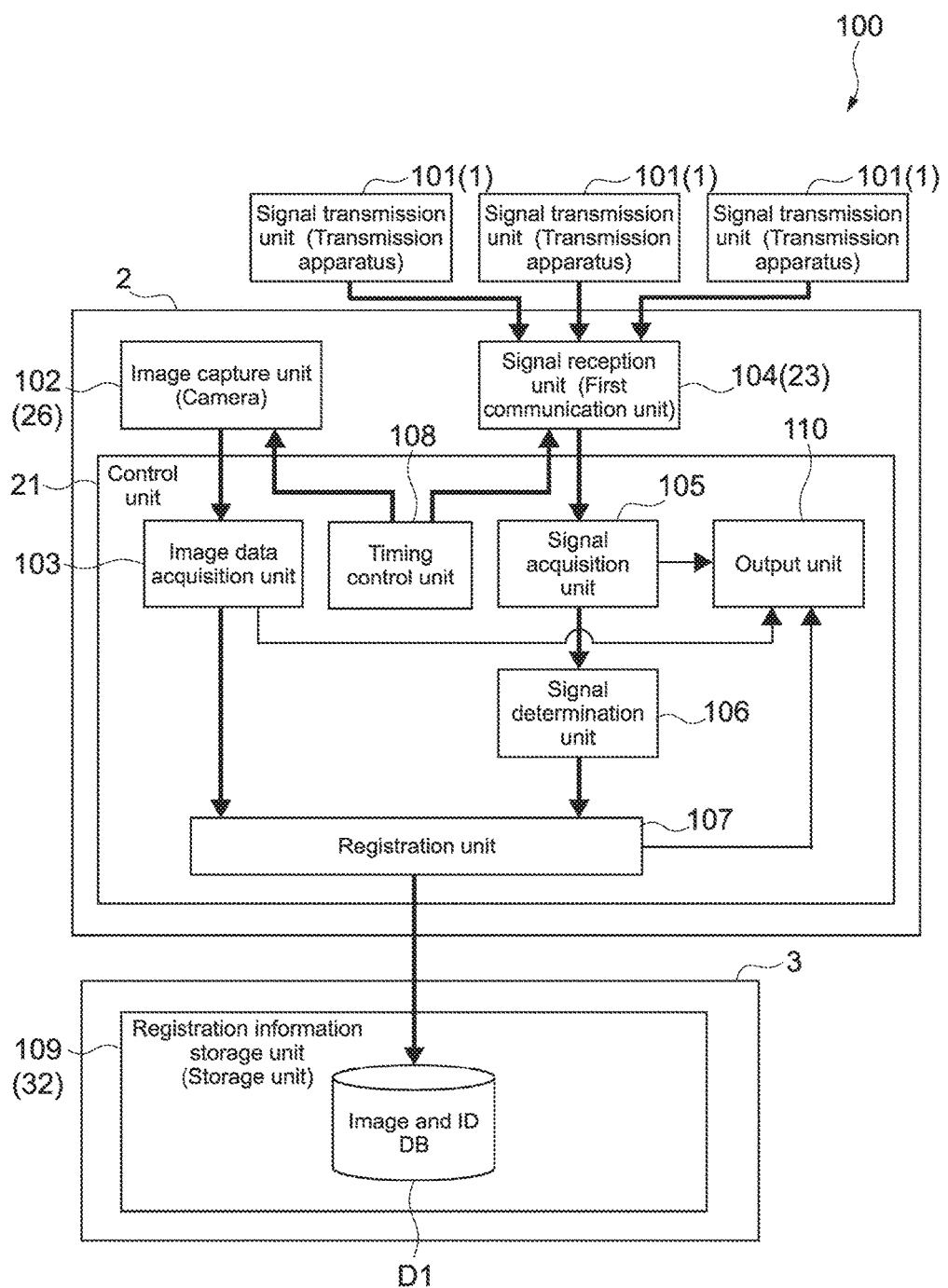
FIG. 3 A block diagram showing functional configurations and a flow of processing of the livestock registration system shown in FIG. 1.

FIG. 3 is a block diagram showing functional configurations and a flow of processing of the livestock registration system. In the figure, the solid lines schematically show a flow of processing, the thick lines show a flow of main processing, and the thin lines show a flow of auxiliary processing.

As shown in FIG. 3, the livestock registration system 100 includes a plurality of signal transmission units 101, an image capture unit 102, an image data acquisition unit 103, a signal reception unit 104, a signal acquisition unit 105, a signal determination unit 106, a registration unit 107, a timing control unit 108, a registration information storage unit 109, and an output unit 110.

In this embodiment, the signal transmission unit 101 of these configurations is realized by the communication unit 13 of the transmission apparatus 1.

The terminal apparatus 2 includes the image capture unit 102, the image data acquisition unit 103, the signal acquisition unit 105, the signal determination unit 106, the registration unit 107, the timing control unit 108, and the output unit 110. Out of them, the image capture unit 102 is realized by the camera 26. The signal reception unit 104 is realized by the first communication unit 23. The image data acquisition unit 103, the signal acquisition unit 105, the signal determination unit 106, the registration unit 107, the timing control unit 108, and the output unit 110 are realized by the control unit 21.

The server apparatus 3 includes the registration information storage unit 109. The registration information storage unit 109 is realized by the storage unit 32.

The registration processing of this embodiment is processing of determining an individual identification signal of a plurality of individual identification signals acquired, which is associated with related to a livestock animal identical to a livestock animal included in the acquired image data, and registering an identifier related to the determined individual identification signal and that image data in association with each other.

Specifically, first, the image capture unit 102 captures an image of a target livestock animal under a first condition. The image data acquisition unit 103 acquires this image data obtained by capturing an image of the target livestock animal under the first condition. The first condition can be, for example, a condition or the like regarding an image capture distance. This image data may be temporarily stored in the storage unit 22 of the terminal apparatus 2.

On the other hand, the plurality of signal transmission units 101 respectively transmit individual identification signals including identifiers for identifying a plurality of livestock animals including the target livestock animal. Then, the signal reception unit 104 receives the plurality of individual identification signals. The signal acquisition unit 105 acquires these individual identification signals. Information about the identifier related to this individual identification signal, signal strength, and the like may be temporarily stored in the storage unit 22 of the terminal apparatus 2.

The timing control unit 108 controls activation of the image capture unit 102 and shift between a reception-blocked state and a reception-permitted state of the signal reception unit 104. The timing control unit 108 controls a reception timing of the individual identification signal in the signal reception unit 104 to be a timing corresponding to a timing at which the image capture unit 102 captures the image of the target livestock animal. For example, the timing control unit 108 counts time with a clock circuit of the control unit 21 and controls the reception timing by using time information.

With this, the signal acquisition unit 105 is capable of acquiring the individual identification signal including the reception timing corresponding to the timing at which the image data is captured.

Note that the reception timing is not limited to a particular time and may be a time range. The same applies to the timing of image capture.

Further, "the reception timing corresponding to the timing at which the target livestock animal is captured" may include, for example, at least any timing of (1) a timing from reception start of the individual identification signal to satisfaction of a predetermined condition, the timing preceding image capture of the image data, (2) a timing from reception start of the individual identification signal to satisfaction of the predetermined condition, the timing following image capture of the image data, and (3) a timing of satisfaction of the predetermined condition, the timing being in a period including an image capture timing of the image data. The reception start of the individual identification signal may be, for example, start of the reception-permitted state of the signal reception unit 104. Further, the satisfaction of the predetermined condition, which is set forth herein, may be a lapse of a predetermined time after the start of the reception-permitted state, may be reception of a predetermined number of individual identification signals after the start of the reception-permitted state, or may be reception of an individual identification signal having received signal strength above a predetermined threshold after the start of the reception-permitted state. Alternatively, these conditions may be combined into the predetermined condition.

By controlling the reception timing to correspond to the timing at which the image of the target livestock animal is captured, the terminal apparatus 2 is capable of suitably selecting or narrowing down to an identifier that should be made corresponding to the image data captured. Thus, it is possible to increase the accuracy of associating.

A specific control example of the timing control unit 108 can be as follows.

Figure 4:
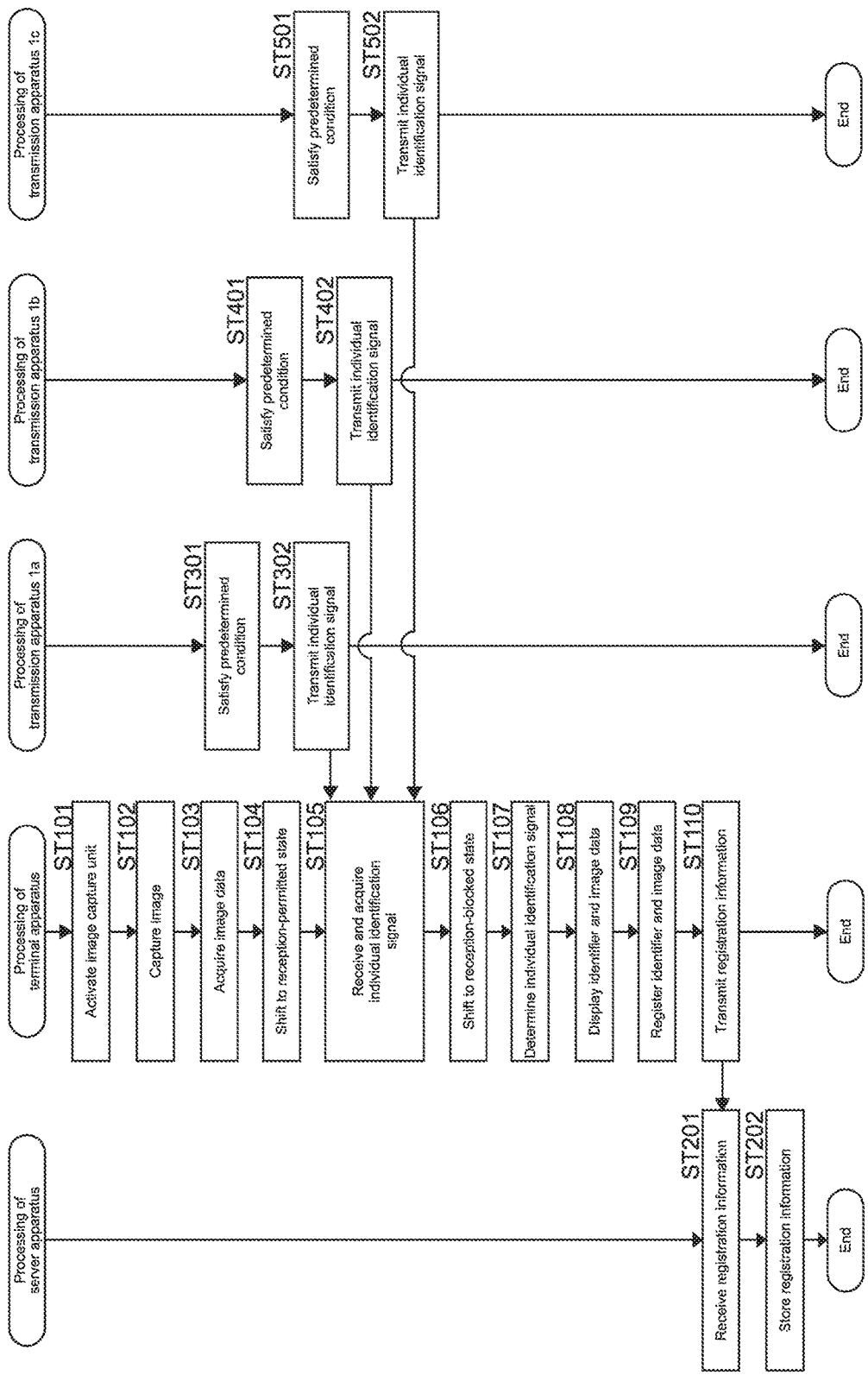
FIG. 4 A flowchart showing an operation example of the livestock registration system shown in FIG. 1.

For example, the timing control unit 108 may cause the signal reception unit 104 to shift from the reception-blocked state to the reception-permitted state after it activates the image capture unit 102 and the image data acquisition unit 103 acquires image data (see FIG. 4).

Figure 7:
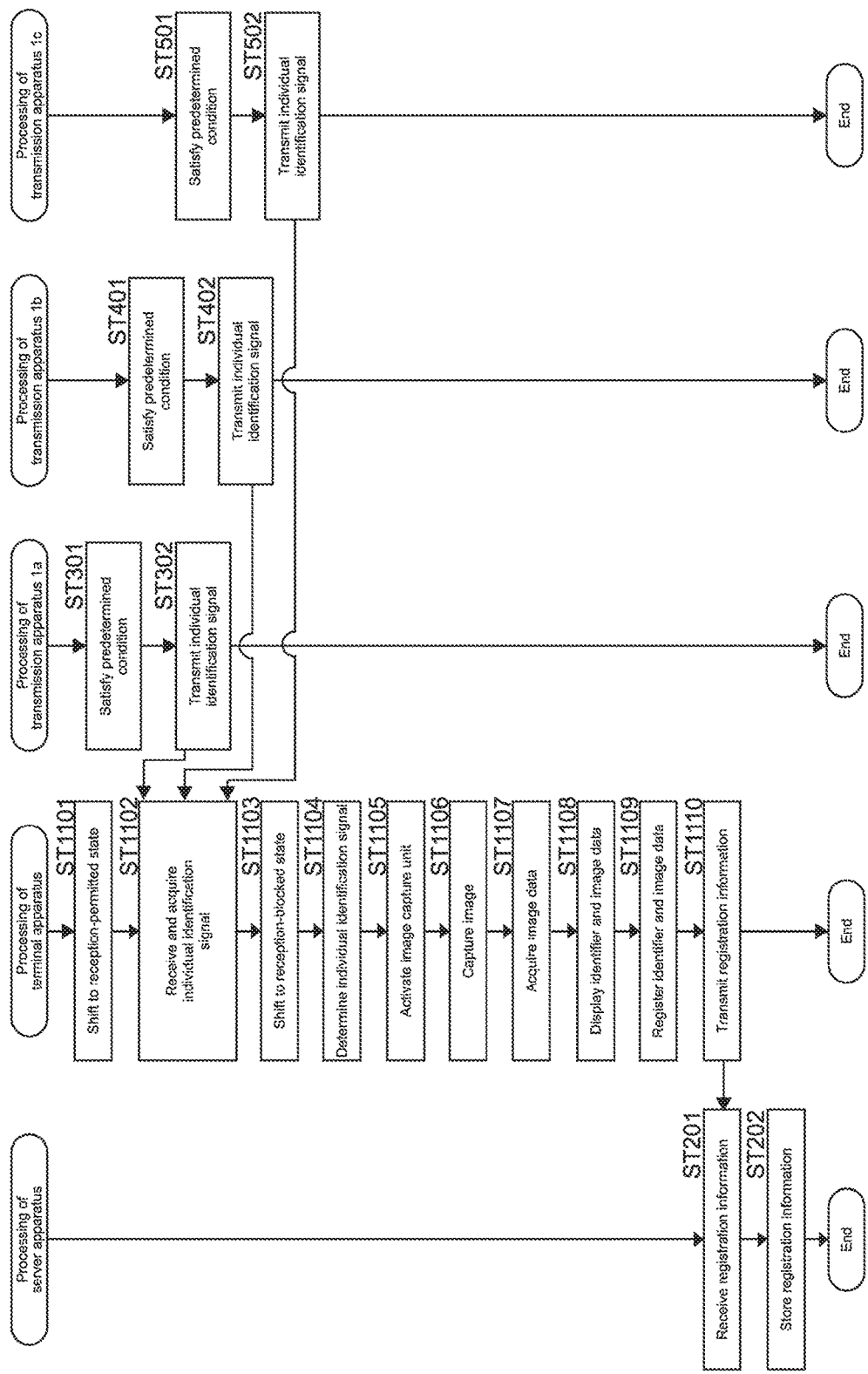
FIG. 7 A flowchart showing an operation example of a livestock registration system according to Modified Example 1-1.

Further, after the signal acquisition unit 105 acquires a plurality of individual identification signals, the timing control unit 108 may activate the image capture unit 102 to be capable of capturing an image (see FIG. 7).

Alternatively, the timing control unit 108 may control the image capture unit 102 and the signal reception unit 104 such that the signal reception unit 104 is kept in the reception-permitted state with the image capture unit 102 activated. For example, the signal reception unit 104 may shift to the reception-permitted state at the same time as activation of the image capture unit 102.

Subsequently, the signal determination unit 106 determines an individual identification signal of the plurality of individual identification signals acquired, which satisfies a second condition related to the first condition. The second condition can be, for example, a condition or the like of signal strength correlated to the image capture distance.

Then, the registration unit 107 registers the identifier (ID) of the determined individual identification signal and the image data in association with each other. That is, the registration unit 107 registers the identifier of the individual identification signal, which is received at the reception timing corresponding to the timing at which the image data is captured, and the image data in association with each other. A specific registration method for the identifier and the image data is not particularly limited. For example, information about the identifier may be registered as metadata added to the image data. Alternatively, a file name of the image data and the information about the identifier may be registered in association with each other in a database of a storage medium. For registration in the database, for example, the identifier and the image data or link information to the image data are recorded in a single record on an information table of the database. Further, feature data (to be described in detail) such as a feature quantity extracted from the image data and the information about the identifier may be associated with each other.

The output unit 110 is capable of appropriately outputting information (registration information) about the registered identifier and image data to the display unit 25 and/or the speaker (not shown) or the like.

The registered information is transmitted to the server apparatus 3 via the second communication unit 24 of the terminal apparatus 2.

Lastly, the registration information storage unit 109 stores the registered identifier and image data as the registration information. The registration information storage unit 109 stores an image and ID database (DB) D1 for storing the identifier (ID) and the image data. Newly registered identifier and image data are stored in this image and ID database D1.

Note that the image and ID database D1 may include information registered by using a terminal apparatus other than the terminal apparatus 2 that is provided with the livestock registration service by the server apparatus 3. In this case, the image and ID database D1 may store each piece of registration information and information regarding the terminal apparatus that has executed the registration processing in association with each other.

Operation Example

Subsequently, a specific operation example of the registration processing will be described.

FIG. 4 is a flowchart showing an operation example of the registration processing of the livestock registration system 100. In this operation example, an example in which each of the three transmission apparatuses 1 (referred to as transmission apparatuses 1*a*, 1*b*, 1*c*) transmits an individual identification signal will be described.

Note that, in the figure, processing of ST101 to ST110 is executed by the terminal apparatus 2, processing of ST201 and ST202 is executed by the server apparatus 3, processing of ST301 and ST302 is executed by the transmission apparatus 1*a*, processing of ST401 and ST402 is executed by the transmission apparatus 1*b*, and processing of ST501 and ST502 is executed by the transmission apparatus 1*c*.

First, a user who perform the registration processing performs a predetermined input operation through the input operation unit 27 of the terminal apparatus 2, such that livestock registration app is activated and the timing control unit 108 activates the image capture unit 102 (camera 26) to be capable of capturing an image (ST101).

Subsequently, on the basis of the user's input operation, the image capture unit 102 of the terminal apparatus 2 captures an image of the target livestock animal under the first condition (ST102). The first condition includes, for example, a condition of being at an image capture distance at which an image of a physical feature of the target livestock animal is capable of being captured. The image capture distance at which the image of the physical feature of the target livestock animal is capable of being captured can be a range of 1 m to 5 m, for example. This image capture distance can vary in a manner that depends on a focal distance of a lens, the presence or absence of a zoom function, and the like of the image capture unit 102. This image capture distance is a distance at which the entire livestock animal or a feature of the livestock animal, such as a face, can be recognized in the captured image.

With this, the image data captured by the user's input operation is confirmed, and the image data acquisition unit 103 acquires the captured image data (ST103).

Figure 5A:
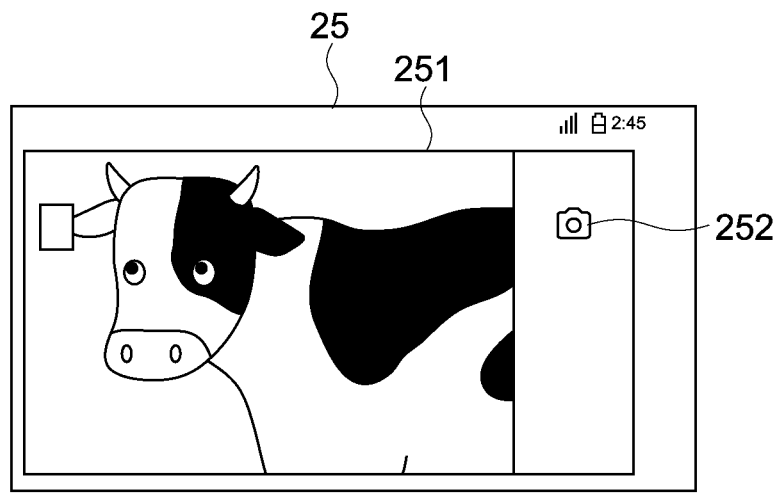
FIGS. 5A and 5B Diagrams showing an example of image data displayed on a display unit of a terminal apparatus in the operation example of FIG. 4.
Figure 5B:
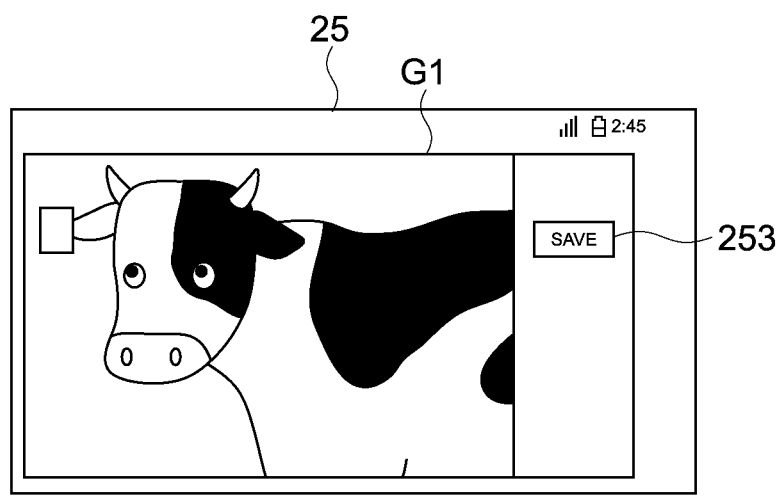

FIGS. 5A and 5B are diagrams showing an example of the image data displayed on the display unit 25. FIG. 5A shows an example in which a part of the display unit 25 functions as a viewfinder 251. On the display unit 25, a live view image of a target livestock animal that is a current object is displayed. With this, the user can adjust the composition of the target livestock animal. At this time, the composition can be adjusted to include the physical feature of the target livestock animal. The user captures an image by tapping a shutter button 252, for example, after adjustment of the composition.

FIG. 5B is a diagram showing captured image data G1. In the figure, a save button 253 is displayed instead of the shutter button 252. The user checks the captured image data G1 and taps the save button 253 for confirming it. With this, the image data acquisition unit 103 is capable of acquiring the image data including the physical feature of the target livestock animal.

Subsequently, the timing control unit 108 of the terminal apparatus 2 causes the signal reception unit 104 to shift from the reception-blocked state to the reception-permitted state (ST104). With this, the timing control unit 108 is capable of causing the signal reception unit 104 to shift to the reception-permitted state continuously after the image data is acquired, such that the reception timing of the individual identification signal includes the timing from start of the reception-permitted state to satisfaction of the predetermined condition after image capture.

Note that the reception-blocked state refers to a state in which the signal reception unit 104 does not receive an individual identification signal. For example, it may be a state in which signal reception is not performed in terms of hardware by, for example, turning off the power supply of the signal reception unit 104. It may be a state in which the signal reception unit 104 can receive an individual identification signal itself while signal reception is not performed in terms of software by, for example, ignoring the signal received by the control unit 21. Further, the reception-permitted state refers to a state in which the signal reception unit 104 can receive an individual identification signal including the identifier that can be associated with the image data.

On the other hand, if each of the transmission apparatuses 1a to 1c satisfies the predetermined condition (ST301, ST401, ST501), each of the transmission apparatuses 1a to 1c transmits the individual identification signal including the identifier for identifying each of the transmission apparatuses 1a to 1c (ST302, ST402, ST502). The predetermined condition set forth herein may be, for example, a condition that the power generation amount by the power generation unit 11 is equal to or larger than a predetermined power generation amount. Alternatively, it may be a condition that a request signal of the individual identification signal has been received from the terminal apparatus 2 or the like. Or, it may be a condition that a predetermined time elapses after the previous transmission of the individual identification signal.

The signal reception unit 104 of the terminal apparatus 2 receives each of the transmitted individual identification signals in the reception-permitted state, and the signal acquisition unit 105 acquires each of the individual identification signals (ST105).

In this embodiment, the signal reception unit 104 is installed in the identical terminal apparatus 2 in which the image capture unit 102 is installed. Therefore, the signal acquisition unit 105 is configured to be capable of acquiring the plurality of individual identification signals received near an image capture position of the image data.

Then, after a predetermined time elapses after start of the reception-permitted time, the timing control unit 108 causes the signal reception unit 104 to shift from the reception-permitted state to the reception-blocked state again (ST106).

That is, the reception timing of the individual identification signal in this example is a timing from start of the reception-permitted state to satisfaction of the predetermined condition the timing following image capture of the image data. The satisfaction of the predetermined condition may be satisfaction of each of the conditions enumerated in the description of the timing control unit 108 shown in FIG. 3 or may be satisfaction of another condition.

Subsequently, the signal determination unit 106 of the terminal apparatus 2 determines an individual identification signal of the plurality of individual identification signals acquired, which satisfies the second condition (ST107). In this operation example, the second condition includes a condition of having highest signal strength among the plurality of individual identification signals. That is, the signal determination unit 106 in this operation example is capable of determining an individual identification signal by using received signal strength (RSSI: Received Signal Strength Indication) of the individual identification signal.

Then, the output unit 110 outputs the identifier of the determined individual identification signal and the image data to the display unit 25 (ST108).

Figure 6:
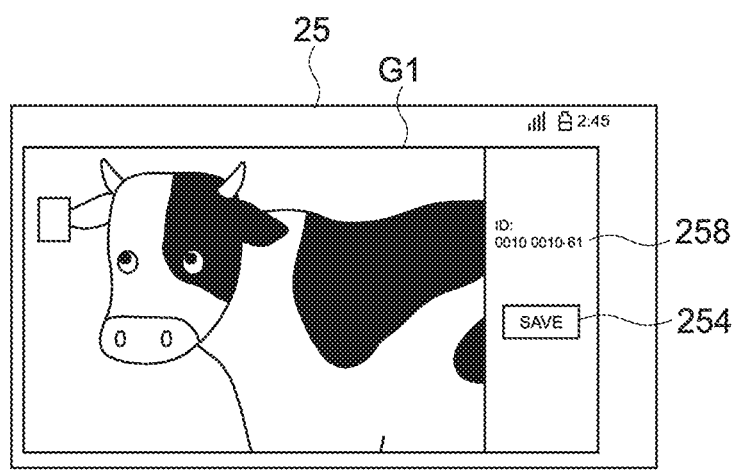
FIG. 6 A diagram showing an example of an identifier and image data displayed on the display unit of the terminal apparatus in the operation example of FIG. 4.

FIG. 6 is a diagram showing an example of the identifier and the image data which are displayed on the display unit 25.

The user checks the captured image data G1 and information 258 about the identifier of the determined individual identification signal, and confirms them by, for example, tapping a save button.

If it is confirmed, the registration unit 107 registers this identifier and the image data in association with each other (ST109). Hereinafter, the registered identifier and image data will be referred to as the registration information.

Note that, although illustrations are omitted, the above-mentioned processing of ST101 to ST109, ST301 and ST302, ST401 and ST402, and ST501 and ST502 may be repeated by activating the image capture unit 102 again after ST109 (ST101). With this, a plurality of target livestock animals can be successively registered. Further, the image capture unit 102 may be activated on the basis of the user's input operation or may be automatically activated.

The control unit 21 of the terminal apparatus 2 transmits the registration information to the server apparatus 3 via the second communication unit 24 of the terminal apparatus 2 (ST110).

The transmission timing of the registration information is not particularly limited. For example, the control unit 21 may transmit it to the server apparatus 3 immediately after the registration step of ST109, for example. Alternatively, the control unit 21 may cause the storage unit 22 to temporarily store the registration information and transmit the registration information under a stable communication environment. With this, it is possible to perform registration work even in a barn or a pasture where the stable communication environment is not ensured, and to transmit data under the stable communication environment.

Lastly, the server apparatus 3 receives the registration information (ST201), and the registration information storage unit 109 stores the registered identifier and image data as the registration information (ST202).

After that, for example, the user who performed the registration processing or another user can perform matching processing of the registration information by using the livestock registration app installed in the terminal apparatus 2 or another terminal apparatus.

Specifically, after the application is activated, a list of registered image data is transmitted from the server apparatus 3 and displayed on the display unit. The user selects image data wished to be matched from the list, information about the identifier of the livestock animal corresponding to that image data is transmitted from the server apparatus 3 and displayed on the display unit.

Alternatively, a list of information about the registered identifier may be displayed on the display unit. Then, by the user selecting an identifier wished to be matched, the image data of the livestock animal, which has been registered together with that identifier, may be displayed on the display unit.

In accordance with this operation example, the timing control unit 108 controls the reception timing of the individual identification signal to be a timing corresponding to the timing at which the image capture unit 102 captures the image of the target livestock animal. That is, the signal acquisition unit 105 is capable of acquiring the individual identification signal transmitted from the target livestock animal immediately after image capture.

On the other hand, the image capture distance of the image data is a distance at which the image of the physical feature of the target livestock animal is capable of being captured. With this, it is estimated that the target livestock animal is located at a position closer to a person who performs image capture (image capture position) than other livestock animals at the time of image capture.

Further, the image capture unit 102 and the signal reception unit 104 are installed in the identical terminal apparatus 2, and hence a reception position of the individual identification signal is near the image capture position of the image data. With this, it is estimated that the individual identification signal of the target livestock animal, which is acquired before/after image capture, is output from a position closer to the reception position than the individual identification signals of the other livestock animals.

Therefore, in this operation example, the timing control unit 108 controls the image capture timing and the reception timing and the signal determination unit 106 determines an individual identification signal having highest signal strength. In this manner, an individual identification signal output from a livestock animal that is an image capture target can be determined.

As described above, in accordance with this embodiment, the image data obtained by capturing an image of the livestock animal and the identifier of that livestock animal can be automatically registered. With this, even if the ear-tag or the transmission apparatus 1 is detached, a desired livestock animal can be determined on the basis of the registered image data.

Further, only by the user capturing image data of the livestock animal, that image data and the individual identification number of the livestock animal can be automatically registered. Therefore, also if many livestock are registered, load is light. Therefore, with the livestock registration system 100 of this embodiment, individual identification and management of many livestock can be facilitated.

Modified Example of this Embodiment

Hereinafter, a modified example of this embodiment will be described. Note that configurations similar to those of the above-mentioned embodiment will be denoted by identical symbols and descriptions thereof will be omitted.

Modified Example 1-1: Modified Example Regarding Image Capture Timing

The timing control unit 108 is not limited to the control example shown in the above-mentioned operation example.

For example, as another control example, the timing control unit 108 is capable of controlling the image capture unit 102 and the signal reception unit 104 such that the reception timing of the individual identification signal includes a timing from start of the reception-permitted state of the signal reception unit 104 to satisfaction of the predetermined condition, the timing preceding image capture of the image data.

FIG. 7 is a flowchart showing another operation example of the registration processing of the livestock registration system 100.

Note that, in the figure, processing of ST1101 to ST1110 is executed by the terminal apparatus 2, processing of ST201 to ST204 is executed by the server apparatus 3, processing of ST301 and ST302 is executed by the transmission apparatus 1a, processing of ST401 and ST402 is executed by the transmission apparatus 1b, and processing of ST501 and ST502 is executed by the transmission apparatus 1c.

First, the livestock registration app is activated, and the timing control unit 108 of the terminal apparatus 2 causes the signal reception unit 104 to shift from the reception-blocked state to the reception-permitted state (ST1101).

On the other hand, if the power generation amount by the power generation unit 11 is equal to or larger than a predetermined power generation amount (ST301, ST401, ST501), each of the transmission apparatuses 1a to 1c transmits an individual identification signal including an identifier for identifying each of the transmission apparatuses 1a to 1c (ST302, ST402, ST502).

The signal reception unit 104 of the terminal apparatus 2 receives each of the output individual identification signals in the reception-permitted state, and the signal acquisition unit 105 acquires each of the individual identification signals (ST1102).

Then, after a predetermined time elapses after start of the reception-permitted time, the timing control unit 108 causes the signal reception unit 104 to shift from the reception-permitted state to the reception-blocked state again (ST1103).

That is, in this example, the reception timing of the individual identification signal is a timing from start of the reception-permitted state of the signal reception unit 104 to satisfaction of the predetermined condition, the timing preceding image capture of the image data. The satisfaction of the predetermined condition may be satisfaction of each of the conditions enumerated in the description of the timing control unit 108 shown in FIG. 3 or may be satisfaction of another condition.

Subsequently, the signal determination unit 106 of the terminal apparatus 2 determines an individual identification signal of the plurality of individual identification signals acquired, which satisfies the second condition of having highest signal strength (ST1104).

After that, the output unit 110 may output the identifier of the determined individual identification signal to the display unit 25 and the user may confirm it.

After the signal acquisition unit 105 acquires the plurality of individual identification signals, the timing control unit 108 activates the image capture unit 102 (camera 26) to be capable of capturing an image (ST1105).

Subsequently, on the basis of a predetermined input operation by the user, the image capture unit 102 of the terminal apparatus 2 captures an image of the target livestock animal under the first condition of being at the image capture distance at which the image of the physical feature of the target livestock animal is capable of being captured (ST1106). The image data acquisition unit 103 acquires image data (ST1107).

The output unit 110 outputs the identifier of the determined individual identification signal and the image data to the display unit 25 (ST1108).

With the user's confirmation operation, the registration unit 107 registers this identifier and the image data in association with each other (ST1109).

The control unit 21 of the terminal apparatus 2 transmits the registered information to the server apparatus 3 via the second communication unit 24 of the terminal apparatus 2 (ST1110). The server apparatus 3 receives this registration information (ST201). Then, the registration information storage unit 109 of the server apparatus 3 stores the registered identifier and image data in, for example, the image and ID database D1 (ST202).

Also with this operation example, the timing control unit 108 is capable of controlling the image capture timing of the image capture unit 102 and the reception timing of the signal reception unit 104 for the plurality of individual identification signals to be close to each other. Therefore, the signal determination unit 106 determines an individual identification signal having highest signal strength. In this manner, an individual identification signal output from a livestock animal that is an image capture target can be determined.

Alternatively, as a control example of the "close timing", the timing control unit 108 may continuously activate the image capture unit 102 after the signal reception unit 104 shifts to the reception-blocked state, without interposing determination processing for the individual identification signal. In this case, the signal determination processing can be performed after activation of the image capture unit 102.

Further, the timing control unit 108 is capable of controlling the image capture unit 102 and the signal reception unit 104 such that the reception timing of the individual identification signal is in the period including the image capture timing of the image data and is the timing of satisfaction of the predetermined condition. For example, the image capture timing may be in a period in which the image capture unit 102 is activated or may be a shutter timing of image capture.

For example, the timing control unit 108 is capable of controlling the signal reception unit 104 to be in the reception-permitted state at the same time as activation of the image capture unit 102. Alternatively, the timing control unit 108 may activate the image capture unit 102 after the timing control unit 108 causes the signal reception unit 104 to shift to the reception-permitted state, before the timing control unit 108 causes it to shift to the reception-blocked state. Also with this, the reception timing of the individual identification signal can be controlled to be the timing corresponding to the timing at which the image capture unit 102 captures the image of the target livestock animal.

Note that "being in the period including the image capture timing of the image data and being the timing of satisfaction of the predetermined condition" in this example can be as follows, for example.
(a) a timing from a predetermined time prior to a time based on a time, which is determined on the basis of the image capture timing, to the image capture timing (in this case, for example, the signal reception unit 104 enters the reception-permitted state and continuously receives individual identification signals, and the control unit 21 uses a reception time of each of the individual identification signals among them, to thereby select an individual identification signal received until the predetermined time prior to the time based on the image capture timing)
(b) a timing from the image capture timing to a time at which a predetermined time elapses
(c) a timing in a predetermined period before or after the time based on the time determined on the basis of the image capture timing (period having a predetermined time duration before and after the image capture timing)

Still further, "satisfaction of the predetermined condition" may be a lapse of a predetermined time after the start of the reception-permitted state, may be reception of a predetermined number of individual identification signals after the start of the reception-permitted state, or may reception of an individual identification signal having received signal strength above a predetermined threshold after the start of the reception-permitted state. Alternatively, these conditions may be combined into the predetermined condition.

Modified Example 1-2: Modified Example Regarding Signal Determination Unit and Registration Unit The image data acquisition unit 103, the signal acquisition unit 105, the signal determination unit 106, and the registration unit 107 are all realized by the control unit 21 of the terminal apparatus 2 in the above description. However, for example, at least one of these configurations may be realized by the control unit 31 of the server apparatus 3.

Figure 8:
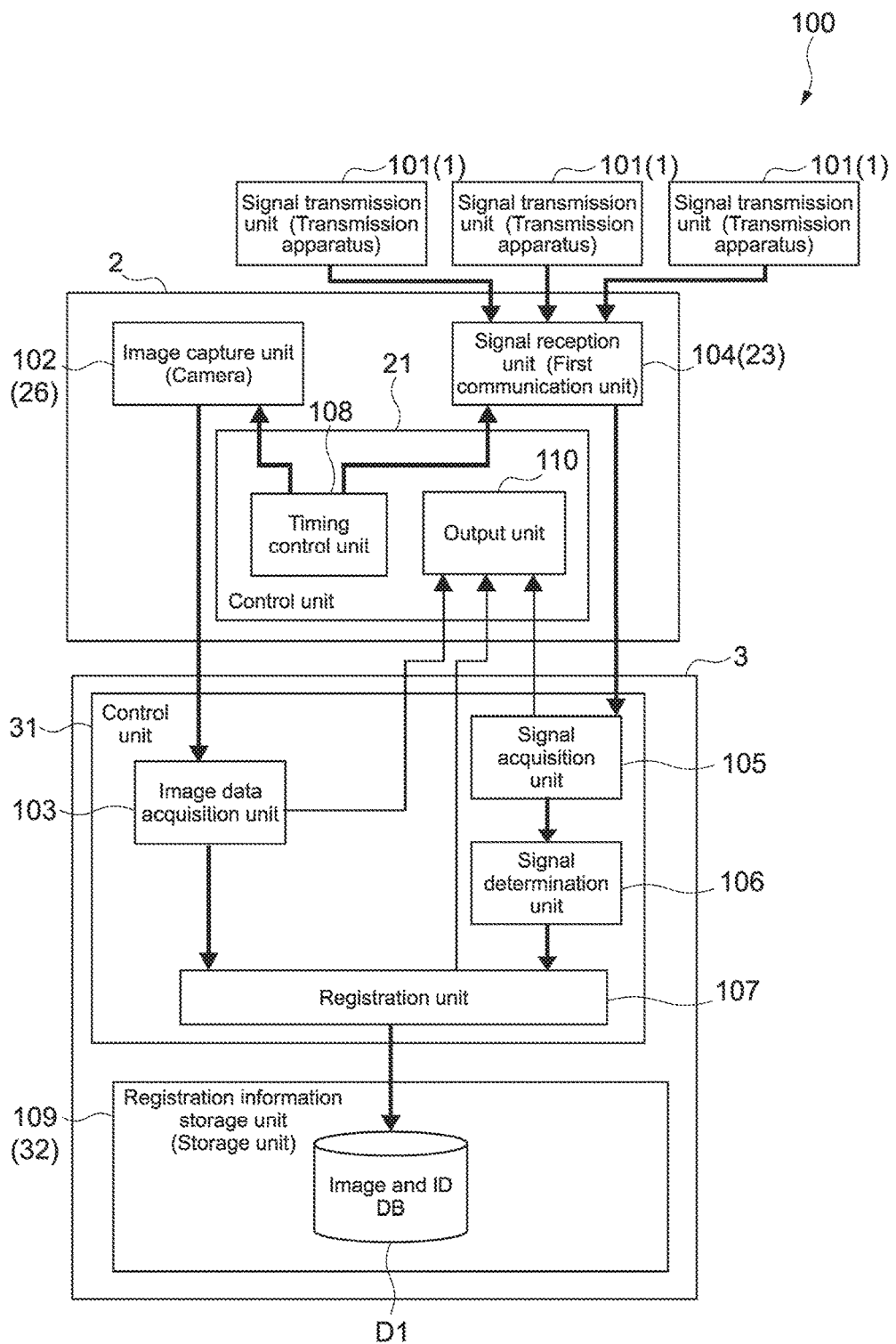
FIG. 8 A block diagram showing functional configurations and a flow of processing of a livestock registration system according to Modified Example 1-2.

FIG. 8 is a block diagram showing functional configurations and a flow of processing of the livestock registration system 100 according to this modified example.

As shown in the figure, the timing control unit 108 and the output unit 110 are realized by the control unit 21 of the terminal apparatus 2. However, the image data acquisition unit 103, the signal acquisition unit 105, the signal determination unit 106, and the registration unit 107 are realized by the control unit 31 of the server apparatus 3.

In this case, the terminal apparatus 2 transmits the image data captured by the image capture unit 102 to the server apparatus 3 via the second communication unit 24, and the image data acquisition unit 103 acquires that image data. Similarly, the terminal apparatus 2 transmits the individual identification signal received by the signal reception unit 104 to the server apparatus 3 via the second communication unit 24, and the signal acquisition unit 105 acquires that individual identification signal. Then, in the control unit 31, registration processing similar to that of the above-mentioned embodiment is executed.

Further, the output unit 110 is capable of appropriately outputting the image data, the individual identification signal, the registration information, and the like to the display unit 25 and the like.

With this modified example, processing load on the terminal apparatus 2 can be reduced.

Modified Example 1-3: Modified Example of Transmission Apparatus

The transmission apparatus 1 is not limited to the above-mentioned configuration.

For example, instead of or in addition to the power generation unit 11 and the power storage element 12, the transmission apparatus 1 may include a battery capable of supplying electric power consumed in the communication unit 13 or the like.

Alternatively, rather than being attached to the livestock animal, the transmission apparatus 1 may be, for example, disposed to a barn room, a milking box parlor, or the like in which each livestock animal is housed.

Alternatively, the transmission apparatus 1 may include a position information sensor such as GPS, an activity amount sensor such as a vibration sensor and an acceleration sensor, and a vital sensor such as a body temperature sensor. After registration of the identifier according to this modified example, data of these sensors is transmitted by the signal transmission unit 101 of the transmission apparatus 1 together with the identifier, and the terminal apparatus 2 or the server apparatus 3 receives the sensor data. The control unit 21 of the terminal apparatus 2 or the control unit 31 of the server apparatus 3 registers the received sensor data in association with the identifier registered in the database. For example, data of the position information sensor as movement history, data of the activity amount sensor as activity history, and data of the vital sensor as vital history can be read out from the database. They can be displayed to the user together with the identifier matched in matching processing to be described later.

Figure 9:
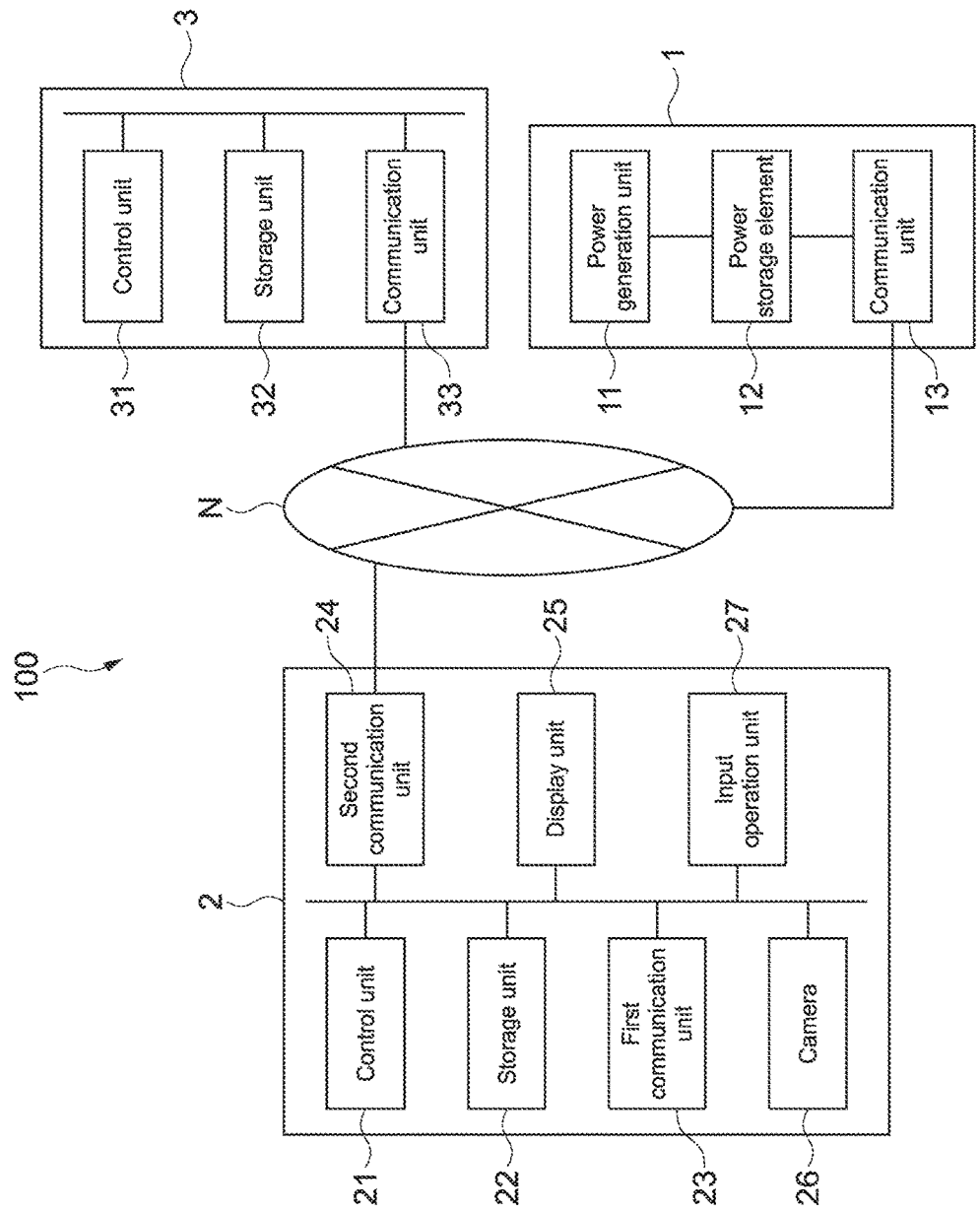
FIG. 9 A block diagram showing a hardware configuration of a livestock registration system according to Modified Example 1-3.

Further, the communication unit 13 of the transmission apparatus 1 may be configured to be connectable to the network N as shown in FIG. 9. In this case, the communication unit 13 is connected to the network N by using a wireless LAN (IEEE802.11, etc.) such as WiFi or a 3G or 4G network for mobile communication, and capable of communicating with the terminal apparatus 2.

In this example, the signal reception unit 104 may be realized by the communication unit 33 of the server apparatus 3, not the first communication unit 23 of the terminal apparatus 2. In this case, after received by the server apparatus 3, the individual identification signal is transmitted to the terminal apparatus 2. Alternatively, the signal reception unit 104 may be realized by the second communication unit 24 of the terminal apparatus 2 and the individual identification signal transmitted from the transmission apparatus 1 may be received by the terminal apparatus 2 via the network N.

Figure 10:
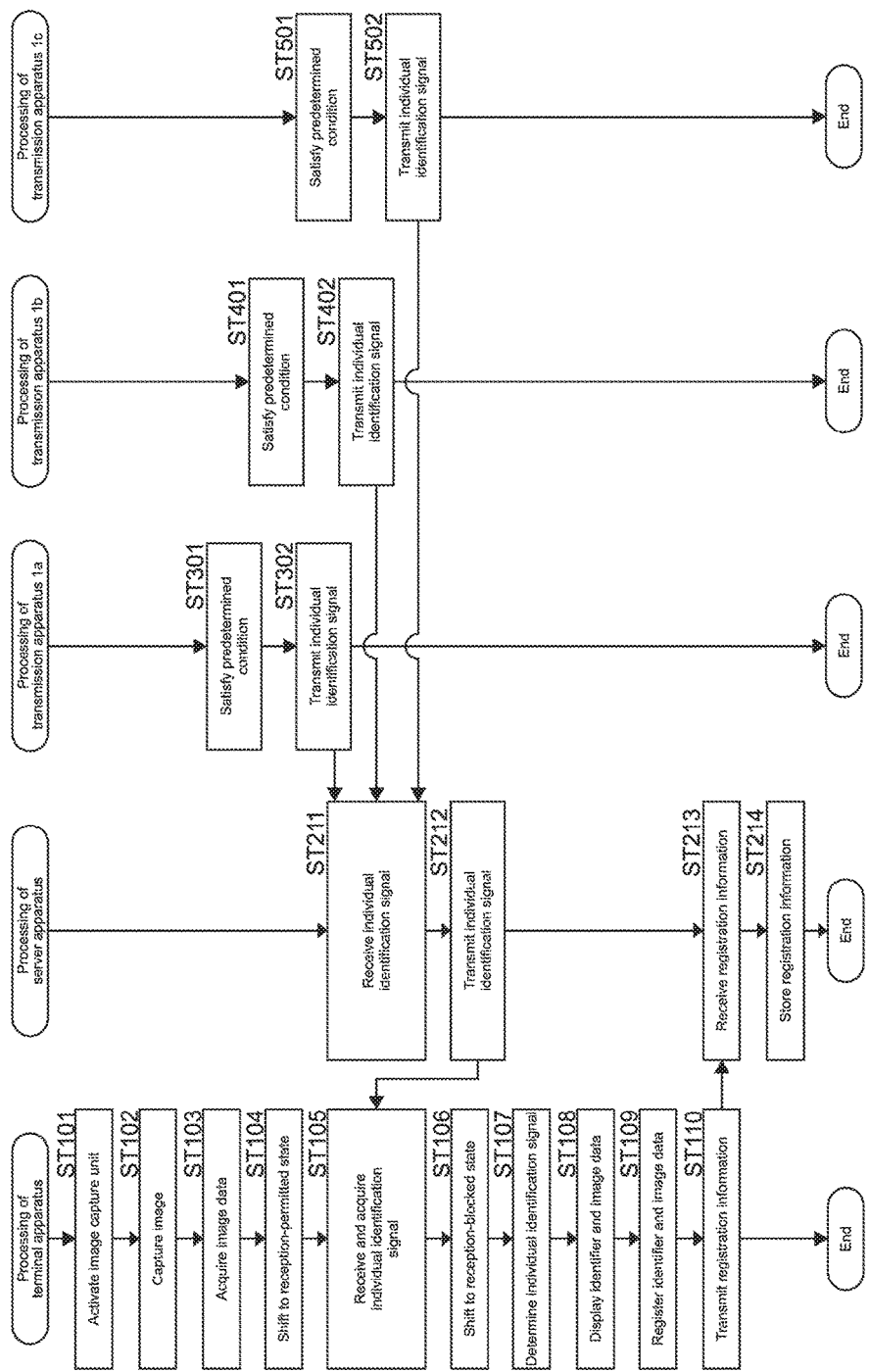
FIG. 10 A flowchart showing an operation example of the livestock registration system shown in FIG. 9.

FIG. 10 shows an operation example of the livestock registration system 100 having the hardware configuration shown in FIG. 9, showing an example in which the signal reception unit 104 is realized by the communication unit 33 of the server apparatus 3. In the figure, processing of ST211 to ST214 is executed by the server apparatus 3, and ST213 and ST214 of them correspond to ST201 and ST202 of FIG. 4, respectively. Other processing is similar to that of FIG. 4. Therefore, descriptions thereof will be omitted.

The server apparatus 3 receives individual identification signals transmitted from the transmission apparatuses 1a, 1b, 1c via the network N (ST211), and transmits them to the terminal apparatus 2 via the network N (ST212).

Then, the terminal apparatus 2 receives and acquires these individual identification signals (ST105).

In this example, the signal determination unit 107 is capable of determining, in ST107, an individual identification signal by not the determination method using the signal strength described above, but another determination method shown in Modified Example 1-6 below and a third embodiment.

Modified Example 1-4: Modified Example Regarding Storage Unit

Figure 11:
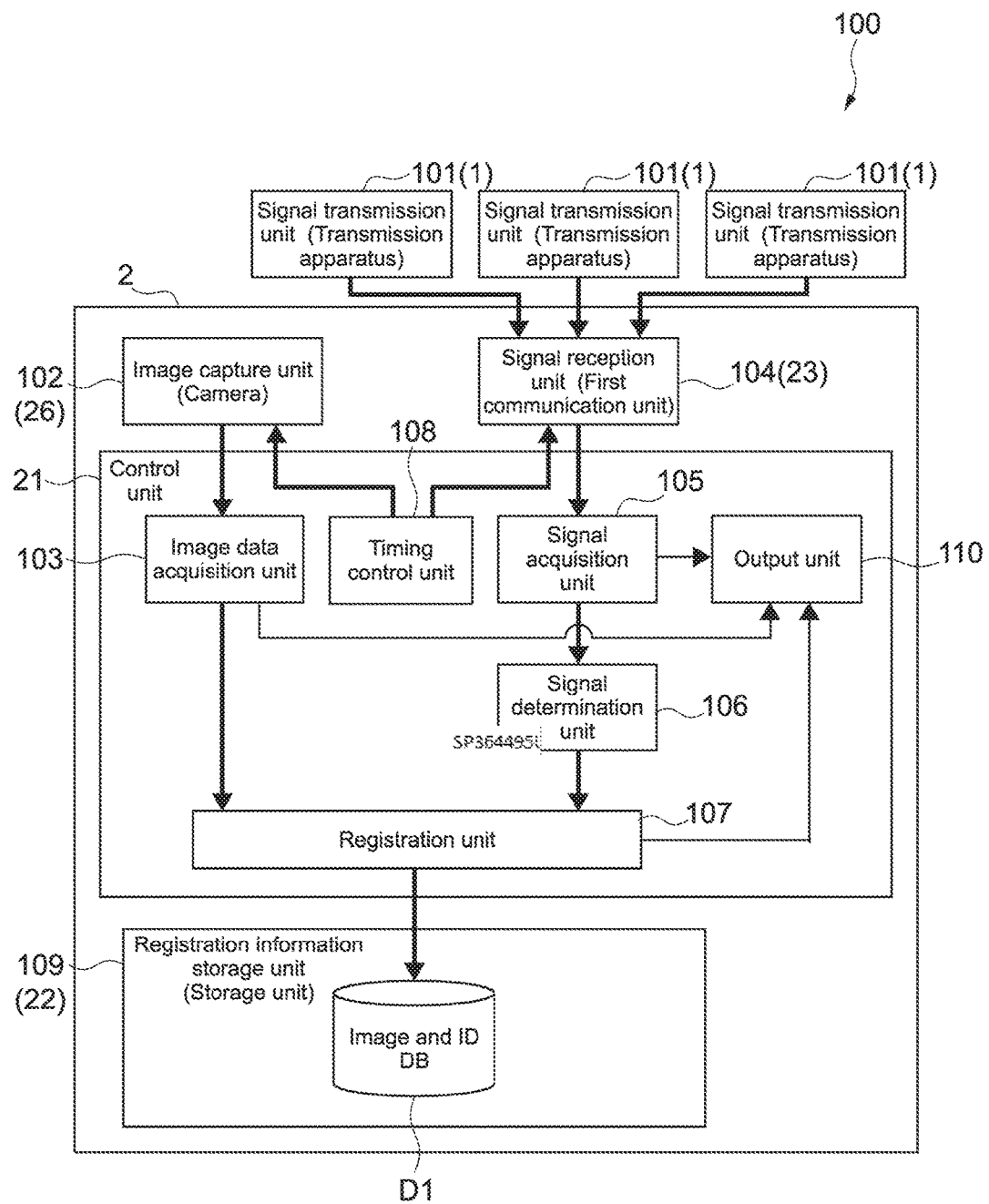
FIG. 11 A block diagram showing functional configurations and a flow of processing of a livestock registration system according to Modified Example 1-4.

In the above-mentioned embodiment, the registration information storage unit 109 is realized by the storage unit 32 of the server apparatus 3. However, for example, as shown in FIG. 11, the registration information storage unit 109 may be realized by the storage unit 22 of the terminal apparatus 2. In this case, the livestock registration system 100 may include the plurality of transmission apparatuses 1 and the terminal apparatus 2.

Figure 12:
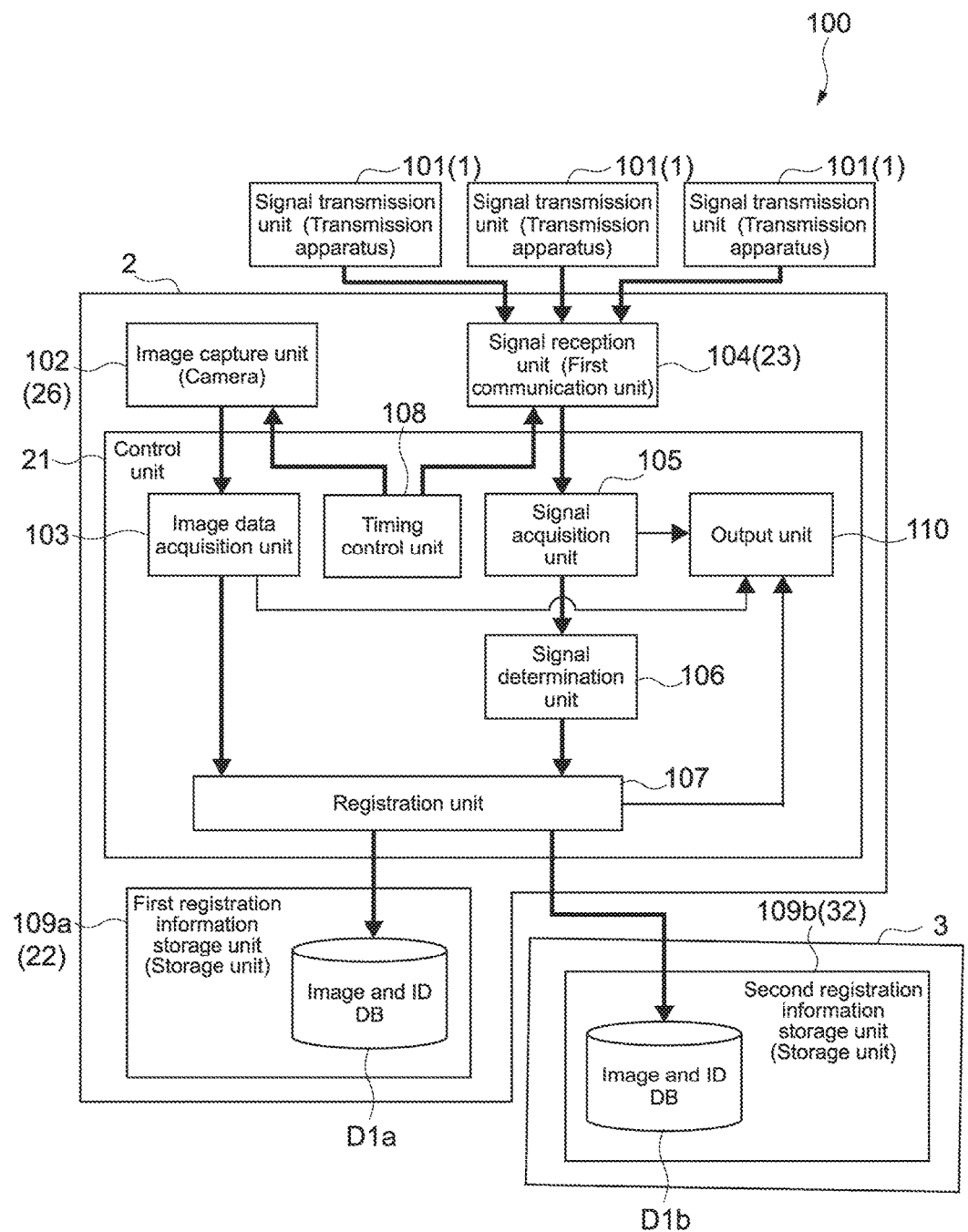
FIG. 12 A block diagram showing other functional configurations and another flow of processing of the livestock registration system according to Modified Example 1-4.

Alternatively, the livestock registration system 100 may include, as shown in FIG. 12, a first registration information storage unit 109a realized by the storage unit 22 of the terminal apparatus 2 and a second registration information storage unit 109b realized by the storage unit 32 of the server apparatus 3.

As shown in the figure, the first registration information storage unit 109a stores an image and ID database D1a and the second registration information storage unit 109b stores an image and ID database D1b. The image and ID database D1a includes information identical to information stored in the image and ID database D1b or part of the information stored in the image and ID database D1b. Typically, the image and ID database D1a stores information registered by a plurality of terminal apparatuses including the terminal apparatus 2, and the image and ID database D1a stores only information registered by the terminal apparatus 2.

With this modified example, the registration processing can be executed only by the terminal apparatus 2. Therefore, it is possible to immediately execute matching processing without needing to wait for transmission processing of registration information to the server apparatus 3.

Modified Example 1-5: Modified Example without Timing Control Unit

Figure 13:
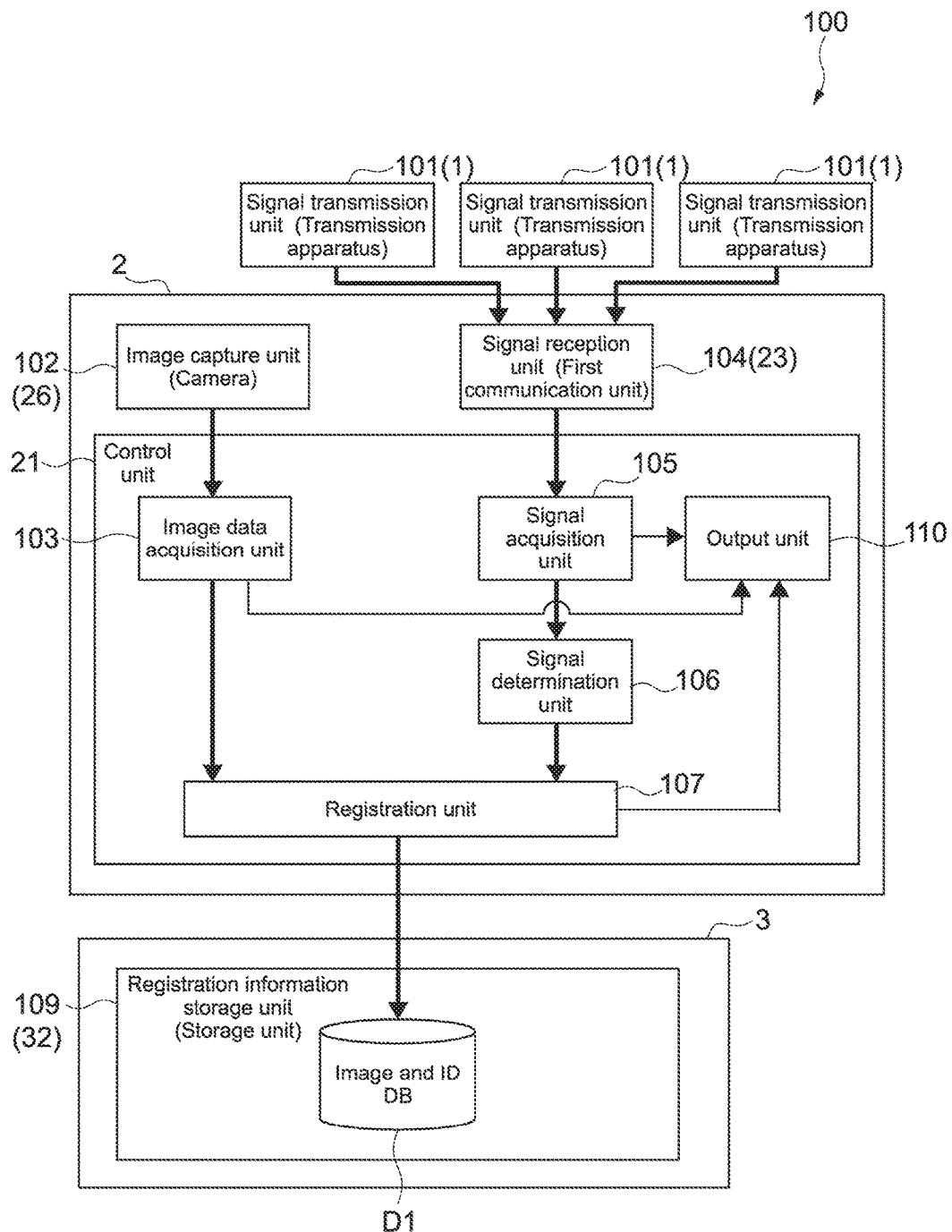
FIG. 13 A block diagram showing functional configurations and a flow of processing of a livestock registration system according to Modified Example 1-5.

As shown in FIG. 13, the livestock registration system 100 includes the image capture unit 102, the image data acquisition unit 103, the signal reception unit 104, the signal acquisition unit 105, the signal determination unit 106, the registration unit 107, the registration information storage unit 109, and the output unit 110. However, the livestock registration system 100 may have a configuration without the timing control unit.

Without the timing control unit, there is a possibility that the signal acquisition unit 105 acquires an individual identification signal of a reception timing greatly different from an image capture timing.

In view of this, in this modified example, the individual identification signal of the reception timing close to the image capture timing can be determined by the signal determination unit 106. In this modified example, the control unit 21 of the terminal apparatus 2 includes a clock circuit and is capable of adding information about an image capture time and information about a reception time of the individual identification signal to the image data and the individual identification signal, respectively. That is, regarding the image data, the terminal apparatus 2 is capable of adding the reception time as metadata of the image data and storing it. Regarding the individual identification signal, the terminal apparatus 2 is capable of associating the information about the reception time with the individual identification signal and storing them. Further, the communication unit 13 of the transmission apparatus 1 may include the clock circuit and the transmission apparatuses 1 may add information about a transmission time thereof to the individual identification signal and transmit them. Hereinafter, the reception time and the transmission time of the individual identification signal will be referred to as a "communication time".

Further, the first condition that is an image capture condition can further include a condition of recording the image capture time. The second condition regarding the signal can further include a condition of including a communication time overlapping or close to the recorded image capture time.

Alternatively, the image capture timing and the reception timing may be controlled in accordance with a user's operation.

Modified Example 1-6: Modified Example of Determination Method for Individual Identification Signal For example, the signal determination unit 106 may be capable of extracting one or more individual identification signals including an identical identifier, as each individual identification signal group, and may determine an individual identification signal satisfying a second condition of belonging an individual identification signal group having largest average signal strength.

With this, also in a situation where the reception-permitted time in the signal reception unit 104 is relatively long such that a plurality of individual identification signals can be output from the identical transmission apparatus 1 (livestock animal), an individual identification signal from a livestock animal which had been stayed long time near the signal reception unit 104 can be accurately determined.

Further, if the image capture distance can be determined on the basis of the metadata of the image data, the positional relationship between the livestock animal and the camera 26, and the like, the individual identification signal can be determined in the following manner, for example. For example, in order to determine an image capture distance, the following configurations can be employed. Specifically, the terminal apparatus 2 includes a distance-measurement sensor that measures a distance between an object and the image capture unit 102 and outputs information for estimating an image capture distance. Alternatively, a phase-difference pixel is provided in the image sensor of the image capture unit 102, and the control unit 21 calculates an image capture distance on the basis of information output from that phase-difference pixel. Alternatively, the image capture unit 102 includes a stereo camera, and the control unit 21 calculates an image capture distance on the basis of a parallax of two-image data that captured and output by the stereo camera.

That is, the image data acquisition unit 103 acquires image data captured under the first condition that the image capture distance can be determined, and the signal determination unit 106 is capable of determining an individual identification signal satisfying a second condition that the individual identification signal has signal strength based on the determined image capture distance. Since, in general, a communication distance and signal strength are correlated to each other, the communication distance can be calculated on the basis of the signal strength of the individual identification signal. Therefore, if the individual identification signal is received in vicinity of the image capture position and the communication distance is approximately equal to the image capture distance, such a determination method can be applied.

Alternatively, the signal determination unit 106 may determine a signal pattern of a characteristic individual identification signal during image capture or before/after it (e.g., see third embodiment) or may determine a characteristic individual identification signal during image capture or before/after it by using another method.

Modified Example 1-7: Modified Example Regarding Signal Reception Unit

Figure 14:
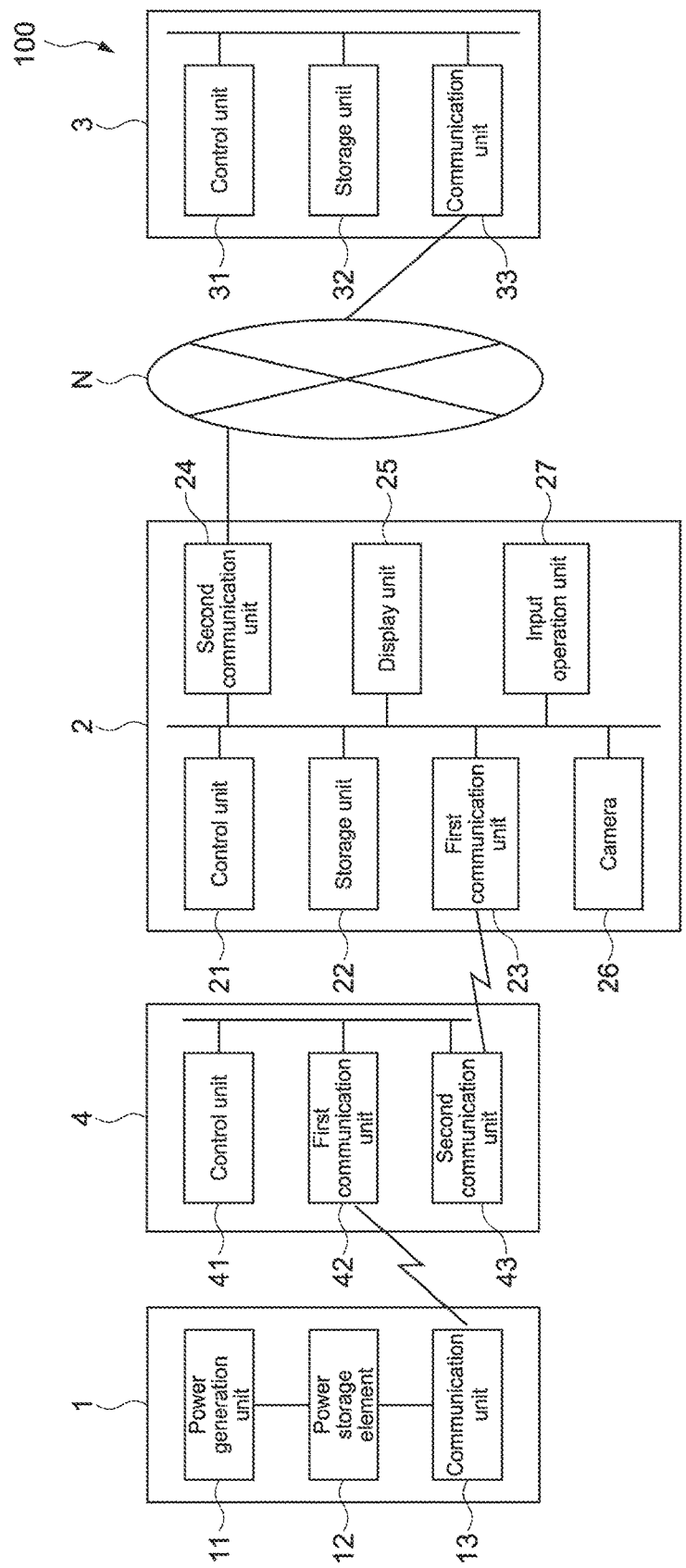
FIG. 14 A block diagram showing a hardware configuration of a livestock registration system according to Modified Example 1-7.

FIG. 14 is a block diagram showing a hardware configuration of the livestock registration system 100 according to this modified example.

In the above-mentioned embodiment, the terminal apparatus 2 includes the signal reception unit 104. However, a reception apparatus 4 separate from the terminal apparatus 2 may include the signal reception unit 104.

The reception apparatus 4 includes a control unit 41, a first communication unit 42, and a second communication unit 43. The signal reception unit 104 is realized by the first communication unit 42 of the reception apparatus 4.

The control unit 41 controls the first communication unit 42 and the second communication unit 43, and is realized by, for example, a CPU.

The first communication unit 42 is configured to be capable of communicating with the communication unit 13 of the transmission apparatus 1. The first communication unit 42 has a configuration capable of, for example, communication utilizing electromagnetic waves or infrared rays, wireless communication such as communication utilizing an electric field, wireless communication utilizing acoustic waves, or wired communication.

The second communication unit 43 is configured to be capable of communicating with the first communication unit 23 of the terminal apparatus 2. The second communication unit 43 may have a configuration capable of, for example, communication utilizing electromagnetic waves or infrared rays, wireless communication such as communication utilizing an electric field or acoustic waves, or wired communication.

With this, the signal acquisition unit 105 is capable of acquiring an individual identification signal received in vicinity of the image capture position of the image data, that is, a position within approximately several cm to 1 m from the image capture position.

Note that the reception apparatus 4 may further include a storage unit such as a RAM and a ROM (not shown).

Further, the reception apparatus 4 may be a portable information terminal different from the terminal apparatus 2 or may be a dedicated communication apparatus.

Alternatively, the reception apparatus 4 may have a schematic configuration similar to that of the transmission apparatus 1 and may be configured as a tag that can be attached to a livestock animal. In this case, for example, the control unit 41 is realized by a control module of the communication unit 13 and the first communication unit 42 and the second communication unit 43 are realized by a communication module of the communication unit 13.

Note that the transmission apparatus 1 may further include a storage unit (not shown). For that storage unit, a semiconductor memory such as a RAM and a ROM can be, for example, employed as hardware. Information about the identifier or the like included in the individual identification signal is stored therein.

Figure 15:
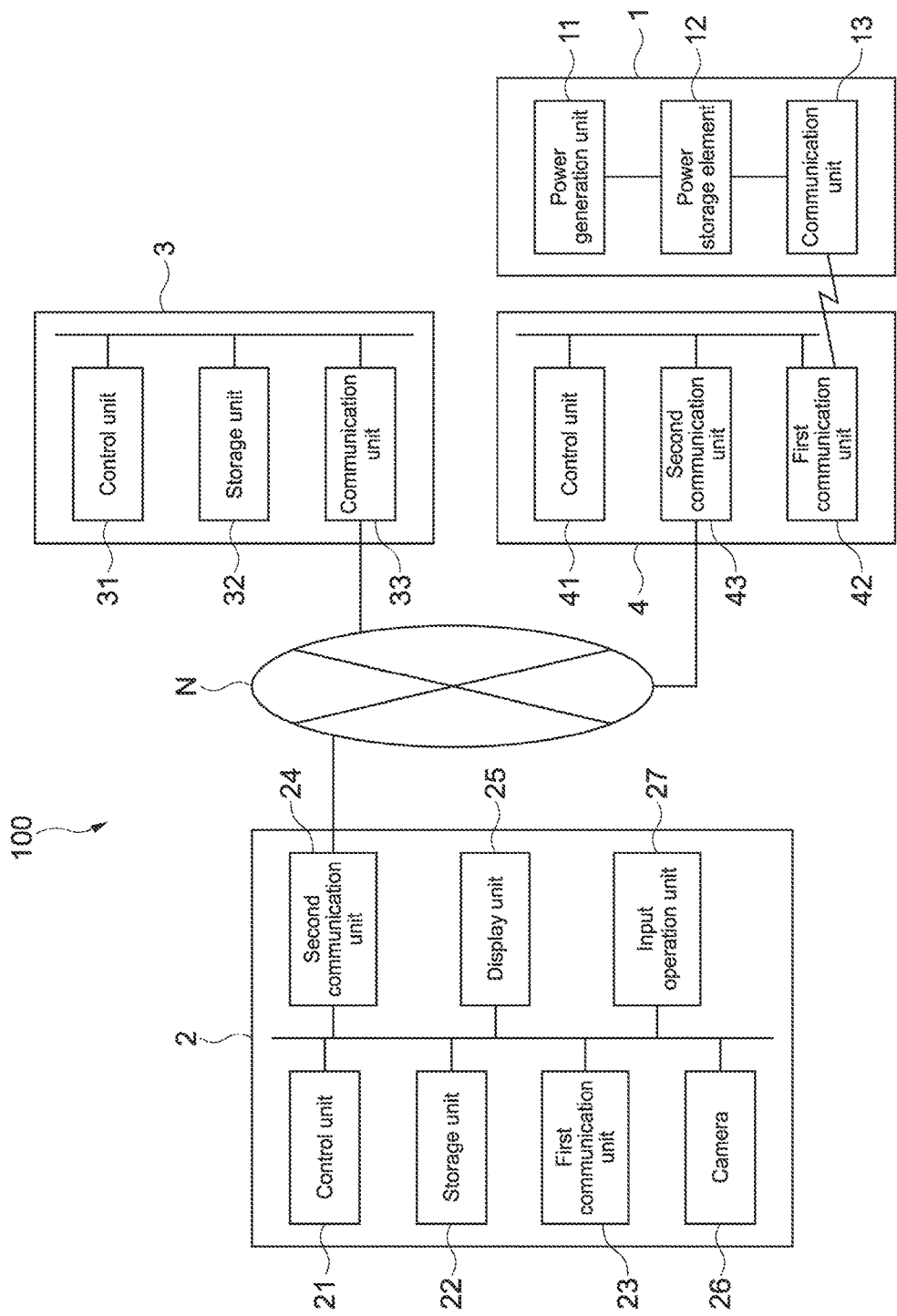
FIG. 15 A block diagram showing a hardware configuration of a livestock registration system according to another configuration example of Modified Example 1-7.

In addition, as shown in FIG. 15, as another configuration example of this modified example, the reception apparatus 4 may include the signal reception unit 104 and may be connected to not the terminal apparatus 2 but the network N. With this, as described below, the server apparatus 3 is capable of executing determination and registration processing for the individual identification signal.

Figure 16:
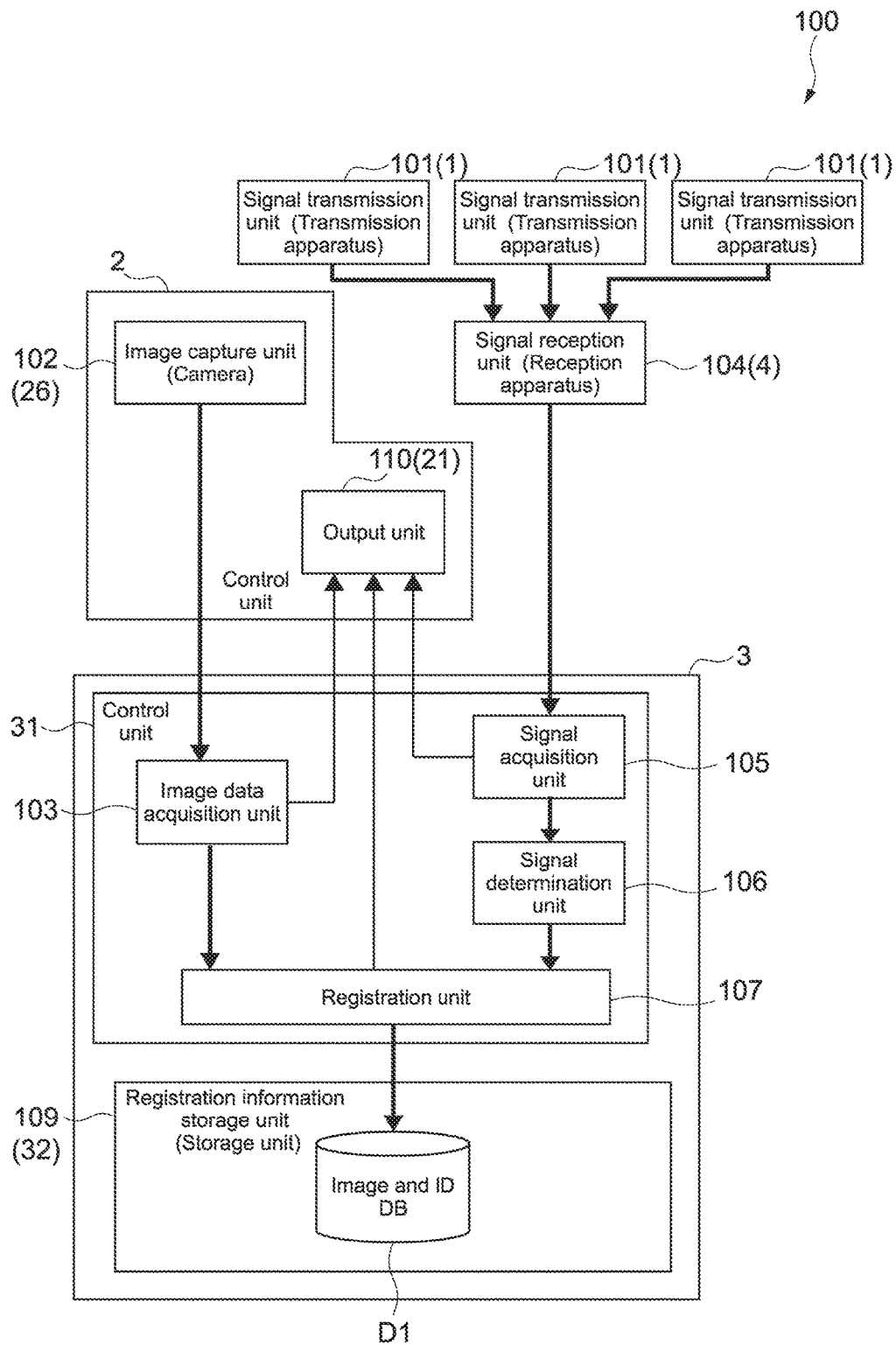
FIG. 16 A block diagram showing functional configurations and a flow of processing of the livestock registration system shown in FIG. 15.

As shown in FIG. 16, the livestock registration system 100 does not need to include, as in Modified Example 1-5, the timing control unit as the functional configuration. Further, the signal reception unit 104 may be realized by the first communication unit 42 of the reception apparatus 4, the image capture unit 102 may be realized by the camera 26 of the terminal apparatus 2, and the output unit 110 may be realized by the control unit 21 of the terminal apparatus 2. The image data acquisition unit 103, the signal acquisition unit 105, the signal determination unit 106, and the registration unit 107 may be realized by the control unit 31 of the server apparatus 3.

Further, as in Modified Example 1-5, the signal determination unit 106 is capable of determining an individual identification signal by using the condition regarding the time. That is, the first condition that is the image capture condition can include a condition of recording the image capture time and the second condition regarding the signal can include a condition of including a communication time overlapping with or close to the recorded image capture time. Therefore, as in Modified Example 1-5 without the timing control unit, the control unit 21 of the terminal apparatus 2 includes a clock circuit and is capable to adding information about the image capture time to the image data. Further, at least one of the reception apparatus 4 and the transmission apparatus 1 includes a clock circuit and is capable of adding information about the communication time described above to the individual identification signal. The reception apparatus 4 may include a storage unit (not shown).

In addition, in this modified example, the signal determination unit 106 may determine an individual identification signal received in vicinity of the image capture position of the image data. That is, the first condition that is the image capture condition can include a condition of being capable of grasping the image capture position and the second condition can include a condition of being an individual identification signal received in vicinity of the grasped image capture position. Therefore, the livestock registration system 100 can be configured to be capable of grasping a positional relationship between the reception apparatus 4 including the signal reception unit 104 and the terminal apparatus 2 including the image capture unit 102. As an example, the terminal apparatus 2 may include a position information acquisition unit (not shown) realized by a GPS communication module or the like and may further add position information of the terminal apparatus 2 (image capture position of the image data information) as metadata of the image data. In this example, in addition, the reception apparatus 4 may also include the position information acquisition unit and may add position information of the reception apparatus 4 to the individual identification signal. As another example, the terminal apparatus 2 may grasp a relative position of the reception apparatus 4 in addition to adding the above-mentioned position information to the image data by the position information acquisition unit, and may output an individual identification signal transmitted from the reception apparatus 4 belonging a predetermined position range from that terminal apparatus 2 to the server apparatus 3. In still another example, position information of each reception apparatus 4 may be stored in the terminal apparatus 3 in association with information for identifying each reception apparatus 4 in advance, and the reception apparatus 4 may transmit the information for identifying the reception apparatus 4 itself in association with the individual identification signal. With this, the signal determination unit 106 is capable of determining an individual identification signal transmitted from the reception apparatus 4 close to the image capture position.

In addition, if the first condition includes the condition of being the image capture distance at which the image of the physical feature of the target livestock animal is capable of being captured as described above, the signal determination unit 106 may determine an individual identification signal satisfying a condition of having highest signal strength or signal strength equal to or larger than a predetermined threshold among the plurality of individual identification signals.

Figure 17:
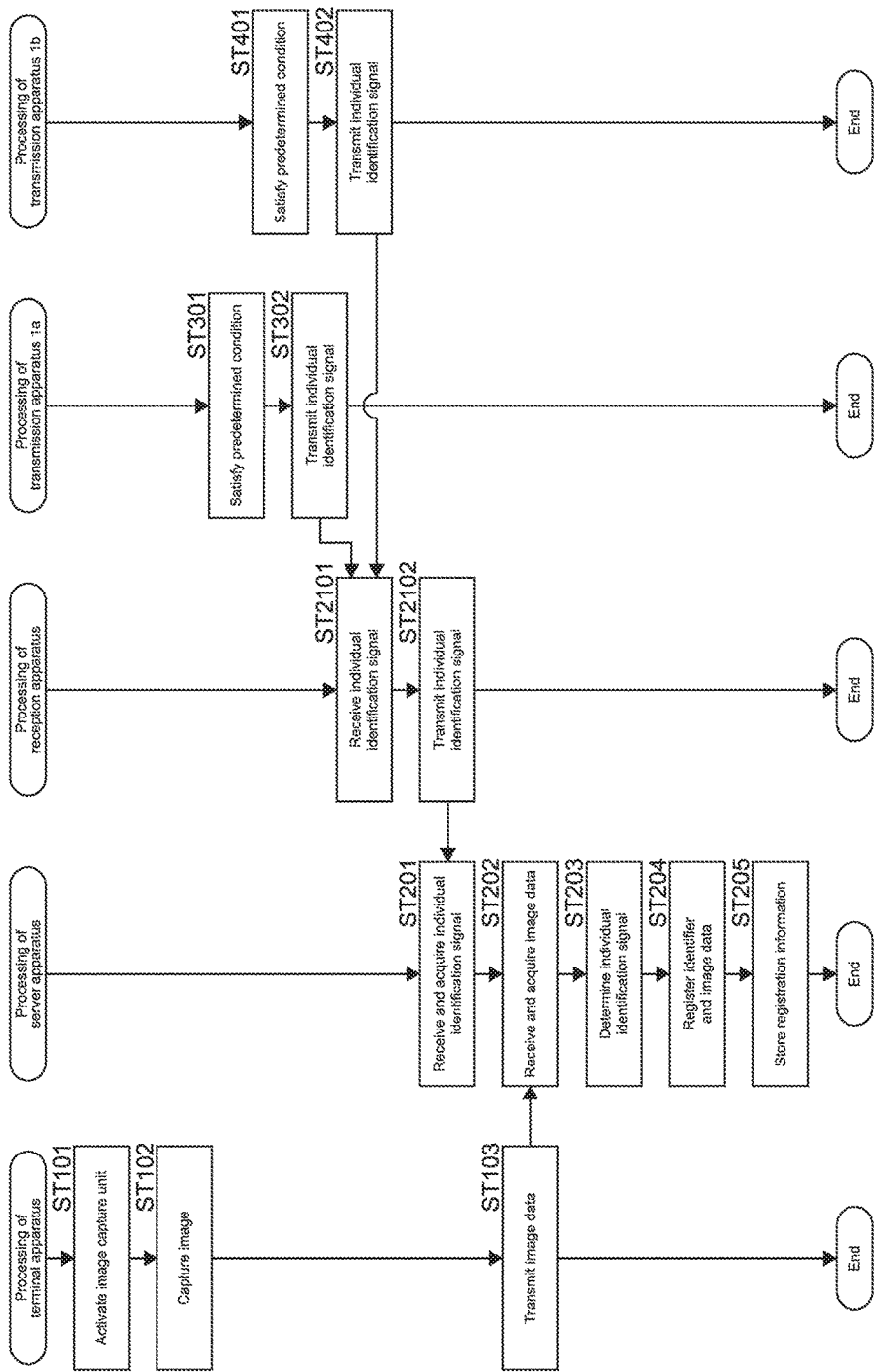
FIG. 17 A flowchart showing an operation example in the livestock registration system shown in FIG. 15.

FIG. 17 is a diagram showing an operation example of the livestock registration system 100 in this configuration example. As shown in the figure, after the transmission apparatuses 1a, 1b transmit individual identification signals (ST302, ST402), the reception apparatus 4 receives those individual identification signals (ST2101), and transmits, to the server apparatus 3, the individual identification signals to which the information about the communication time or the like is added (ST2102). The reception apparatus 4 may transmit the received individual identification signal to the server apparatus 3 every time it is received or may store a plurality of individual identification signals and transmit them together under a predetermined condition. This predetermined condition may be, for example, a predetermined time interval or may relate to the number of individual identification signals.

On the other hand, the terminal apparatus 2 activates the image capture unit 101 (ST101), and an image of a target livestock animal is captured under the above-mentioned first condition (ST102). After that, it transmits, to the server apparatus 3, the information about the image capture time and the image data to which the position information of the terminal apparatus 2 or the like is added as metadata (ST103).

The server apparatus 3 receives and acquires, from the reception apparatus 4, the information about the communication time and the individual identification signal to which the position information of the reception apparatus 4 or the like is added (ST201), and receives and acquires the information about the image capture time and the image data to which the position information of the terminal apparatus 2 or the like is added (ST202). Subsequently, the signal determination unit 106 of the server apparatus 3 determines an individual identification signal satisfying the above-mentioned second condition related to the first condition (ST203). For example, the signal determination unit 106 executes one or more of determination processes below or a combination of the determination processes below as the determination processing.

(a) determination of an individual identification signal to which the information about the communication time included in a predetermined time range based on the image capture time of the image data is added (b) determination of a reception apparatus 4 satisfying a condition that (1) the position of the reception apparatus 4 is closest to the image capture position of the image data or (2) the position of the reception apparatus 4 is within a predetermined position range based on the image capture position of the image data and determination of an individual identification signal received by the determined reception apparatus 4 (in this processing, by using the above-mentioned image capture position of the image data information, the position information of the reception apparatus 4, information for identifying the reception apparatus 4 associated with the individual identification signal, and the like, determination of the reception apparatus 4 and the individual identification signal received by the reception apparatus 4 is performed)

(c) determination of an individual identification signal of a plurality of individual identification signals, which has highest signal strength or signal strength equal to or larger than a predetermined threshold The registration unit 107 of the server apparatus 3 registers the determined individual identification signal and the image data in association with each other (ST204), and the registration information storage unit 109 stores the registration information (ST205). With this, the registration processing ends.

With this, load on the terminal apparatus 2 can be reduced.

Modified Example 1-8: Modified Example Further Including Relay Apparatus

Figure 18:
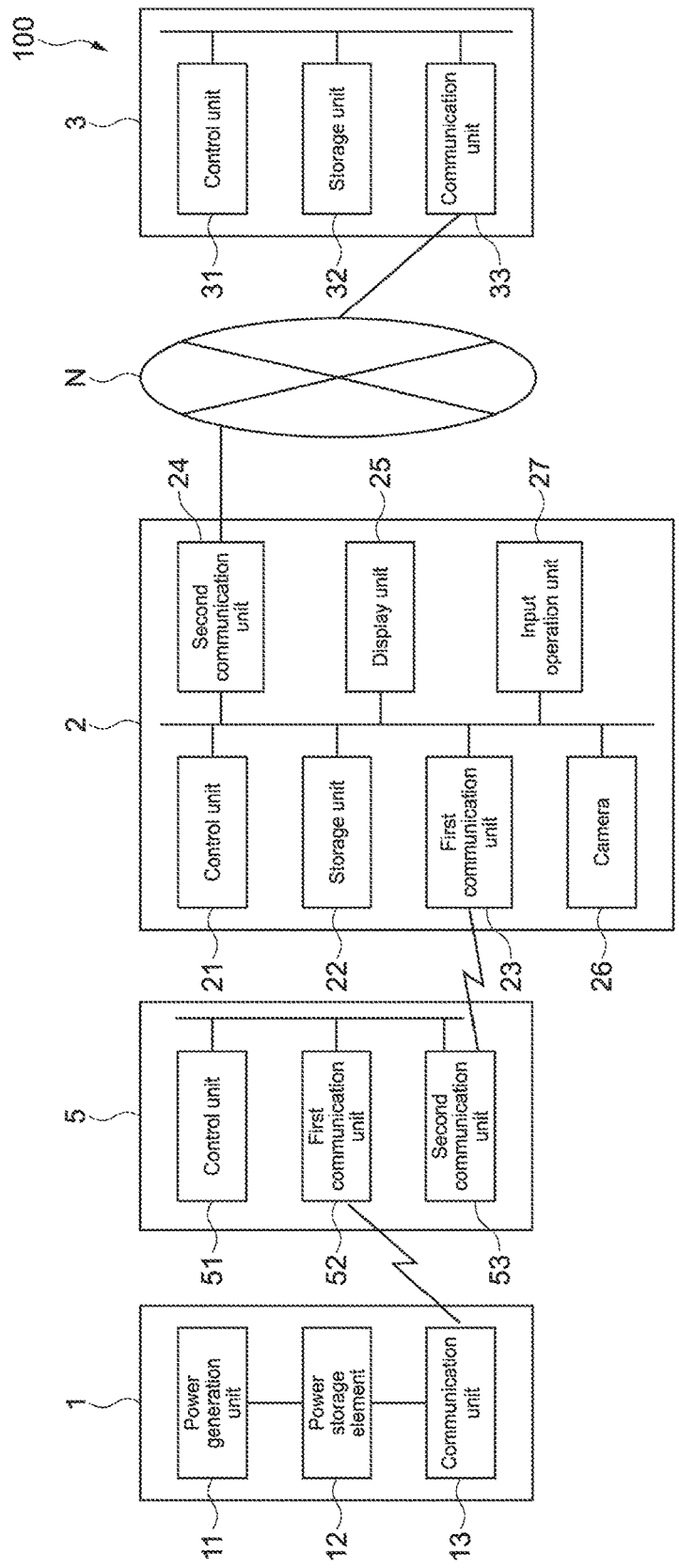
FIG. 18 A block diagram showing a hardware configuration of a livestock registration system according to Modified Example 1-8.

FIG. 18 is a block diagram showing a hardware configuration of the livestock registration system 100 according to this modified example.

As shown in the figure, the livestock registration system 100 may include one or more relay apparatuses 5 that output the individual identification signal output from the transmission apparatuses 1 to the signal reception unit 104.

The relay apparatus 5 may have, for example, a schematic configuration similar to that of the transmission apparatus 1 and may be configured as a tag that can be attached to a livestock animal. Further, the relay apparatus 5 may be a portable information terminal different from the terminal apparatus 2 or may be a dedicated communication apparatus.

The relay apparatus 5 includes, for example, a control unit 51, a first communication unit 52, and a second communication unit 53.

The control unit 51 controls the first communication unit 52 and the second communication unit 53, and is realized by, for example, a CPU.

The first communication unit 52 is configured to be capable of communicating with the communication unit 13 of the transmission apparatus 1 or another relay apparatus 5. The first communication unit 42 has a configuration capable of, for example, communication utilizing electromagnetic waves or infrared rays, wireless communication such as communication utilizing an electric field or acoustic waves, or wired communication.

The second communication unit 53 can employ a communication method similar to that of the communication unit 13 of the transmission apparatus 1.

Here, if there are a plurality of transmission apparatuses 1 near the signal determination unit 106, there is a possibility that it is difficult for the signal determination unit 106 to determine a communication distance on the basis of the signal strength.

In view of this, by using a plurality of relay apparatuses 5, the communication distance between the transmission apparatus 1 and the terminal apparatus 2 can be accurately calculated in the following manner.

Figure 19:
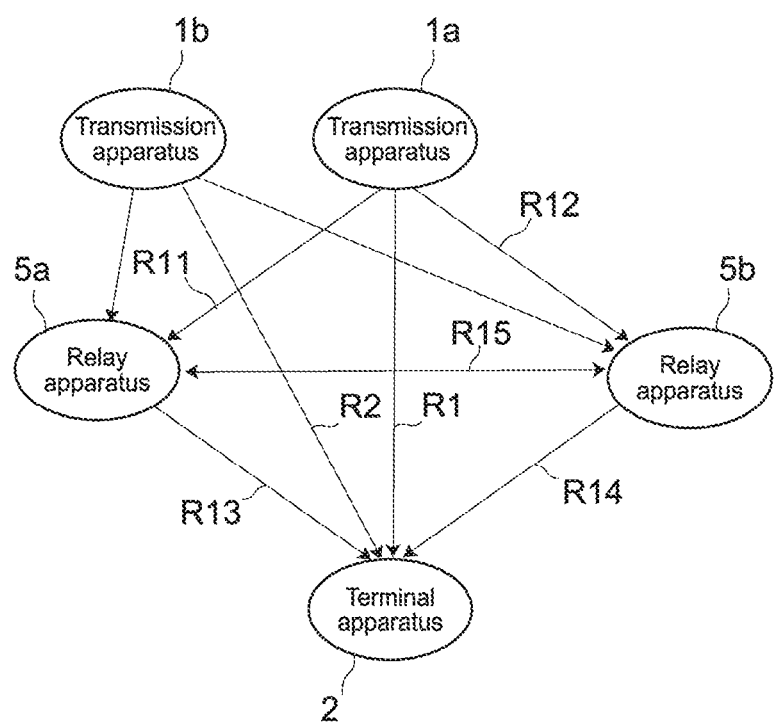
FIG. 19 A diagram schematically showing a positional relationship between the respective apparatuses of the livestock registration system shown in FIG. 18.

FIG. 19 is a diagram schematically showing a positional relationship among a plurality of transmission apparatuses 1a, 1b, a plurality of relay apparatuses 5a, 5b, and the terminal apparatus 2. In this example, it is assumed that the transmission apparatus 1a is attached to a target livestock animal and the transmission apparatus 1b is attached to another livestock animal.

On the basis of the signal strength of the individual identification signal received from the transmission apparatus 1a, the relay apparatuses 5a, 5b respectively calculate distances R11, R12 from the transmission apparatus 1a and a distance R15 between the relay apparatuses 5a, 5b. In addition, the relay apparatuses 5a, 5b each transmit the individual identification signal, to which the calculated distance information is added, to the terminal apparatus 2.

The signal determination unit 106 of the terminal apparatus 2 calculates each of distances R13, R14 between the terminal apparatus 2 and the relay apparatuses 5a, 5b on the basis of the signal strength of the individual identification signals acquired from the relay apparatuses 5a, 5b. Then, the signal determination unit 106 is capable of calculating, on the basis of the calculated distances R11, R12, R13, R14, R15, a communication distance R1 from the transmission apparatus 1a by using triangulation. Similarly, the signal determination unit 106 is also capable of calculating a communication distance R2 from the transmission apparatus 1b when the individual identification signal is output.

In accordance with this modified example, the signal determination unit 106 is capable of accurately calculating the communication distance. Therefore, also in a place where many livestock are present, more correct registration processing becomes possible.

Note that the network form employed by the livestock registration system 100 is not limited to the example shown in FIG. 19. The livestock registration system 100 can include one or more transmission apparatuses 1, one or more relay apparatuses 5, one or more reception apparatuses 4, and one or more terminal apparatuses 2. The plurality of transmission apparatuses 1 and the plurality of reception apparatuses 4 may be configured to perform communication in a one-to-one relationship or may be configured to perform communication in a one-to-many relationship. Alternatively, the network may be configured such that the one or more relay apparatuses 5 are interposed in communication from the reception apparatus 4 to the terminal apparatus 2. In this case, as shown in FIG. 19, regarding the layer of the relay apparatuses 5, it may be a configuration to be a single phase or may be a configuration to be continuous multiple phases.

If the network form in which the relay apparatuses 5 are interposed as multiple phases is employed, their functions may vary depending on the positions of the relay apparatuses 5 in the network. For example, a relay apparatus 5 that directly communicates with the terminal apparatus 2 is set to a "master" and other relay apparatuses 5 may be set to "repeaters", and a repeater may function to transfer received data to another repeater or the master by broadcasting, Peer to Peer, or another method.

The network configuration of the livestock registration system 100 can include an apparatus other than the one or more transmission apparatuses 1, the one or more relay apparatuses 5, the one or more reception apparatuses 4, and the one or more terminal apparatuses 2 which are described above. Further, a communication form between these apparatuses can also employ broadcasting, Peer to Peer, or another method. Data may be transmitted and received by relay. As another configuration, data may be divided into packets and transmitted to different relay apparatuses 5, and the packets passing through various routes may be restored into the original data by the terminal apparatus 2. The network configuration or the network form of the livestock registration system 100 can include another apparatus and further can employ any form.

Modified Example 1-9: Modified Example Regarding Image Capture Unit

Figure 20:
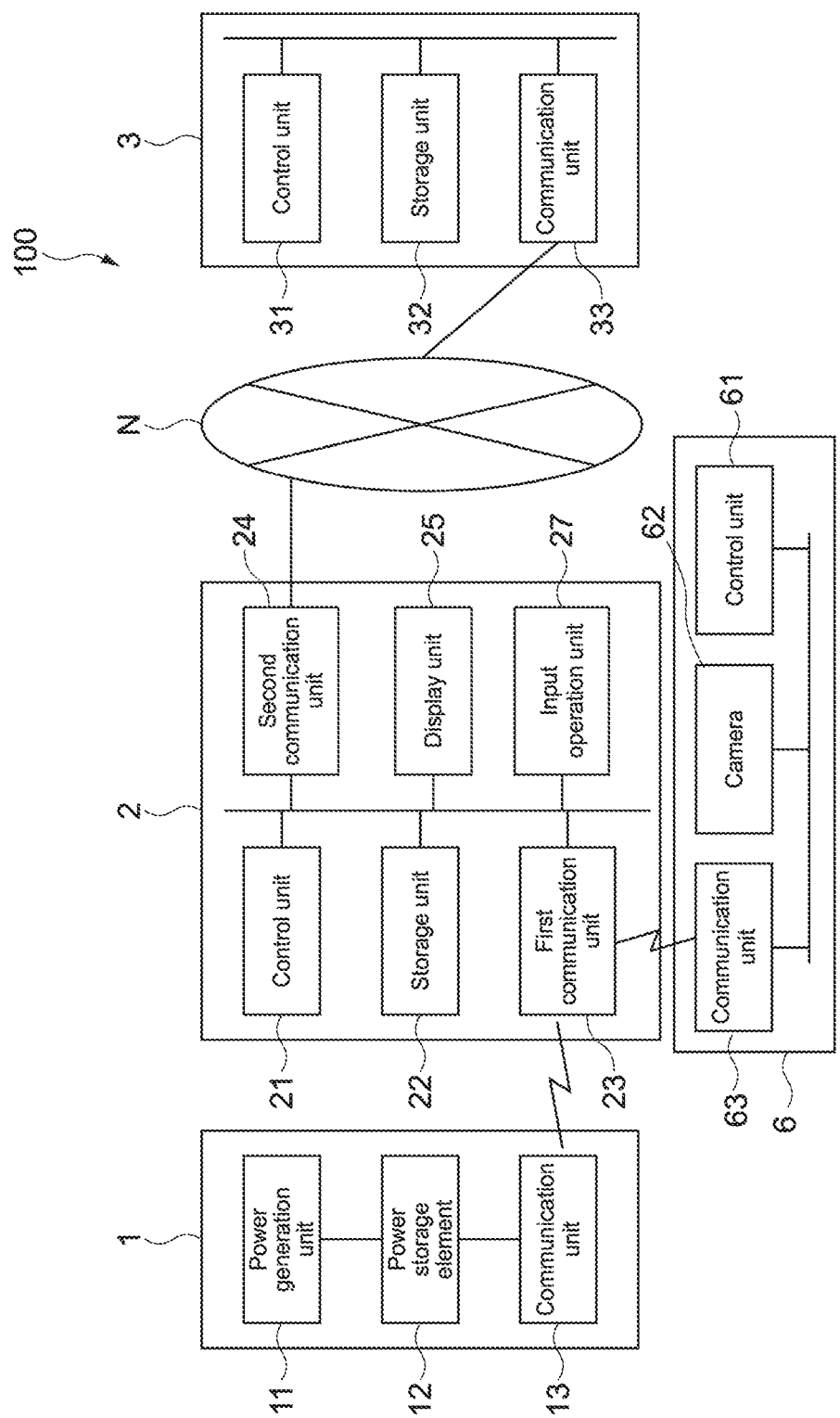
FIG. 20 A block diagram showing a hardware configuration of a livestock registration system according to Modified Example 1-9.

FIG. 20 is a block diagram showing a hardware configuration of the livestock registration system 100 according to this modified example.

In the above-mentioned embodiment, the image capture unit 102 is included in the terminal apparatus 2. However, the image capture unit 102 may be included in an image capture apparatus 6 separate from the terminal apparatus 2. The image capture apparatus 6 may be a portable information terminal different from the terminal apparatus 2 or may be a dedicated image capture apparatus.

The image capture apparatus 6 includes, for example, a control unit 61, a camera 62, and a communication unit 63.

The control unit 61 controls the camera 62 and the communication unit 63, and is realized by, for example, a CPU.

The camera 62 is capable of obtaining image data from a light image of an object. Specifically, the camera 62 may include an imaging optical system and an image sensor (not shown). The imaging optical system forms the light image of the object on an imaging plane of the image sensor. The image sensor is realized by a CCD (Charge Coupled Device) sensor, a CMOS (Complementary Metal Semiconductor) sensor, or the like. The image sensor converts the formed light image into electrical signals and obtains image data.

The communication unit 63 is configured to be capable of communicating with the first communication unit 23 of the terminal apparatus 2. The communication unit 63 may have a configuration capable of, for example, communication utilizing electromagnetic waves or infrared rays, wireless communication such as communication utilizing an electric field or acoustic waves, or wired communication or the like. With this, the image capture apparatus 6 is placed near the terminal apparatus 2 and the signal acquisition unit 105 is capable of acquiring a plurality of individual identification signals received in vicinity of the image capture position of the image data.

Note that the image capture apparatus 6 may further include a storage unit such as a RAM and a ROM (not shown).

In this modified example, the terminal apparatus 2 does not need to include the camera 26, as shown in the figure, or may include the camera 26.

Modified Example 1-10: Another Modified Example Regarding Hardware Configuration of Livestock Registration System The livestock registration system 100 only needs to at least one information processing apparatus (in the above-mentioned example, the terminal apparatus 2 or the server apparatus 3) in which a livestock registration app for executing the above-mentioned registration processing is installed, as a registration apparatus. That is, a generally-used apparatus and an apparatus controlled by the registration apparatus can be employed as the transmission apparatus, the reception apparatus, and the image capture apparatus, and the like.

Modified Example 1-11: Modified Example Regarding Image Data

The image capture unit 102 may be configured to be capable of capturing moving-image data. In this case, the "image data" can also be the moving-image data itself or can also a single frame of the moving-image data. If the image data is a single frame of the moving-image data, the image data acquisition unit 103 is capable of acquiring a frame of moving-image data obtained by capturing an image of a target livestock animal under the first condition, as the image data.

Modified Example 1-12: Modified Example Including Feature Data Extraction Processing As will be described below, processing of extracting feature data may be further executed as processing for matching.

Figure 21:
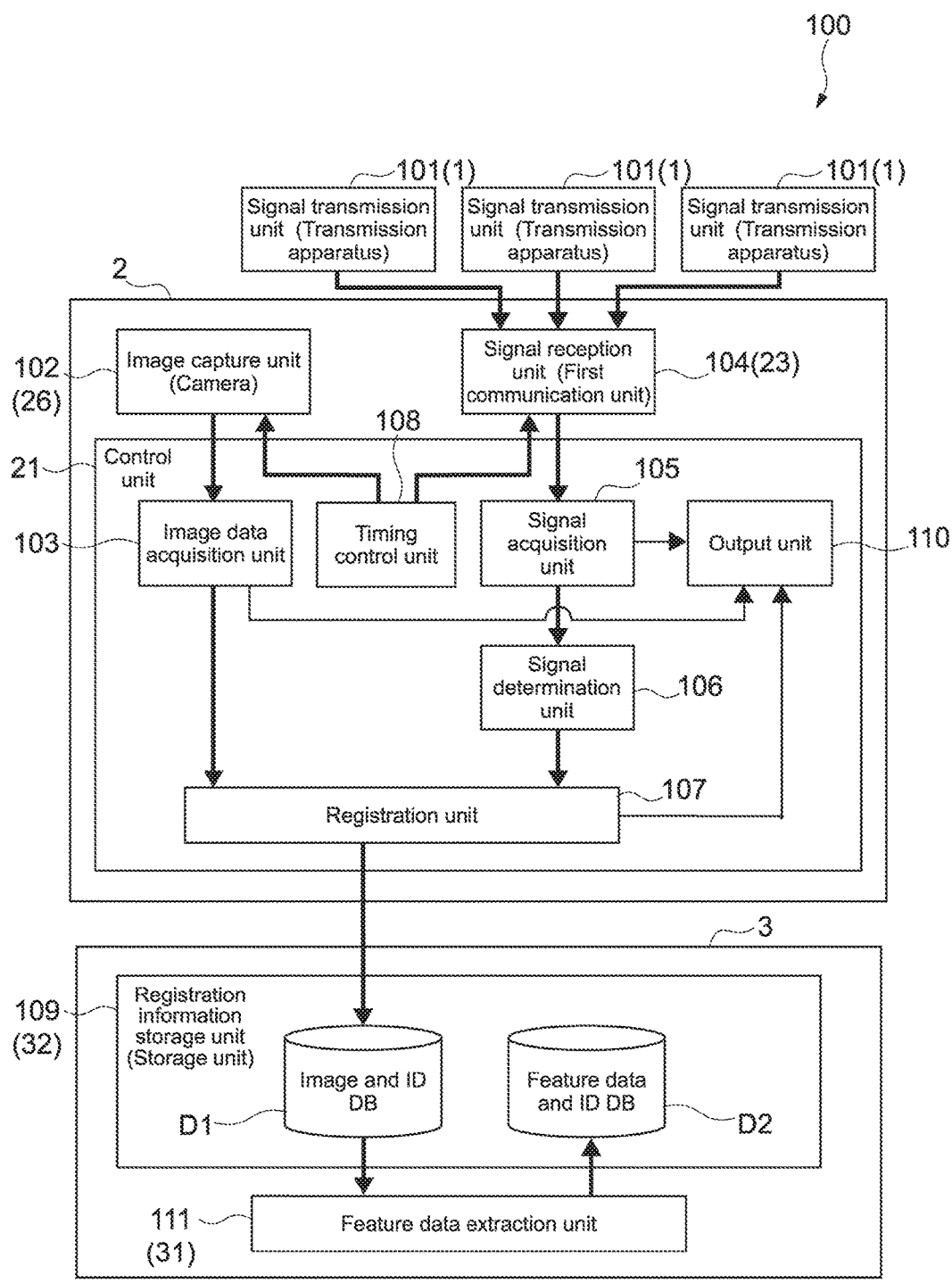
FIG. 21 A block diagram showing functional configurations and a flow of processing of a livestock registration system according to Modified Example 1-12.

FIG. 21 is a block diagram showing functional configurations of the livestock registration system 100 according to this modified example.

As shown in the figure, the livestock registration system 100 includes, as the functional configurations, the plurality of signal transmission units 101, the image capture unit 102, the image data acquisition unit 103, the signal reception unit 104, the signal acquisition unit 105, the signal determination unit 106, the registration unit 107, the timing control unit 108, the registration information storage unit 109, the output unit 110, and further, a feature data extraction unit 111.

The feature data extraction unit 111 is realized by, for example, the control unit 31 of the server apparatus 3, and extracts feature data of image data included in the registration information.

The feature data is data that can be used in the image recognition, and typically includes a feature quantity of the image data. For example, a Sift feature quantity, a Surf feature quantity, a Hog feature quantity, or the like can be employed as the feature quantity. Further, instead of or in addition to the feature quantity, the feature data may include, for example, a pattern of a target livestock animal, coordinate information of parts such as an eye, a nose, and a mouth, information regarding color, and the like. For example, the feature data may include data about a mottled pattern of a body surface, which is a living body texture of the body of a livestock animal, and a muzzle pattern.

Further, the registration information storage unit 109 of the server apparatus 3 stores a feature data and ID database D2. The feature data and ID database D2 is capable of storing the feature data extracted from the image data and an identifier corresponding to that image data in association with each other.

Figure 22:
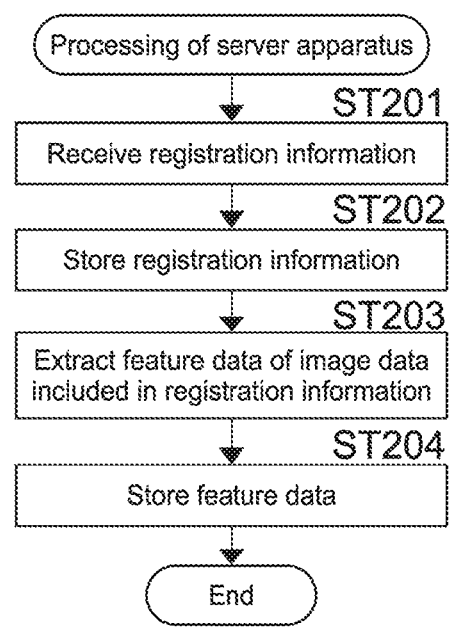
FIG. 22 A flowchart showing an operation example in a server apparatus shown in FIG. 21.

FIG. 22 is a flowchart showing an operation example in the server apparatus 3 of this modified example. Note that the processing (ST101 to ST110) of the terminal apparatus 2 and the processing (ST301 to ST302, ST401 to ST402, ST501 to ST502) of each of the transmission apparatuses 1a, 1b, 1c are similar to those of FIG. 4. Therefore, illustrations and descriptions thereof will be omitted.

As in FIG. 4, after receiving (ST201) and storing (ST202) the registration information, the feature data extraction unit 111 of the server apparatus 3 extracts feature data of the image data included in the registration information (ST203), and stores it in the feature data and ID database D2 of the registration information storage unit 109 in association with an identifier corresponding to the extracted feature data (ST204).

Further, other than the configuration example shown in FIG. 21, the feature data extraction unit 111 may be realized by the control unit 21 of the terminal apparatus 2.

In this case, after the processing by the registration unit 107, the feature data extraction unit 111 may extract the feature data, and this feature data may be transmitted to the server apparatus 3 and stored in the feature data and ID database D2.

Alternatively, the feature data extraction unit 111 is capable of extracting the feature data from the image data acquired by the image data acquisition unit 103 and outputting the feature data to the registration unit 107. With this, the registration unit 107 is capable of applying processing of associating the feature data of the image data with the identifier as a registration method for the image data and the identifier.

With this modified example, after registration, the matching processing can be executed by using an image recognition technique.

The matching processing using the image recognition technique will be described later in detail in a second embodiment.

Second Embodiment

Figure 23:
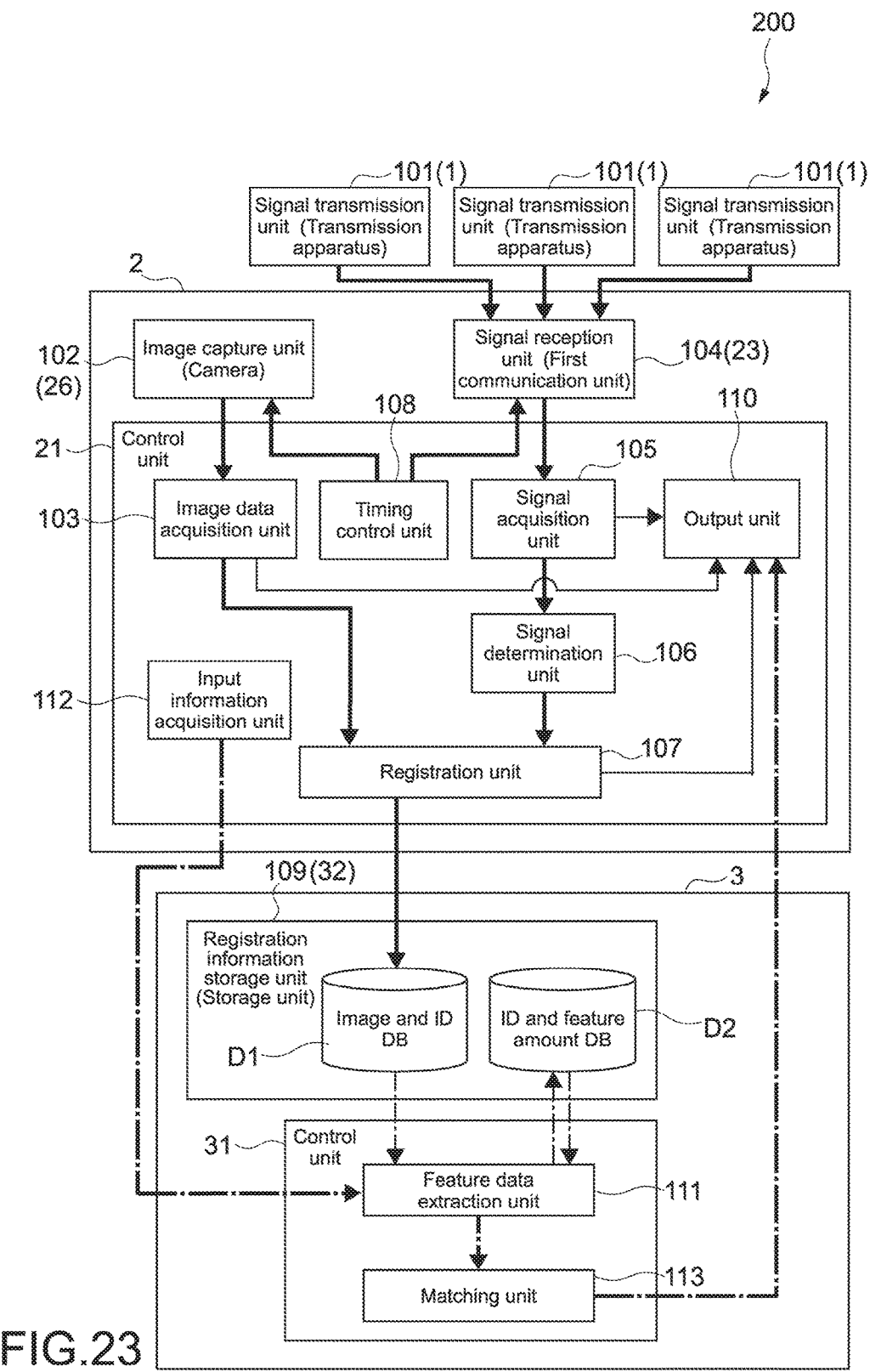
FIG. 23 A block diagram showing functional configurations and a flow of processing of a livestock registration system of a second embodiment of the present technology.

FIG. 23 is a block diagram showing functional configurations of a livestock registration system 200 according to the second embodiment of the present technology.

The livestock registration system 200 according to this embodiment is capable of executing the above-mentioned matching processing using the image recognition technique.

Note that it is assumed that the livestock registration system 200 has a hardware configuration similar to the hardware configuration of the livestock registration system 100 shown in FIG. 2. Further, in the following descriptions, configurations similar to those of the above-mentioned embodiment will be denoted by identical symbols and descriptions thereof will be omitted.

[Functional Configurations of Livestock Registration System and Outline of Processing]

As shown in FIG. 23, the livestock registration system 200 includes, as functional configurations involved in the registration processing, a plurality of signal transmission units 101, an image capture unit 102, an image data acquisition unit 103, a signal reception unit 104, a signal acquisition unit 105, a signal determination unit 106, a registration unit 107, a timing control unit 108, a registration information storage unit 109, and an output unit 110.

In addition, the livestock registration system 200 includes, as functional configurations involved in the matching processing, an input information acquisition unit 112, a feature data extraction unit 111, the registration information storage unit 109, a matching unit 113, and the output unit 110.

In FIG. 23, the solid lines schematically show a flow of registration processing and the broken lines schematically show a flow of matching processing. Further, the thick lines show a flow of main processing and the thin lines show a flow of auxiliary processing.

The functional configurations involved in the registration processing are configured to be similar to those of the first embodiment, and descriptions thereof will be omitted.

The input information acquisition unit 112 and the output unit 110 of the functional configurations involved in the matching processing are realized by, for example, the control unit 21 of the terminal apparatus 2.

The feature data extraction unit 111 and the matching unit 113 are realized by, for example, the control unit 31 of the server apparatus 3. The registration information storage unit 109 is realized by the storage unit 32.

The input information acquisition unit 112 of a terminal apparatus 2A acquires at least one of image data and information associated with an identifier, which the user wishes to match, as input information. For example, image data of the target livestock animal, which is captured by the camera 26 of the terminal apparatus 2, becomes the input information. For example, the image data of the livestock animal, which is captured by the camera of the terminal apparatus 2, becomes the input information. Examples of the information associated with the identifier may include information about an identifier input as literal characters and information about one identifier selected from a plurality of identifiers displayed in a list. The input information is, for example, input by the input operation unit 27, a speaker (not shown), or the like.

Further, the "user" may be a user who performed the registration processing or may be another user in this case.

In this embodiment, the input information acquisition unit 112 transmits the input information to the server apparatus 3 via the second communication unit 24.

In this embodiment, the feature data extraction unit 111 of the server apparatus 3 is capable of extracting feature data of image data included in at least one of the registration information and the input information.

As described above in Modified Example 1-12 (FIG. 21, FIG. 22), the feature data extraction unit 111 is capable of extracting feature data with respect to the image data included in the registration information before acquisition of the input information.

Further, if the input information includes the image data, the feature data extraction unit 111 extracts feature data also with respect to that image data.

Subsequently, the matching unit 113 performs matching between the input information and the registration information. For example, if the input information includes the image data, the matching unit 113 performs matching of the feature data of that image data with the feature data of the image data included in the registration information. Specifically, by using an image recognition technique, the matching unit 113 determines whether or not a livestock animal captured in the image data of the input information is identical to a livestock animal included in the image data of the registration information.

Alternatively, if the input information includes the information about the identifier, the matching unit 113 performs matching of that identifier against the identifier included in the registration information. Specifically, the matching unit 113 determines whether or not the identifier included in the input information corresponds to or is identical to the identifier included in the registration information. If it is determined that the identifier included in the input information corresponds to or is identical to the identifier included in the registration information, the matching unit 113 performs matching between them.

The matching result is transmitted to the terminal apparatus 2 via the communication unit 33 of the server apparatus 3 and the second communication unit 24 of the terminal apparatus 2. The output unit 110 outputs the matching result to the display unit 25 or the like.

Operation Example

Subsequently, a specific operation example of the matching processing will be described.

Figure 24:
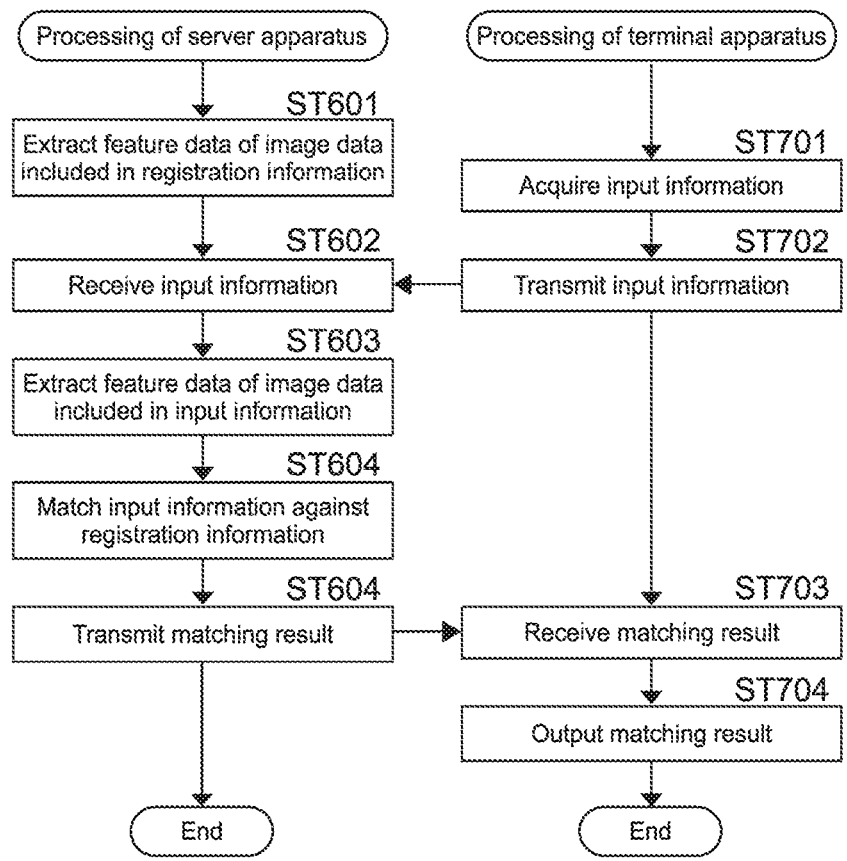
FIG. 24 A flowchart showing an operation example of the livestock registration system shown in FIG. 23.

FIG. 24 is a flowchart showing an operation example of the matching processing of the livestock registration system 200. In this operation example, an example in which image data is input into the terminal apparatus 2A as the input information and matching between image data included in the input information and the image data included in the registration information is performed will be described.

Note that, in the figure, processing of ST601 to ST604 is executed by the server apparatus 3, and processing of ST701 to ST704 is executed by the terminal apparatus 2.

First, the feature data extraction unit 111 of the server apparatus 3 extracts feature data of the image data included in the registration information (ST601). The extracted feature data is stored in the feature data and ID database D2 of the registration information storage unit 109, as described above.

On the other hand, the input information acquisition unit 112 of the terminal apparatus 2 acquires input information, which the user wishes to match (ST701). The image data acquired as the input information may be image data captured by the camera 26 or may be selected among pieces of image data stored in the storage unit 22.

Figure 25A:
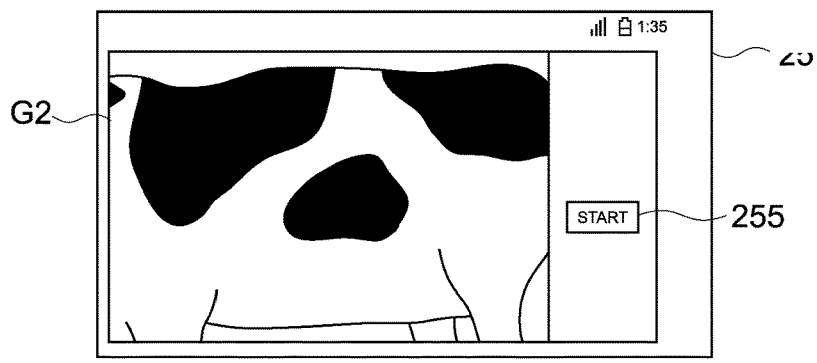
FIGS. 25A, 25B, 25C, and 25D Diagrams showing an example of image data displayed on a display unit of a terminal apparatus in the operation example of FIG. 24.

FIG. 25A shows a display example of image data, which the user wishes to match. In the example shown in the figure, the user checks if image data G2, which the user wishes to match, is displayed on the display unit 25, and taps a matching start button 255, such that that image data is acquired as the input information.

The terminal apparatus 2 transmits the input information to the server apparatus 3 via the second communication unit 24 (ST702).

The server apparatus 3 receives the transmitted input information (ST602). The feature data extraction unit 111 extracts feature data of the image data included in the input information (ST603).

Subsequently, on the basis of the feature data of the image data included in the input information and the extracted feature data, the matching unit 113 of the server apparatus 3 performs matching of the image data included in the input information against the image data included in the registration information (ST604).

In this operation example, by using a predetermined algorithm, the matching unit 113 performs matching of the image data included in the input information against the image data included in the registration information.

The predetermined algorithm is generated by, for example, machine learning and stored in the storage unit 32 of the server apparatus 3. The machine learning may be supervised machine learning or may be unsupervised learning such as deep learning. That algorithm may be generated by the control unit 31 of the server apparatus 3 or may be generated by another information processing apparatus.

With the supervised machine learning, this algorithm is generated by referring to teaching data.

The teaching data is a data set including sample feature data extracted from the sample image data and actual data that is the feature data extracted from the image data included in the registration information. The teaching data may be stored in the storage unit 32 of the server apparatus 3 or may be stored in a database via the network N, which can be referred to by the server apparatus 3.

It is assumed that the sample image data set forth herein is image data in which an image of a part of the registered livestock animal is captured and refers to image data on which algorithm generation is based.

Further, registration information used in the actual data is registration information of a livestock animal captured in the sample image data.

Figure 25B:
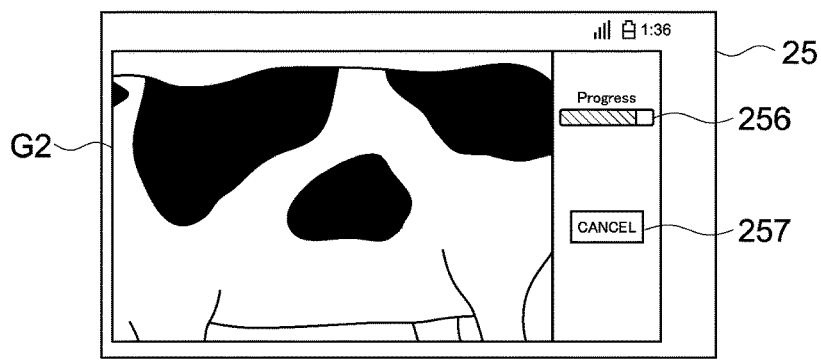

During matching by the server apparatus 3, as shown in FIG. 25B, a bar 256 indicating the rate of progression of the matching processing may be displayed on the display unit 25 or a cancel button 257 that receives an input operation to cancel the processing may be displayed.

Subsequently, the server apparatus 3 transmits the matching result to the terminal apparatus 2 (ST604). The terminal apparatus 2 receives the matching result (ST703).

Lastly, the output unit 110 outputs the matching result to the display unit 25 or the like (ST704).

Figure 25C:
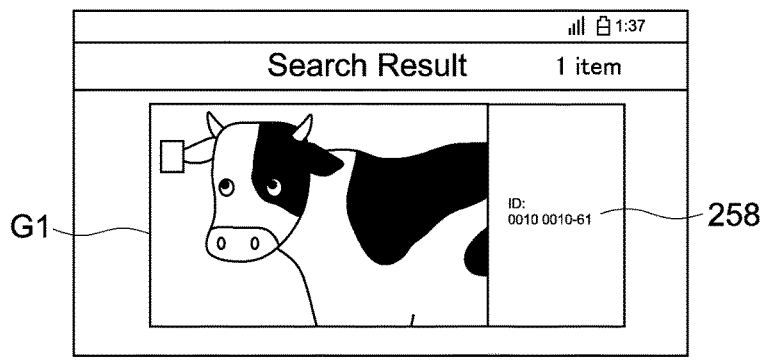

FIG. 25C shows a display example of the matching result.

For example, the image data G1 included in the registration information and the information 258 about the identifier corresponding thereto are displayed as the matching result on the display unit 25.

With this, the user who performed the matching processing can acquire the registration information of a livestock animal wished to be matched.

Figure 25D:
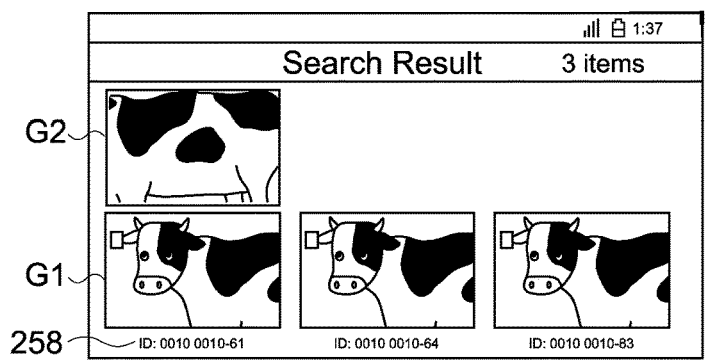

Note that, although a screen in a case where the matching result based on the image data is a single individual is illustrated in FIG. 25C, the matching result output by the matching unit 113 may be a plurality of individuals. In that case, images and information of the plurality of individuals may be presented by a method, for example, arranging and displaying them at the same time. FIG. 25D shows a display example in such a case.

Further, in the above-mentioned matching processing, image data obtained by capturing an image of a part of the individual livestock animal or the entire individual livestock animal may be the input information and processing of performing automatic recognition of an image may be used for narrowing candidates. One of the narrowed candidates, which has high radio-wave strength of the individual identification signal, may be configured to be output as a final matching result. Further, reversing this order, a configuration in which an individual identification information having high radio-wave strength is narrowed and then candidates are determined by image automatic recognition may be employed. As a filter used for determination of an individual livestock animal, in addition to the image automatic recognition and radio-wave strength of the individual identification signal, check-in information (information in which the time information is associated with information indicating that a livestock animal enters/exits to/from a barn or the like), procedure history, and the like can also be used for the filter. These conditions may be provided and step-wise narrowing may be manually or automatically performed. With such step-wise narrowing, high-speed determination and highly accurate determination become possible.

As described above, in accordance with this embodiment, even if there is a livestock animal from which the transmission apparatus 1 or the ear-tag has been detached, the information about the identifier can be acquired by capturing an image of that livestock animal, for example.

Modified Example of this Embodiment

Modified Example 2-1: Modified Example Regarding Matching Result

The identifier can be specific to the transmission apparatus 1 as described above. Therefore, in some cases, it is not identical to an identification number (hereinafter, referred to as universal identification number) described in the ear-tag or the like of the livestock animal. In this case, also if the identifier is presented as the matching result, there is also a possibility that it becomes difficult for the user to search for a targeted livestock animal.

In view of this, if the identifier is not identical to the universal identification number, the matching unit 113 is capable of referring to an identification information database (not shown) corresponding to the identifier included in the registration information and the universal identification number and further matching the universal identification number corresponding to the matched identifier. With this, the matching unit 113 is capable of outputting the universal identification number corresponding to that identifier instead of or in addition to the identifier, as the matching result.

Alternatively, the registration unit 107 may refer to the above-mentioned identification information database or the like and register, in addition to the identifier, the universal identification number corresponding to that identifier as the registration information.

With this modified example, the convenience of the user can be further enhanced.

Modified Example 2-2: Modified Example Regarding Matching Processing of Information Associated with Identifier For example, the input information acquisition unit 112 may acquire the information associated with the identifier. In this case, the matching unit 113 may match the identifier included in the input information against the identifier included in the registration information.

Further, if the identifier is different from the universal identification number, the input information acquisition unit 112 may acquire information about the universal identification number that can correspond to the identifier, as the information associated with the identifier. In this case, the matching unit 113 is capable of matching the information of the universal identification number included in the input information against the identifier included in the registration information or the information about the universal identification number.

Further, if the universal identification number described in the ear-tag is captured in the image data included in the input information, the matching unit 113 is capable of recognizing this universal identification number from that image data by using a literal-character recognition technology and matching the recognized universal identification number against the identifier included in the registration information or the universal identification number. With this, the matching unit 113 is capable of executing the matching processing not only on the image data but also on the information associated with the identifier and is capable of executing matching processing with higher accuracy.

Modified Example 2-3: Modified Example Regarding Cooperation with External Database The livestock registration system 200 may refer to an external database that stores identification information of a livestock animal and management information of that livestock animal in association with each other and also output the information stored in this external database as the matching result. That external database may be connected to the server apparatus 3 via the network N or a part of that external database may be downloaded into the storage unit 32 of the server apparatus 3.

In the external database, for example, management information of milk quantity, milk quality, breeding records, clinical history information, and the like of each livestock animal is stored in association with the universal identification information of the livestock animal.

For example, the matching unit 113 is capable of requesting the external database to provide the management information of the livestock animal corresponding to the extracted identifier as the matching result and acquiring the management information. For example, the matching unit 113 may acquire the management information on the basis of the user's input operation or may automatically acquire the management information.

Further, if the universal identification information registered in the external database is identical to the extracted identifier as the matching result, the matching unit 113 is capable of further referring to the above-mentioned identification information database.

Modified Example 2-4: Modified Example Regarding Extraction of Feature Data

Extraction of the feature data of the image data included in the registration information may be executed in continuous with the registration processing as described above in Modified Example 1-12 or may be carried out separately from the registration processing.

Further, the feature data extraction unit 111 may be realized by not the control unit 31 of the server apparatus 3 but the control unit 21 of the terminal apparatus 2. With this, for example, the terminal apparatus 2 may extract the feature data of the image data included in the registration information and transmit it to the server apparatus 3, and it may be stored in the feature data and ID database D2. Further, in the matching processing, the terminal apparatus 2 may extract the feature data of the image data included in the input information and may transmit it to the server apparatus 3.

Alternatively, the terminal apparatus 2 may include a first feature data extraction unit and the server apparatus 3 may include a second feature data extraction unit. With this, for example, the server apparatus 3 may extract the feature data of the image data included in the registration information and the terminal apparatus 2 may extract the feature data of the image data included in the input information.

Modified Example 2-5: Modified Example Regarding Matching Algorithm Generation

If the matching unit 113 executes matching processing by using an algorithm generated by supervised machine learning, the feature data used in actual matching processing can be accumulated as teaching data. Specifically, the feature data of the image data of each of the input information and the registration information can be accumulated as each of the sample feature data and the actual data. With this, load for generating the algorithm before shipment of the system can be reduced.

For example, whether or not the feature data of the image data of each of the input information and the registration information is appropriate as the data set of the sample feature data and the actual data can be determined on the basis of user's evaluation and only the data set determined as being appropriate can be accumulated as the teaching data.

Specifically, after the matching result is output (see ST704 of FIG. 24 and FIG. 25C), the matching unit 113 receives the user's evaluation of the matching result.

If the user authenticates the matching result, the feature data of the image data of each of the input information and the registration information which have been used in that matching processing is determined as being appropriate as the above-mentioned data set and accumulated as the teaching data.

On the other hand, if the user determines that the livestock animal captured in the image data of the input information is different from the livestock animal associated with the matching result, an input operation to reject that matching result is performed. If the user rejects the matching result, the feature data of the image data of each of the input information and the registration information which have been used in that matching processing is determined as being inappropriate as the data set of the sample feature data and the actual data and is not accumulated as the teaching data.

With this, a more accurate algorithm can be generated by repeating the matching processing.

Note that the user's evaluation itself may be performed by an automation tool or software, for example, artificial intelligence and an automatic algorithm or the like conforming thereto.

Modified Example 2-6: Modified Example Regarding Terminal Apparatus

In the above description, the terminal apparatus used in the matching processing is the terminal apparatus 2 that has executed the registration processing. However, it may be a terminal apparatus other than the terminal apparatus 2 connected to the server apparatus 3 via the network N. This terminal apparatus may install the livestock registration app and be configured to be capable of the registration processing or may be configured to be capable of performing only the matching processing.

With this, many terminal apparatuses can perform the matching processing. Thus, for example, also if a livestock animal escapes from stock-raising facilities, individual identification can be performed also by a person other than a stock-raising farmer.

Third Embodiment

Figure 26:
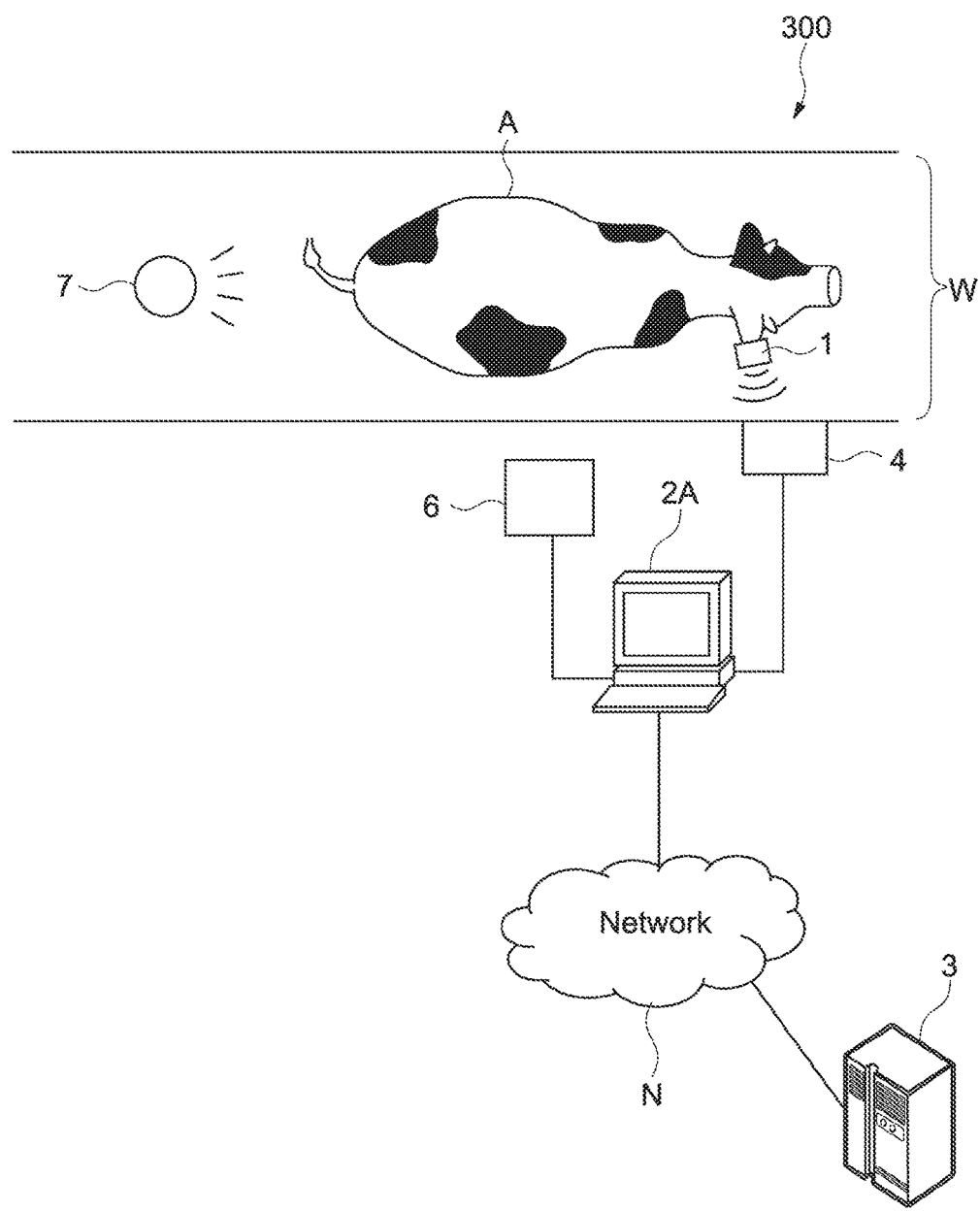
FIG. 26 A schematic diagram showing a configuration example of a livestock registration system according to a third embodiment of the present technology.

FIG. 26 is a schematic diagram showing one configuration example of a livestock registration system 300 according to the third embodiment of the present technology.

If the surrounding environment of a target livestock animal is an environment in which power generation can be performed by the power generation unit 11 of the transmission apparatus 1 during image capture, the livestock registration system 300 determines an individual identification signal characteristic of that environment, to thereby perform the registration processing.

Note that, in the following descriptions, configurations similar to those of the above-mentioned embodiments will be denoted by identical symbols and descriptions thereof will be omitted.

As shown in FIG. 26, the livestock registration system 300 includes transmission apparatuses 1, a terminal apparatus 2A, a server apparatus 3, a reception apparatus 4, and an image capture apparatus 6. In the example shown in FIG. 26, the reception apparatus 4 and the image capture apparatus 6 are arranged around a passage W through which a target livestock animal A can pass.

It is assumed that the passage W is, for example, a passage through which livestock animals can pass one by one in one direction. In the passage W, a lighting apparatus 7 is placed. The lighting apparatus 7 is capable of radiating light to the target livestock animal A whose image is to be captured. The power generation unit 11 of the transmission apparatus 1 is configured to be capable of performing power generation by this light radiation.

The image capture apparatus 6 captures an image of the one livestock animal A of the plurality of livestock animals, which is passing through the passage W. The reception apparatus 4 receives an individual identification signal output from the transmission apparatus 1 attached to the livestock animal A.

The terminal apparatus 2A is an information processing apparatus connected to the reception apparatus 4 and the image capture apparatus 6 in a wired or wireless manner. The terminal apparatus 2A is, for example, a PC, a smartphone, a tablet terminal, or the like. As in the terminal apparatus 2, the terminal apparatus 2A is connected to the server apparatus 3 via the network N.

Note that the hardware configurations of the terminal apparatus 2A, the image capture apparatus 6, and the reception apparatus 4 are similar to those of the terminal apparatus 2 shown in FIG. 20, the image capture apparatus 6 shown in FIG. 20, and the reception apparatus 4 shown in FIG. 14, respectively. Therefore, descriptions thereof will be omitted.

Figure 27:
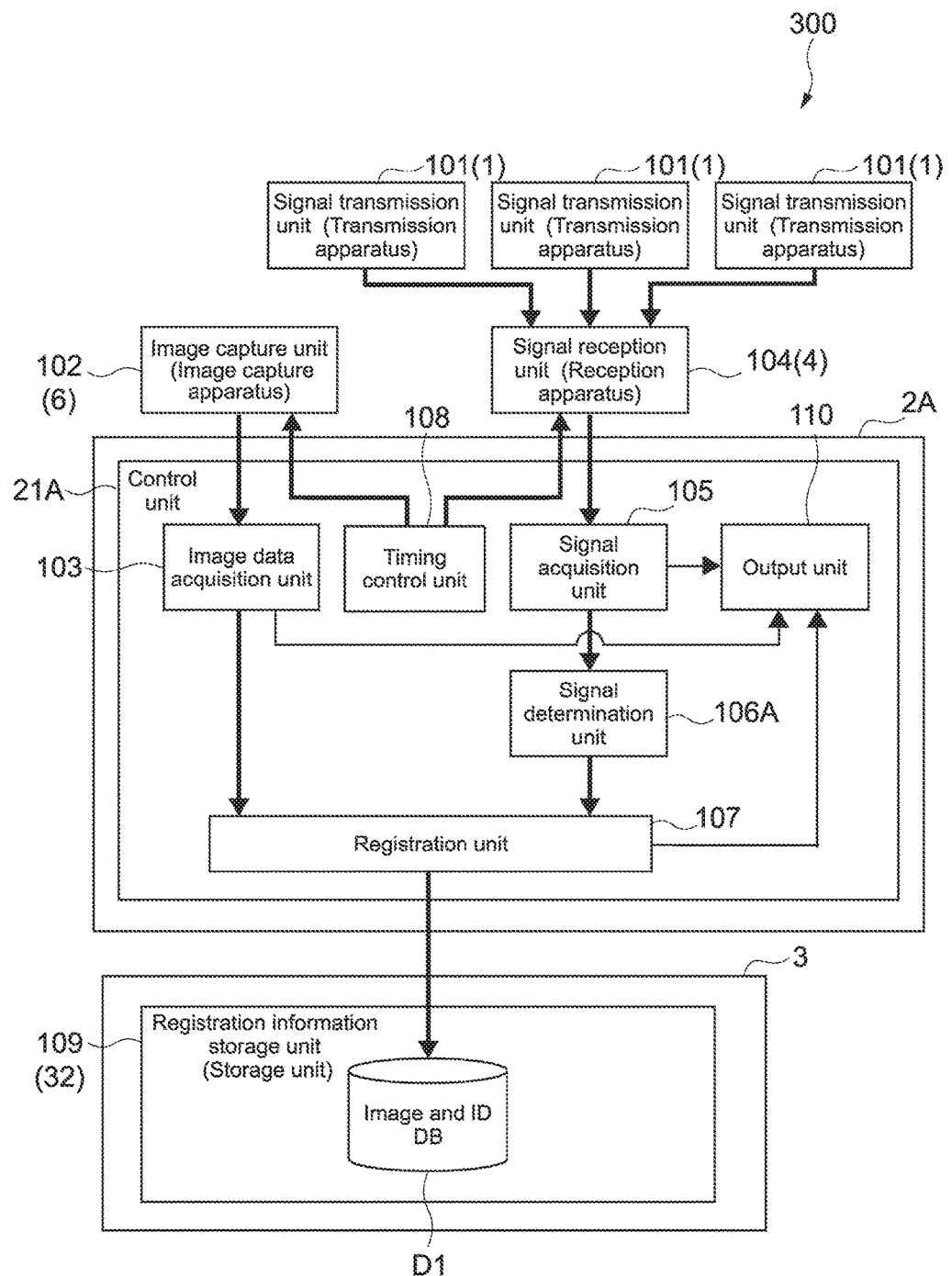
FIG. 27 A block diagram showing functional configurations and a flow of processing of the livestock registration system shown in FIG. 26.

FIG. 27 is a block diagram showing functional configurations of the livestock registration system 300.

As shown in the figure, the livestock registration system 300 includes a plurality of signal transmission units 101, an image capture unit 102, an image data acquisition unit 103, a signal reception unit 104, a signal acquisition unit 105, a signal determination unit 106A, a registration unit 107, a registration information storage unit 109, and an output unit 110.

In this embodiment, the signal transmission unit 101 of these configurations is realized by a communication unit 13 of the transmission apparatus 1.

The terminal apparatus 2A includes the image data acquisition unit 103, the signal acquisition unit 105, the signal determination unit 106A, the registration unit 107, and the output unit 110. These configurations are realized by a control unit 21A.

The image capture unit 102 is realized by the image capture apparatus 6.

The signal reception unit 104 is realized by the reception apparatus 4.

The registration information storage unit 109 is realized by a storage unit 32 of the server apparatus 3.

The outline of registration processing by each of these configurations will be described with reference to FIGS. 27 and 26.

First, the image capture unit 102 captures an image of the target livestock animal A passing through the passage W under a first condition of including the environment condition under which the transmission apparatus 1 attached to the target livestock animal A is capable of performing power generation. In the example shown in FIG. 26, that environment condition is light irradiation condition under which the power generation apparatus 1 is capable of performing power generation, and is realized by the lighting apparatus 7. Then, the captured image data is transmitted from the image capture apparatus 6 to the terminal apparatus 2A. The image data acquisition unit 103 of the terminal apparatus 2A acquires image data obtained by capturing an image of the target livestock animal A under the first condition.

On the other hand, each of the plurality of signal transmission units 101 transmits an individual identification signal. The individual identification signal includes, for example, information about an amount of electric power generated by the transmission apparatus 1 in a manner that depends on radiated light. Then, the signal reception unit 104 receives the plurality of individual identification signals transmitted from the plurality of signal transmission units 101. The signal acquisition unit 105 acquires these individual identification signals.

In this embodiment, each of the plurality of individual identification signals includes information about an amount of electric power generated in a manner that depends on a surrounding environment. Specifically, each of the plurality of individual identification signals includes a pattern based on the amount of electric power generated in a manner that depends on the surrounding environment. For example, the signal transmission unit 101 transmits individual identification signals at a higher frequency as the power generation amount becomes larger. Therefore, the signal transmission unit 101 that is an image capture target irradiated with light can transmit individual identification signals at a higher frequency than other transmission apparatuses.

Subsequently, the signal determination unit 106A determines an individual identification signal of the plurality of individual identification signals acquired, which satisfies a second condition of including the information about the amount of electric power generated under the above-mentioned environment condition. The second condition includes, for example, a condition of including the information about the amount of electric power generated under the above-mentioned light irradiation condition. In the example shown in FIG. 26, the second condition includes a condition that the individual identification signal has a pattern based on the amount of electric power generated under the above-mentioned environment condition and a power generation source is light. More specifically, the second condition may include a condition that the individual identification signal has a highest signal frequency among the plurality of individual identification signals.

Then, the registration unit 107 registers the identifier (ID) of the determined individual identification signal and the image data in association with each other. The registered information is transmitted to the server apparatus 3 via a second communication unit 24 of the terminal apparatus 2 and a communication unit 33 of the server apparatus 3.

Lastly, the registration information storage unit 109 stores the registered identifier and image data in an image and ID database D1.

In the above-mentioned processing, the output unit 110 is capable of appropriately outputting information about the acquired image data, identifier, and registration result, and the like to a display unit 25 and/or a speaker (not shown) or the like.

In this manner, in accordance with this embodiment, the image of the target livestock animal is captured under the environment condition under which the transmission apparatus 1 is capable of performing power generation, and the individual identification signal estimated to be transmitted under this environment condition is determined. In this manner, the identifier of the target livestock animal can be associated with the image data. With this, it is possible to accurately determine the individual identification signal corresponding to the target livestock animal whose image has been captured, and to perform correct registration processing.

In addition, in this embodiment, it is possible to capture the image data more clearly by setting the environment condition in the image capture to the condition that light is being radiated. Thus, the image is easier to see, and it is also easier to extract the feature data.

Further, a guiding passage of a barn or the like can be used as the passage W as shown in FIG. 26. Therefore, the livestock registration system 300 can be constructed by utilizing the existing facilities. Therefore, the cost for introducing the livestock registration system 300 can be reduced.

Modified Example of this Embodiment

Modified Example 3-1: Modified Example Regarding Environment Condition

The environment condition is not limited to the above-mentioned one. The environment condition may be an environment condition under which power generation can be performed with energy based on at least any one of, for example, light, heat, vibration, radio waves including far electromagnetic field and near electromagnetic field, and chemicals such as particular organic matter and inorganic matter or may be an environment condition under which power generation can be performed with a plurality of types of energy of the above-mentioned ones. Alternatively, the environment condition is not limited thereto.

Hereinafter, a description will be made, showing other specific examples of the environment condition.

For example, the power generation unit 11 of the transmission apparatus 1 may be configured to be capable of performing power generation with radio waves including far electromagnetic field and near electromagnetic field. The individual identification signal may include information about an amount of electric power generated in a manner that depends on radio waves. In this case, the first condition may include the environment condition under which the transmission apparatus 1 is capable of performing power generation in accordance with radio waves. The second condition may include a condition of including information about the amount of electric power generated in a manner that depends on radio waves.

More specifically, a radio wave source that emits radio waves can be placed near the passage W or the like through which the livestock animal can pass during image capture. With this, the power generation amount of the transmission apparatus 1 during image capture or before/after image capture can be increased.

Alternatively, the power generation unit 11 of the transmission apparatus 1 may be configured to be capable of performing power generation with vibration. The individual identification signal may include the information about an amount of electric power generated in a manner that depends on vibration. In this case, the first condition may include an environment condition under which the transmission apparatus 1 is capable of performing power generation in a manner that depends on vibration. The second condition may include a condition of including information about the amount of electric power generated in a manner that depends on vibration.

More specifically, a structure such as steps allowing the livestock animal to move, a vibration table that vibrates when the livestock animal gets thereon, or the like can be placed at a part of the passage W through which the livestock animal passes. With this, the transmission apparatus 1 can be vibrated during image capture or before/after image capture and the power generation amount can be temporarily increased.

Further, the power generation unit 11 of the transmission apparatus 1 may be configured to be capable of performing power generation with a temperature difference. The individual identification signal may include information about an amount of electric power generated in a manner that depends on a temperature difference. In this case, the first condition may include an environment condition under which the transmission apparatus 1 is capable of performing power generation in accordance with a temperature difference. The second condition may include a condition of including information about the amount of electric power generated in a manner that depends on a temperature difference.

More specifically, a heating apparatus that increases the temperature of a part of the passage W or a cooling apparatus that decreases it can be placed near the passage W through which the livestock animal passes. With this, a temperature difference between a body temperature of the livestock animal and an ambient temperature during image capture or before/after image capture can be increased and the power generation amount can be temporarily increased.

In addition, the image data can be more clearly captured by using a light-emitting apparatus capable of emitting heat as the heating apparatus.

Modified Example 3-2: Modified Example Regarding of Hardware Configuration

Figure 28:
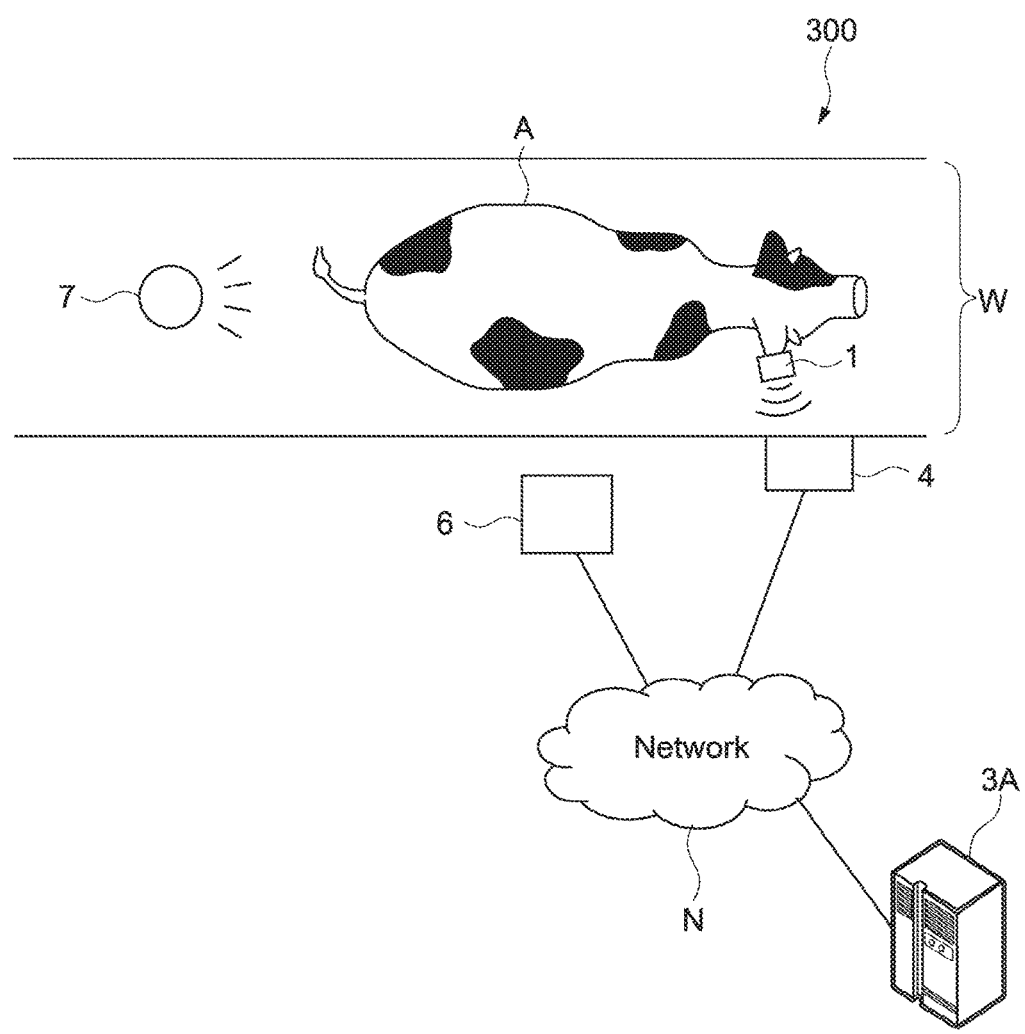
FIG. 28 A schematic diagram showing a configuration example of a livestock registration system according to Modified Example 3-2.

FIG. 28 is a schematic diagram showing a schematic configuration of the livestock registration system 300 according to this modified example.

As shown in the figure, the livestock registration system 300 does not need to include the terminal apparatus, for example.

The livestock registration system 300 includes the transmission apparatuses 1, a server apparatus 3A, the reception apparatus 4, and the image capture apparatus 6.

In this case, the reception apparatus 4 and the image capture apparatus 6 are directly connected to the server apparatus 3A via the network N.

Further, the image data acquisition unit 103, the signal acquisition unit 105, the signal determination unit 106A, the registration unit 107, the registration information storage unit 109, and the output unit 110 of the functional configurations of the livestock registration system 300 shown in FIG. 27 may be included in the server apparatus 3.

In this example, input operations for activation, termination, and the like of the system may be performed via the reception apparatus 4 or the image capture apparatus 6 or may be performed by a user's terminal apparatus (not shown) or the like connected to the server apparatus 3 via the network N.

Fourth Embodiment

Figure 29:
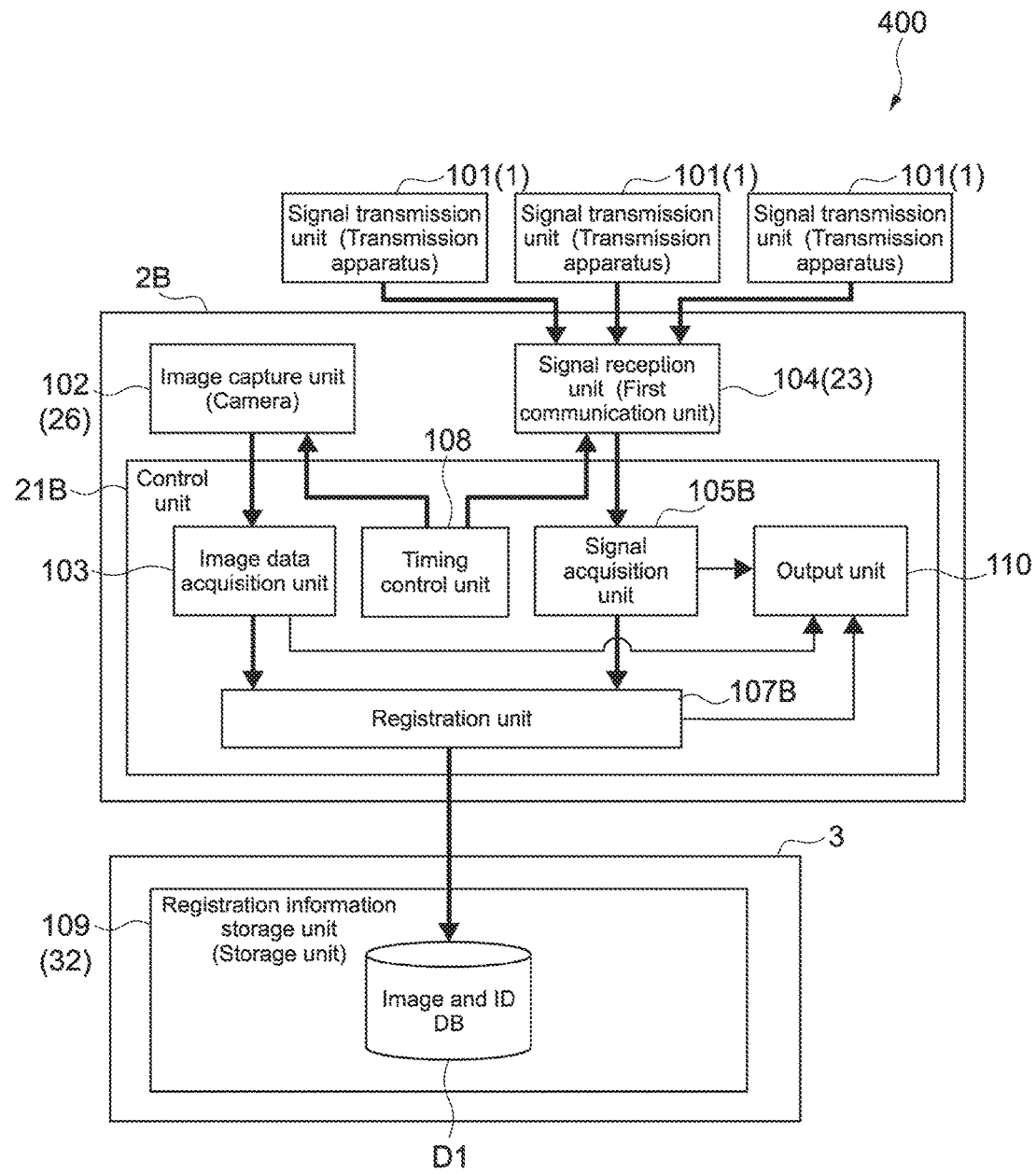
FIG. 29 A block diagram showing functional configurations and a flow of processing of a livestock registration system of a fourth embodiment of the present technology.

FIG. 29 is a block diagram showing functional configurations of a livestock registration system 400 according to this modified example. Note that, in the following descriptions, configurations similar to those of the above-mentioned embodiments will be denoted by identical symbols and descriptions thereof will be omitted.

In the livestock registration system 400 of this embodiment, the target livestock animal whose image is captured and the acquired individual identification signal correspond in a one-to-one relationship. The image data and the identifier are registered without the signal determination processing.

As shown in FIG. 29, the livestock registration system 400 includes a plurality of transmission apparatuses 1, a terminal apparatus 2B, and a server apparatus 3.

Further, the livestock registration system 400 includes, as functional configurations, signal transmission units 101, an image capture unit 102, an image data acquisition unit 103, a signal reception unit 104, a signal acquisition unit 105B, a registration unit 107B, a timing control unit 108, a registration information storage unit 109, and an output unit 110, and does not include the signal determination unit.

The signal transmission unit 101 of these configurations is realized by the communication unit 13 of the transmission apparatus 1.

The image capture unit 102 is realized by a camera 26 of the terminal apparatus 2B.

The signal reception unit 104 is realized by a first communication unit 23 of the terminal apparatus 2B.

The image data acquisition unit 103, the signal acquisition unit 105, the signal determination unit 106, the registration unit 107, the timing control unit 108, and the output unit 110 are realized by a control unit 21B of the terminal apparatus 2B.

The registration information storage unit 109 is realized by a storage unit 32 of the server apparatus 3.

The outline of registration processing according to this embodiment will be described with reference to FIG. 29.

For example, the livestock registration app is activated in accordance with a user's input operation and the image capture unit 102 is activated by the timing control unit 108 to be capable of capturing an image. Then, in accordance with a user's input operation, the image capture unit 102 captures an image of the target livestock animal. Then, the output unit 110 causes the display unit 25 to display the captured image data.

The image data is authenticated in accordance with a user's input operation and the image data acquisition unit 103 acquires the image data.

In this embodiment, the signal transmission unit 101 can employ proximity wireless communication such as NFC and infrared communication. The individual identification signal may include data used in individual authentication, such as an encryption key.

Then, the timing control unit 108 causes the signal reception unit 104 to shift from the reception-blocked state to the reception-permitted state. At this time, a text for prompting the user to bring the terminal apparatus 2 and the transmission apparatus 1 into proximity to each other may be displayed on the display unit 25.

The user brings the terminal apparatus 2 into proximity to the transmission apparatus 1 in accordance with the instruction of the display unit 25. With this, the signal reception unit 104 receives the individual identification signal including the identifier of the target livestock animal, which is transmitted from the signal transmission unit 101.

Subsequently, the signal acquisition unit 105B acquires the individual identification signal including this identifier. Note that the signal acquisition unit 105B may identify individuals by performing individual authentication on the acquired individual identification signal.

The registration unit 107B registers the acquired identifier and the image data in association with each other.

As described above, also with this embodiment, it becomes possible to automatically register the image data and the identifier of the target livestock animal.

Note that this embodiment is not limited to the configuration in which the signal transmission unit 101 employs the proximity wireless communication.

For example, if livestock animals can be isolated from one another and reception of individual identification signals and image capture can be performed, the target livestock animal whose image is captured and the acquired individual identification signal can correspond in a one-to-one relationship. Therefore, the configuration of this embodiment can be applied.

For example, a gate or the like with which one target livestock animal can be isolated can be provided at a part of the passage W as shown in FIG. 26.

Alternatively, the reception apparatus 4 and the image capture apparatus 6 may be placed in a barn room or the like in which each livestock animal can be housed.

Fifth Embodiment

Figure 30:
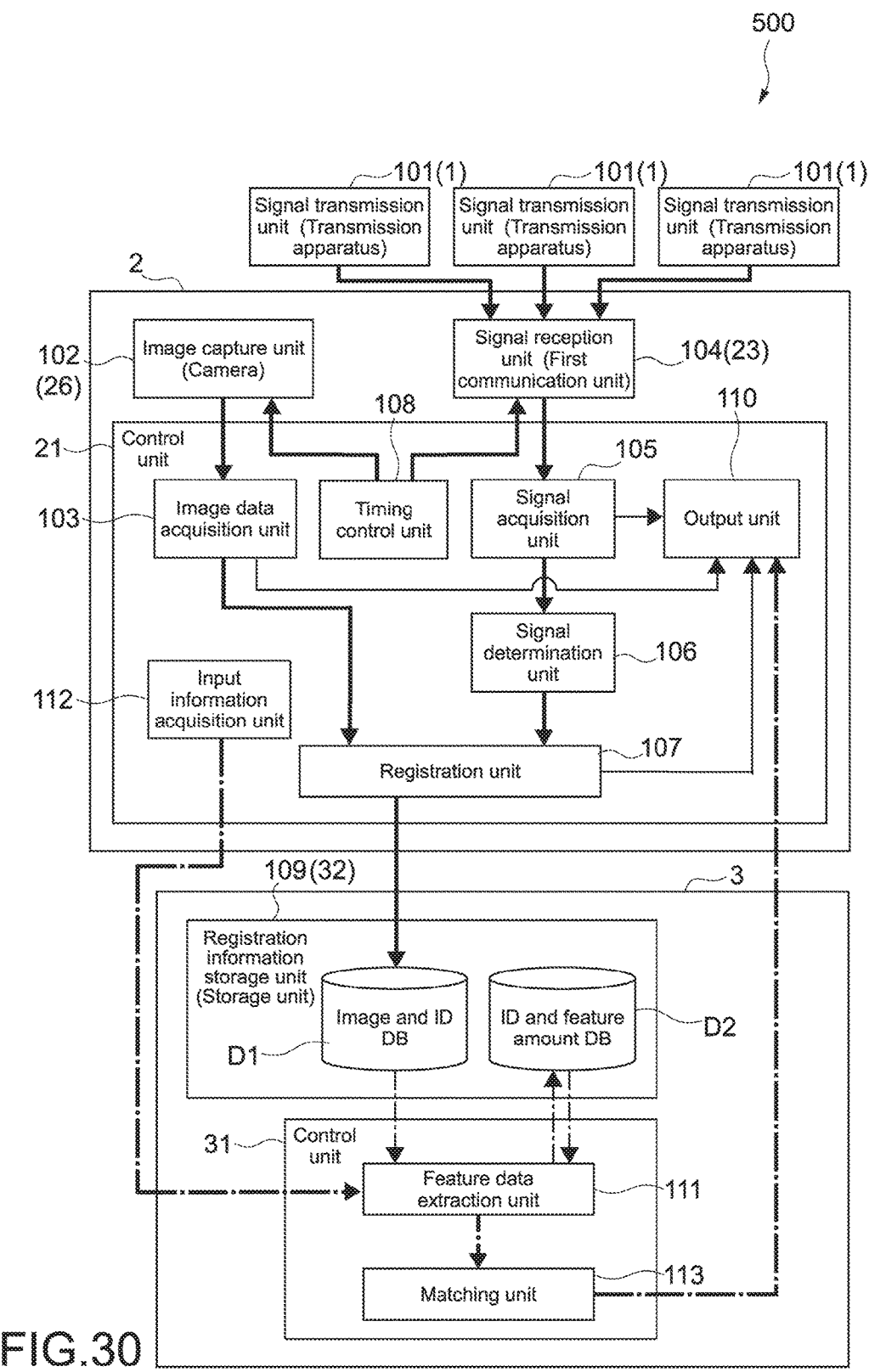
FIG. 30 A schematic diagram showing a configuration example of a livestock registration system of a fifth embodiment of the present technology.

FIG. 30 is a block diagram showing functional configurations of a livestock registration system 500 according to a fifth embodiment of the present technology.

In the processing of automatically registering the identifier for identifying each of the livestock animals A and the image data in association with each other in the above-mentioned first embodiment, the livestock registration system 500 according to this embodiment executes processing of also registering the information of the physical feature of each of the livestock animals A in association with them.

Note that it is assumed that the livestock registration system 500 has a hardware configuration similar to the hardware configuration of the livestock registration system 100 shown in FIG. 2. Further, in the following descriptions, configurations similar to those of the above-mentioned embodiments will be denoted by identical symbols and descriptions thereof will be omitted.

[Functional Configurations of Livestock Registration System and Outline of Processing]

As shown in FIG. 30, the livestock registration system 500 has configurations similar to the functional configurations of the livestock registration system 200 according to the second embodiment shown in FIG. 23. It should be noted that the input information acquisition unit 112 is also involved in the registration processing.

The processing of this embodiment is executed as in the first embodiment. However, this embodiment is different from the first embodiment in that an image of the physical feature of the target livestock animal is captured by the image capture unit 102 and handled as quantified information in this embodiment. Physique information, skeleton information, and body condition score (BCS) can be employed as the information of the physical feature quantified in this embodiment.

Here, the body condition score (BCS) expresses an accumulation state of body fat of a target livestock animal in a numerical form. It expresses, for example, a thin state to a fat state with numerical values from 2.00 to 4.00. As an example of a judgement method for the body condition score (BCS), there is a judgement method of viewing the thickness of subcutaneous fat from the hip bone to the ischium of a livestock animal and palpating it.

In this embodiment, at a timing, for example, after the image capture unit 102 captures an image of the target livestock animal, the input information acquisition unit 112 acquires information quantifying the physical feature of the target livestock animal. An acquisition method may be a method in which the display unit 25 displays GUI (hereinafter, referred to as "BCS registration GUI") for allowing the user to input the physique information, the skeleton information, the body condition score (BCS), and the like and the input information acquisition unit 112 acquires information input by the input operation unit 27.

Operation Example

An operation example of this embodiment will be described with reference to FIG. 31. Descriptions of parts similar to those of the first embodiment shown in FIG. 4 will be omitted. Further, FIG. 32 shows an example of GUI (BCS registration GUI) for allowing the user to input the body condition score (BCS) and the like.

Figure 31:
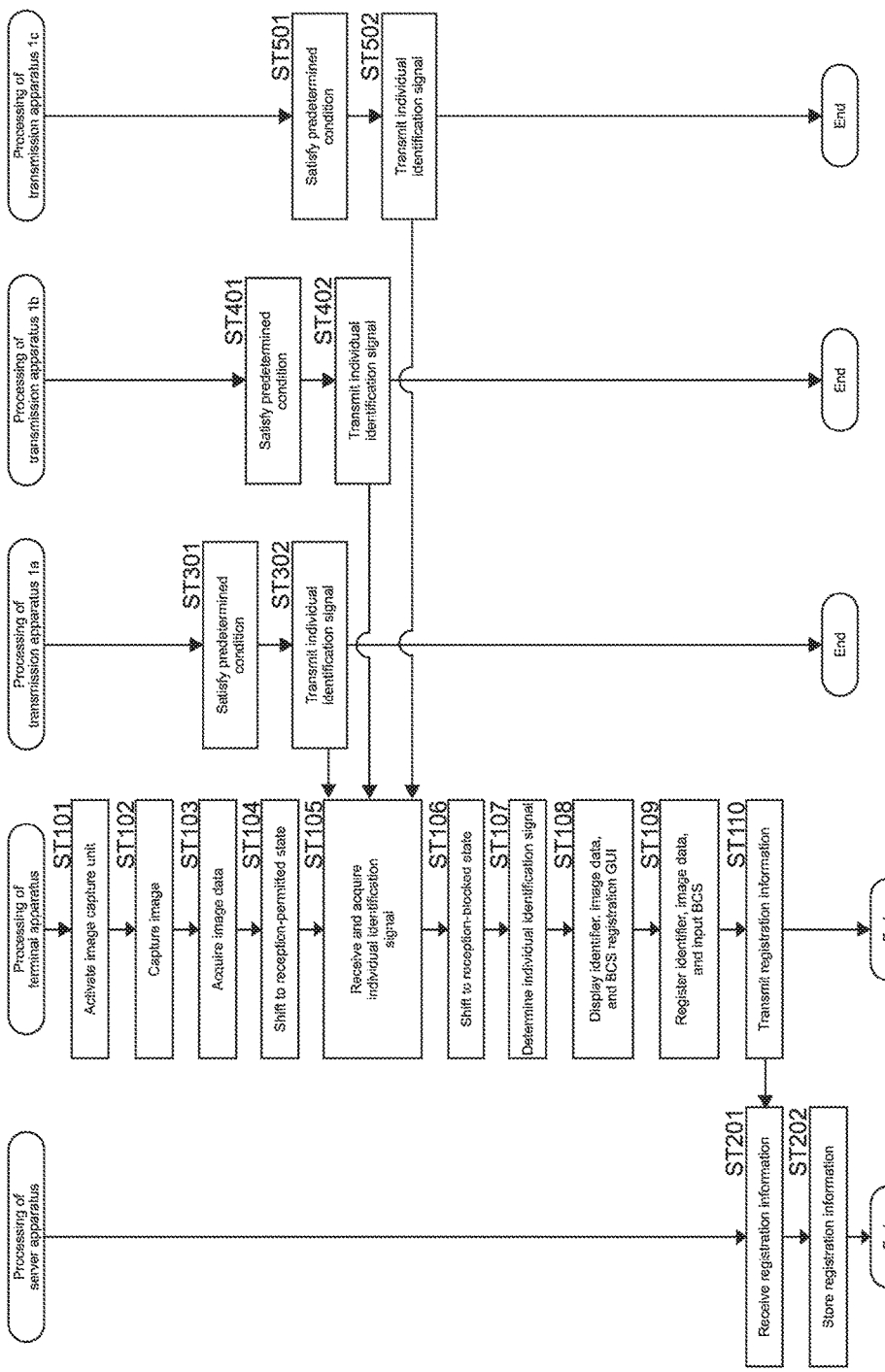
FIG. 31 A flowchart showing an operation example of the livestock registration system shown in FIG. 30.

FIG. 31 is a flowchart showing an operation example of the registration processing of the livestock registration system 500. As shown in the figure, this operation example can be an operation example similar to that of the first embodiment shown in FIG. 4. It should be noted that processing of S108 and S109 is partially different. Further, processing of S201 and S202 is also partially different.

In this operation example, when the output unit 110 outputs, to the display unit 25, the image data obtained by capturing an image of the livestock animal A and the information about the identifier of the individual identification signal determined by the signal determination unit 106 (ST108), the output unit 110 also displays the BCS registration GUI.

Figure 32:
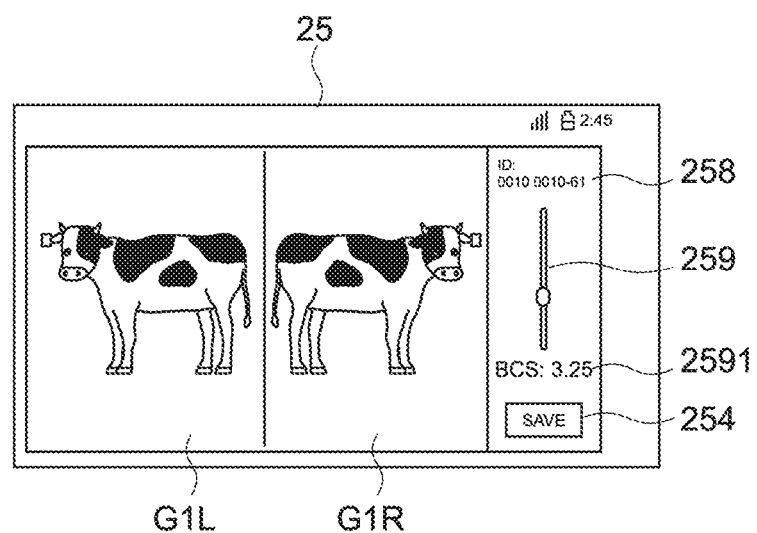
FIG. 32 A diagram showing an example of a GUI for BCS input, which is displayed on a display unit of a terminal apparatus in the operation example of FIG. 31.

As shown in FIG. 32, the image data of the livestock animal A is displayed on the display unit 25. However, if a plurality of images obtained by capturing images of an outer appearance of the livestock animal A at different angles, for example, the both sides of the cattle body are used for judgement of the body condition score (BCS), the accuracy is enhanced. Therefore, in this operation example, image data G1L relating to the captured image of the left side of the livestock animal A and image data G1R relating to the captured image of the right side is displayed. As another example, captured images other than the both sides may be displayed.

A BCS registration GUI 259 is displayed on the display unit 25 together with information 258 about the identifier of the individual identification number and a save button 254. In the example shown in FIG. 32, a slide bar is employed. While viewing the image data G1L and the image data G1R, the user moves the slide bar and checks a numerical value shown by a BCS information display unit 2591. The user stops the BCS registration GUI 259 at an arbitrary position and taps the save button 254, to thereby cause the terminal apparatus 2 to execute the registration processing.

In S109, S201, and S202, the BCS acquired in S108 is stored in the image and ID database D1 stored in the storage unit 109 of a server 3.

The registration unit 107 of the terminal apparatus 2 transmits the BCS to the server 3 together with the image data and the identifier of the individual identification number. The server 3 receives the image data relating to the registration information, the identifier of the individual identification number, and the BCS. The registration information storage unit 109 of the server 3 stores the received image data relating to the registration information, the received identifier of the individual identification number, and the received BCS in the image and ID database D1 while linking them to one another.

In accordance with this embodiment described above, quantitative information like the BCS "that expresses the accumulation state of body fat in a numerical form" is acquired as the physical feature of the livestock animal, and linked to the individual livestock animal and stored. It becomes possible to manage important information for knowing a health state of the livestock animal while linking it to the individual livestock animal. Therefore, physical condition management and the like of livestock, which is finer than the conventional ones, become possible.

Modified Example 5-1: Modified Example of Method of Quantifying Physical Feature The acquisition method for the information of the quantified physical feature is not limited to the acquisition method using the user's input as described above.

Not relaying on the method using the user's input, the control unit 31 of the server 3 may perform physique judgement by machine learning processing or the like on the basis of information about a stereoscopic-shape sensor using, for example, an image, a laser, an infrared sensor, and the like, and the registration information storage unit 109 may automatically register information about the judged physical feature. An image sensor that acquires an image and the stereoscopic-shape sensor that acquires stereoscopic-shape information of the livestock animal may be included in the terminal apparatus 2 or may be included in another measurement apparatus.

In this case, the user's procedure of manually inputting the BCS by using the BCS registration GUI 259 can be omitted. The input information acquisition unit 112 acquires information of the stereoscopic-shape sensor for grasping the stereoscopic shape of the livestock animal. The registration unit 107 transmits the acquired information of the stereoscopic-shape sensor to the server 3. The server 3 receives the information of the stereoscopic-shape sensor.

In this modified example, the registration information storage unit 109 may store the information of the stereoscopic-shape sensor, which is received by the server 3, while linking it to the information about the identifier of the individual identification signal.

Alternatively, on the basis of the information of the stereoscopic-shape sensor, the control unit 31 of the server 3 may generate feature data indicating the physical feature of the livestock animal A and the registration information storage unit 109 may store it while linking it to the information about the identifier of the individual identification signal. A specific example of the feature data indicating the physical feature of the livestock animal A is a value of the body condition score (BCS).

In this case, the control unit 31 generates the feature data. At this time, supervised machine learning using a neural network may be employed. In this case, in the image and ID database D1, a set of the "BCS" registered by another user in past and the "information of the stereoscopic-shape sensor and the image data" are stored. Using this set of the "BCS" and the "information of the stereoscopic-shape sensor and the image data" as the teaching data, the control unit 31 performs learning processing and generates a discriminator of the BCS from the neural network.

The control unit 31 outputs the BCS on the basis of newly input information of the stereoscopic-shape sensor by using the generated discriminator. The registration information storage unit 109 stores the BCS output by the control unit 31, together with the information about the identifier of the individual identification signal of the livestock animal A, which is linked thereto.

Modified Example 5-2: Modified Example of Method of Quantifying Physical Feature In the physique judgment, information about a distance between the image capture unit 102 and the livestock animal A may be used for judgement. In this case, the information about the distance between the image capture unit 102 and the livestock animal A may be estimated by performing triangulation on the basis of received signal strength (RSSI: Received Signal Strength Indication) of individual identification signals received from a tag attached to a cow and a beacon tag placed in the gate (FIG. 28 or the like).

Sixth Embodiment

For a livestock registration system according to this embodiment, the configuration of the livestock registration system according to any of the above-mentioned embodiments can be used. Hereinafter, the livestock registration system according to this embodiment will be referred to as the "livestock registration system 100".

In each of the above-mentioned embodiments, the timing of registration of the identifier of the individual identification signal of the livestock animal in the database or image capture of the livestock animal is a timing when the transmission apparatus 1 is attached to the livestock animal for the first time, though the present technology is not limited thereto. If an image of a livestock animal, with respect to which an identifier of an individual identification signal has been registered, is captured, the registration unit 107 associates, in registering that identifier and the image data in the registration information storage unit 109 in association with each other, the image data to be registered with photographing date and time thereof and registers them in this embodiment. The image data acquisition unit 103 acquires a plurality of pieces of image data different in photographing date and time. However, if the identifier determined by the signal determination unit 106 has been already registered, the registration unit 107 associates the image data and the photographing date and time with that registered identifier and registers them.

In this embodiment, in storage contents of the registration information storage unit 109, information regarding photographing date and time (hereinafter, simply referred to as "photographing date and time") is explicitly linked to captured image data. Information obtained by quantifying a physical feature (e.g., body condition score (BCS)) may be linked to the captured image data. It is assumed that the information obtained by quantifying the physical feature is a BCS in the following description example.

FIG. 33 shows an example of the data structure of the information stored by the registration information storage unit 109 in this embodiment. As shown in the figure, in this embodiment, for each identifier of the individual identification signal, data is accumulated while the "image data", the "photographing date and time", and the "BCS" are associated with one another. Note that, regarding the "image data", the "photographing date and time", and the "BCS", information or the like indicating how many times photographing has been performed may be associated with the "image data", the "photographing date and time", and the "BCS" in addition to those shown in the figure.

This embodiment is configured in the above-mentioned manner. Therefore, if the registration information storage unit 109 is searched by using the identifier of the individual identification signal as a key, the registration information storage unit 109 is capable of outputting an image data group or a list of image data of images obtained by performing image capture on a certain livestock animal. Alternatively, if the registration information storage unit 109 is cross-searched by using both of the identifier of the individual identification signal and the photographing date and time as keys, the registration information storage unit 109 is capable of determining image data that coincides with a search condition.

The livestock animal A to which the transmission apparatus 1 is attached is continuously raised up in two to three years, for example. Therefore, for example, if the individual livestock animal is a calf when it is registered for the first time, there is a possibility that an outer appearance of the same individual livestock animal becomes totally different from that at the time of registration one year later. Otherwise, there is a possibility that, for example, it suffers from marasmus due to disease or the like after the lapse of a long time after photographing and the registered image is significantly different from the current state.

However, in accordance with this embodiment, it becomes possible to register each of pieces of image data obtained by capturing an image of each individual livestock animal a plurality of times. In other words, in addition to an image obtained when a certain livestock animal is photographed for the first time, images of the same livestock animal after the lapse of time can be registered.

Application Example

Hereinafter, an application example of this embodiment will be described. This application example has a configuration of adding captured image data of a cow with respect to which an identifier of an individual identification signal has been already registered. The same configuration may be implemented by application software executed in the control unit 21 of the portable terminal 2 and database operation middleware executed in the control unit 31 of the server 3.

Hereinafter, a procedure of accessing the database from the portable terminal 2 and registering a new captured image will be shown.

First, the livestock registration system 100 determines a livestock animal that is a target whose new captured image is to be registered. As a particular method, a database stored in the registration information storage unit 109 may be searched by using the identifier of the individual identification signal as a key.

As a specific method, some methods exemplified below may be employed. In the first method, the display unit 25 of the portable terminal 2 first displays a list of livestock animals. Next, the portable terminal 2 transmits, to the server 3, the identifier of the individual identification signal associated with a livestock animal determined by the user selecting it from that list through the input operation unit 27.

In the second method, the user first uses the camera 26 to photograph information (symbol, number, bar code, two-dimensional bar code, or the like) indicating the identifier of the individual identification signal, which is printed on the transmission apparatus 1. Next, the portable terminal 2 or the server 3 determines the identifier of the individual identification signal from the photographed information.

In the third method, first, both of the transmission apparatus 1 and the portable terminal 2 includes a contactless communication circuit using NFC (Near Field Communication). Next, for example, an operation or the like of bringing the portable terminal 2 into contact with the transmission apparatus 1 is performed. In this manner, the identifier of the individual identification signal included in an RFID (Radio Frequency IDentifier) is transmitted from the transmission apparatus 1 to the portable terminal 2 via this contactless communication. Next, the portable terminal transmits the thus acquired identifier of the individual identification signal to the server 3.

Figure 34:
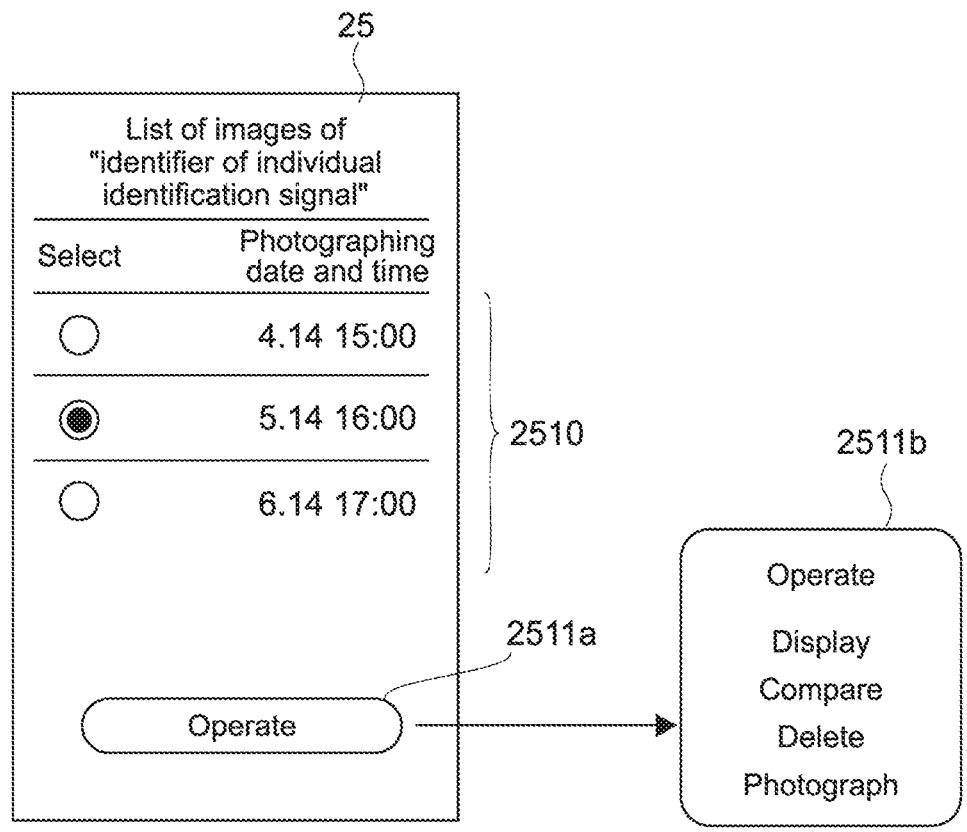
FIG. 34 A diagram (Part 1) showing an example of GUI in the sixth embodiment of the present technology.

When the livestock animal is determined, the server 3 may be configured to send back a list of images of the determined livestock animal to the portable terminal 2. FIG. 34 shows a screen configuration example displayed on the display unit 25 of the portable terminal 2 in this case. As shown in the figure, the display unit 25 displays, in a display region 2510, a list of image data determined by the "identifier of the individual identification signal". In the display region 2510, a radio button for selecting images together with photographing dates and times. Further, the display unit 25 also displays an operation button 2511*a*. The operation button 2511*a* is configured to enable the user to designate an operation with respect to an image selected with the radio button.

Figure 35A:
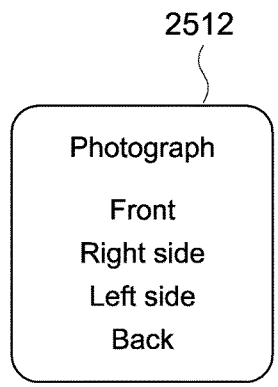
FIGS. 35(A), 35(B), and 35(C) Diagrams (Part 2) showing an example of GUI in the sixth embodiment of the present technology.
Figure 35B:
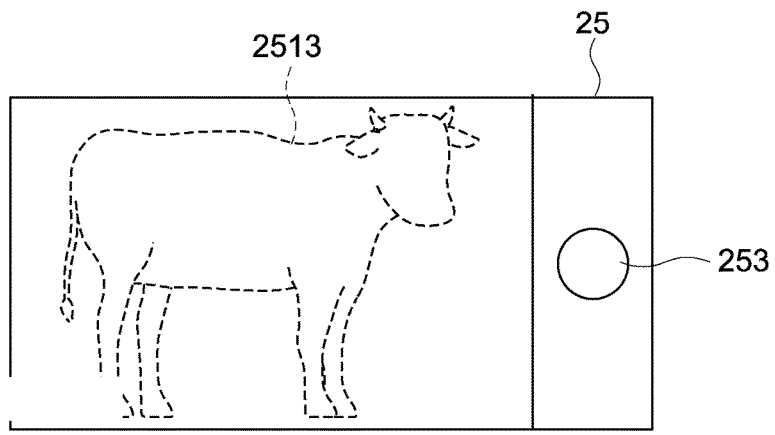
Figure 35C:
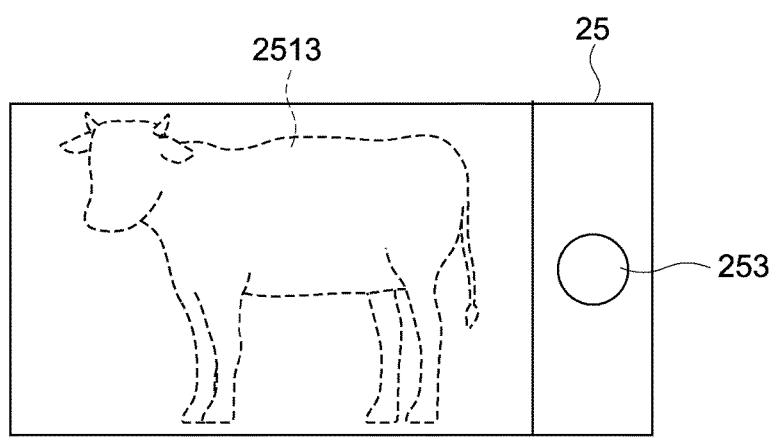

When the operation button 2511*a* is tapped, the operation button 2511*a* is configured to present an operation list 2511*b*. When the "Photograph" button is selected from the operation list 2511*b* in a state in which photographing date and time are selected, the portable terminal 2 shifts to a state in which an additional image can be captured. FIGS. 35(A), 35(B), and 35(C) show a GUI configuration example in this case.

As shown in FIG. 35(A), in the state in which the additional image can be captured, the output unit 110 causes the display unit 25 to output a GUI 2512 for allowing the user to designate a photographing angle.

If the user selects "Right side", the screen as shown in FIG. 35(B) is displayed. As shown in the figure, the display unit 25 displays a guide image 2513 showing a rough cattle shape while it overlaps with a live view image. The user adjusts an actual cattle body to be contained within the frame of the cattle shape shown by the guide image 2513, and taps the save button 253 for photographing.

Similarly, if the user selects "Left side", a screen as shown in FIG. 35(C) is displayed. As shown in the figure, the display unit 25 displays the guide image 2513 showing a rough cattle shape while it overlaps with a live view image. The user adjusts an actual cattle body to be contained within the frame of the cattle shape shown by the guide image 2513, and taps the save button 253 for photographing.

Next, the portable terminal 2 transmits data of the captured image (image data), photographing time information (data/month/year or date and time), and the information about the identifier of the individual identification signal to the server 3. The server 3 additionally registers the captured image data and the image capture date and time in data entry of the livestock animal corresponding to the identifier of the individual identification signal. Note that, in this application example, the image capture date and time may be registered in the registration information storage unit 109 in the first photographing. Further, information about a BCS and the like may also be transmitted together with the image data and may be registered in the registration information storage unit 109 together.

In FIG. 34, if the user selects "Display", the portable terminal 2 receives the image data associated with the selected photographing date and time from the server 3 and displays it. The user may be configured to be capable of inputting a BCS while viewing that image. In this case, the BCS registration GUI 259 as shown in FIG. 32 is displayed on the display screen. The BCS input by the user here is transmitted to the server 3 together with the identifier of the individual identification signal and additionally registered in the entry of the livestock animal associated with that identifier of the individual identification signal.

In FIG. 34, if the user selects "Compare", the portable terminal 2 arranges and displays images at a selected photographing time and images at a photographing time before or after it (receives them from the server 3 and displays them). FIG. 36(A) shows a screen example in the case where "Compare" is selected in this application example. As shown in the figure, assuming that the photographing date and time of the selected photographing time are T1, image data captured at the photographing date and time T1 is listed. Further, assuming that the photographing date and time of the photographing time before or after it is T2, image data captured at the photographing date and time T2 is listed.

Figure 37:
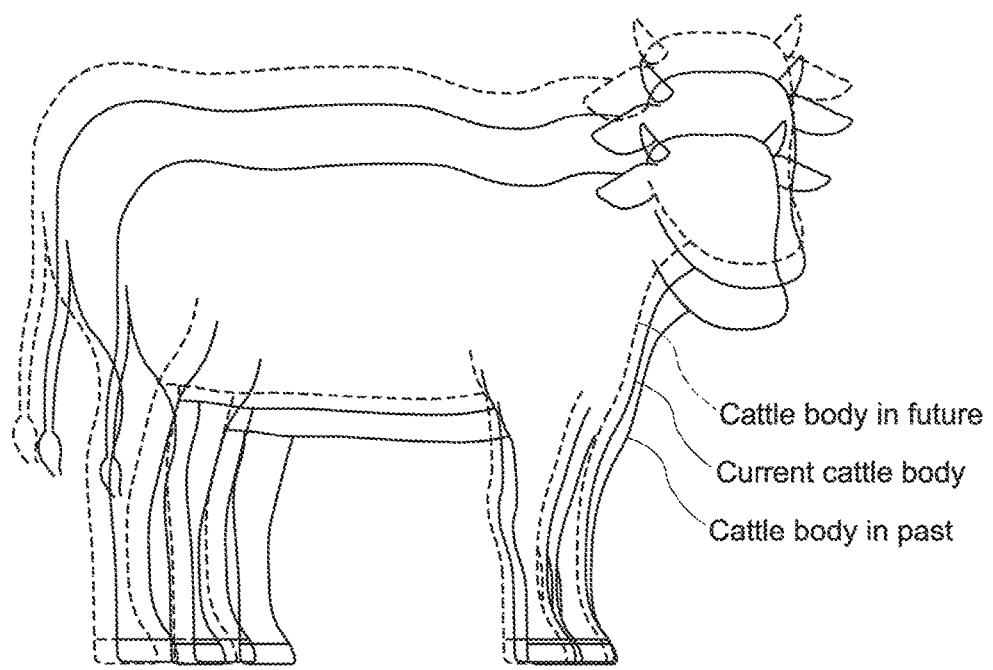
FIG. 37 A diagram showing overlap display of GUI in the sixth embodiment of the present technology.

In addition, in this example, the image data may be configured to become semi-transparent by the user tapping the image data displayed on the display unit 25 and keeping the finger on it for a few moments. In this case, it can overlap with other image data in accordance with a drag operation (see FIG. 36(B)). In accordance with this application example, differences of the cattle body due to a lapse of time (increase or decrease in body size, decrease or increase in weight, etc.) can be checked by overlapping images in different in photographing date and time each other. Alternatively, the control unit 21 of the portable terminal 2 or the control unit 31 of the server 3 may perform processing of displaying images captured at different dates and times in an overlapping manner. In this case, the control unit 21 of the portable terminal 2 or the control unit 31 of the server 3 analyzes the images to thereby calculate a reference point of overlapping, and overlaps the images on the basis of that reference point, to thereby display the cows in an overlapping manner. FIG. 37 shows an example of such overlap display. As shown in FIG. 37, in this case, the image of the current cattle body is displayed to overlap with the image of the cattle body in the past. A predicted cattle body in the future may be generated and displayed in an overlapping manner. The cattle body may be shown as a silhouette, the original image data may be transparently shown, or any other representation methods can be employed.

Although the embodiments of the present technology have been described above, it is needless to say that the present technology is not limited only to the above-mentioned embodiments and various modifications can be made without departing from the gist of the present technology. For example, the embodiment of the present technology can be an embodiment combining the respective embodiments.

For example, the present technology can be applied as a "registration system" capable of authenticating not only livestock but also persons. That is, the image data acquisition unit acquires image data obtained by capturing an image of a person wearing a transmission apparatus. The signal acquisition unit acquires an individual identification signal including an identifier transmitted from the transmission apparatus. Then, the registration unit registers the identifier and the image data in association with each other. Further, information associated with identification of individuals (name, domicile, facility name, aided person's name, etc.) may be registered corresponding to the identifier or the like.

An elderly person who suffers from dementia or is suspected to be dementia or a child or the like who can be lost, for example, is registered in the above-mentioned manner. In this manner, if such a person is found, the identifier or the related information can be checked on the basis of the image data or the like. Therefore, the safety for the elderly person or child or the like can be secured.

Further, as described above, the "livestock (animals)" in the present technology also includes companion animals raised as pets. Therefore, the livestock registration system according to the present technology can be applied to breeding management of pets, search for lost pets, and the like.

Further, for example, in the above-mentioned embodiment, the identifier specific to the transmission apparatus 1 is used as the "identifier". However, any one or more of check-in information (information in which information indicating that a livestock animal enters/exits a barn or the like is associated with time information), position information, information regarding an activity amount, and information regarding a body temperature may be used as the "identifier". For example, if the activity amount is employed as the identifier, the following configuration may be employed. Specifically, a livestock animal having a smallest activity amount at a timing from reception start of the individual identification signal to satisfaction of the predetermined condition, precedes image capture of the image data, may be determined. Individual identification of that individual may be displayed. After that, the captured image and the individual identification may be saved in association with each other during photographing.

It should be noted that the present technology may also take the following configurations.

(1) A livestock registration system, including:
an image data acquisition unit that acquires image data obtained by capturing an image of a target livestock animal;
a signal acquisition unit that acquires an individual identification signal transmitted from a transmission apparatus attached to the target livestock animal, the individual identification signal including an identifier for identifying the target livestock animal; and
a registration unit that registers the identifier of the individual identification signal and the image data in association with each other, the identifier of the individual identification signal being received at a reception timing corresponding to a timing at which the image of the target livestock animal is captured.

(2) The livestock registration system according to (1), in which
the image data acquisition unit acquires image data including a physical feature of the target livestock animal.

(3) The livestock registration system according to (1) or (2), in which
the reception timing corresponding to the timing at which the image of the target livestock animal is captured is a timing from reception start of the individual identification signal to satisfaction of a predetermined condition, the timing preceding image capture of the image data.

(4) The livestock registration system according to (1) or (2), in which
the reception timing corresponding to the timing at which the image of the target livestock animal is captured is a timing from reception start of the individual identification signal to satisfaction of the predetermined condition, the timing following image capture of the image data.

(5) The livestock registration system according to (1) or (2), in which
the reception timing corresponding to the timing at which the image of the target livestock animal is captured is a timing of satisfaction of a predetermined condition, the timing being in a period including an image capture timing of the image data.

(6) The livestock registration system according to any one of (1) to (5), in which
the image data acquisition unit acquires image data obtained by capturing an image of the target livestock animal under a first condition,
the signal acquisition unit acquires a plurality of individual identification signals respectively including identifiers for identifying a plurality of livestock animals including the target livestock animal, the livestock registration system further including
a signal determination unit that determines an individual identification signal of the plurality of individual identification signals acquired, which satisfies a second condition associated with the first condition, and
the registration unit registers the identifier of the determined individual identification signal and the image data in association with each other.

(7) The livestock registration system according to (6), in which
the signal acquisition unit acquires the plurality of individual identification signals received in vicinity of an image capture position of the image data,
the first condition includes a condition of being an image capture distance at which an image of a physical feature of the target livestock animal is capable of being captured, and
the second condition includes a condition of having highest signal strength among the plurality of individual identification signals.

(8) The livestock registration system according to (6), in which
the signal acquisition unit acquires the plurality of individual identification signals output from a plurality of transmission apparatuses attached to the plurality of livestock animals,
the plurality of individual identification signals each include information about an amount of electric power generated in a manner that depends on a surrounding environment, the first condition includes an environment condition under which a transmission apparatus attached to the target livestock animal is capable of performing power generation, and the second condition includes a condition of including information about an amount of electric power generated under the environment condition.

(9) The livestock registration system according to (8), in which the plurality of individual identification signals have a pattern based on an amount of electric power generated in a manner that depends on the surrounding environment, and the second condition includes a condition of being received in a pattern based on an amount of electric power generated under the environment condition.

(10) The livestock registration system according to (8) or (9), in which the individual identification signal includes information about an amount of electric power generated by the transmission apparatus in a manner that depends on radiated light, the first condition includes an irradiation condition of light with which the transmission apparatus is capable of performing power generation, and the second condition includes a condition of including information about an amount of electric power generated under the irradiation condition of light.

(11) The livestock registration system according to any one of (1) to (10), further including:

an image capture unit that captures an image of the target livestock animal;

a signal reception unit that receives the individual identification signal; and a timing control unit that controls reception timings of the plurality of individual identification signals to be timings corresponding to the timing at which the image of the target livestock animal is captured by the image capture unit.

(12) The livestock registration system according to (11), in which the timing control unit causes the reception unit to shift from the reception-blocked state to the reception-permitted state after the image data acquisition unit acquires the image data.

(13) The livestock registration system according to (11), in which the timing control unit activates the image capture unit to be capable of capturing an image after the signal acquisition unit acquires the plurality of individual identification signals.

(14) The livestock registration system according to any one of (1) to (13), further including a registration information storage unit that stores the registered identifier and image data as registration information.

(15) The livestock registration system according to (14), further including an input information acquisition unit that acquires at least one of image data and information associated with an identifier, which a user wishes to match, as input information;

a matching unit that matches the input information against the registration information; and an output unit that outputs the matching result.

(16) The livestock registration system according to (15), further including a feature data extraction unit that extracts feature data of image data included in at least one of the registration information and the input information, in which the matching unit matches, if the input information includes image data, the image data included in the input information against image data included in the registration information on the basis of feature data of the image data included in the input information and the extracted feature data.

(17) The livestock registration system according to any one of (1) to (16), in which the registration unit registers information obtained by quantifying a physical feature of the target livestock animal at a time at which the image data is acquired, in association with the image data.

(18) The livestock registration system according to any one of (1) to (17), in which the image data acquisition unit acquires a plurality of pieces of image data different in photographing date and time, and the registration unit registers, in registering the identifier and the image data in association with each other, the photographing date and time of the image data in association with the image data.

(19) A registration method for livestock, including:

acquiring image data obtained by capturing an image of a target livestock animal;

acquiring an individual identification signal transmitted from a transmission apparatus attached to the target livestock animal, the individual identification signal including an identifier for identifying the target livestock animal; and registering the identifier of the individual identification signal received at a reception timing corresponding to a timing at which the image of the target livestock animal is captured and the image data in association with each other.

REFERENCE SIGNS LIST 100, 200, 300, 400 . . . livestock registration system
102 . . . image capture unit
103 . . . image data acquisition unit
104 . . . signal reception unit
105 . . . signal acquisition unit
106 . . . signal determination unit
107 . . . registration unit
108 . . . timing control unit
109 . . . registration information storage unit
110 . . . output unit
111 . . . feature data extraction unit
112 . . . input information acquisition unit
113 . . . matching unit

The invention claimed is:

1. A livestock registration system, comprising:
an image data acquisition unit configured to acquire, based on a first condition, first image data obtained by capture of an image of a target livestock animal of a plurality of livestock animals;
a signal acquisition unit configured to acquire a plurality of individual identification signals transmitted from a plurality of transmission apparatuses attached to the plurality of livestock animals, wherein the plurality of individual identification signals comprises a plurality of identifiers;
a signal determination unit configured to determine an individual identification signal of the plurality of individual identification signals, wherein the determined individual identification signal includes a first identifier of the plurality of identifiers, and the determined individual identification signal satisfies a second condition associated with the first condition; and a registration unit configured to register the first identifier of the determined individual identification signal and the first image data, wherein the first identifier is registered in association with the first image data, the first identifier of the determined individual identification signal is acquired at a reception timing, the reception timing corresponds to a first timing of the capture of the image of the target livestock animal, the first condition corresponds to a distance of the capture of the target livestock animal, wherein the image of the target livestock animal includes a physical feature of the target livestock animal, and the second condition corresponds to a signal strength of the determined individual identification signal, wherein the signal strength of the determined individual identification signal is highest among signal strengths of the plurality of individual identification signals.

2. The livestock registration system according to claim 1, wherein the reception timing further corresponds to a second timing from a start of reception of the plurality of individual identification signals to satisfaction of a specific condition, and the second timing precedes a timing of the capture of the first image data.

3. The livestock registration system according to claim 1, wherein the reception timing further corresponds to a second timing from a start of reception of the plurality of individual identification signals to satisfaction of a specific condition, and the second timing follows a timing of the capture of the first image data.

4. The livestock registration system according to claim 1, wherein the reception timing corresponds to a second timing, the second timing corresponds to satisfaction of a specific condition, and the second timing further corresponds to a time period that includes an image capture timing of the first image data.

5. The livestock registration system according to claim 1, wherein the signal acquisition unit is further configured to acquire the plurality of individual identification signals transmitted from the plurality of transmission apparatuses attached to the plurality of livestock animals, each of the plurality of individual identification signals includes first information that corresponds to an amount of first electric power generated by a transmission apparatus attached to the target livestock animal, the first electric power corresponds to a surrounding environment of the target livestock animal, the first condition further corresponds to an environment condition under which the transmission apparatus attached to the target livestock animal generates the first electric power, and in the second condition, the first information corresponds to the amount of the first electric power generated under the environment condition.

6. The livestock registration system according to claim 5, wherein the plurality of individual identification signals has a pattern based on the amount of the first electric power, the first electric power is generated based on the surrounding environment, and in the second condition, the signal acquisition unit is further configured to receive the plurality of individual identification signals in a pattern based on the amount of the first electric power generated under the environment condition.

7. The livestock registration system according to claim 6, wherein each of the plurality of individual identification signals includes second information about an amount of second electric power generated by the transmission apparatus attached to the target livestock animal, the second electric power corresponds to radiated light that is associated with the target livestock animal, the first condition further corresponds to an irradiation condition of light that enables the transmission apparatus to generate the second electric power, and in the second condition, the second information corresponds to the amount of the second electric power generated under the irradiation condition of light.

8. The livestock registration system according to claim 1, further comprising:

an image capture unit configured to capture the image of the target livestock animal;

a signal reception unit configured to receive the plurality of individual identification signals; and a timing control unit configured to control reception timings of the plurality of individual identification signals, wherein the image capture unit is further configured to capture the image of the target livestock animal at the reception timing at which the first identifier is acquired.

9. The livestock registration system according to claim 8, wherein the signal reception unit is further configured to shift from a reception-blocked state to a reception-permitted state based on the acquired first image data.

10. The livestock registration system according to claim 8, wherein the timing control unit is further configured to enable the image capture unit to capture the image of the target livestock animal based on the determined individual identification signals.

11. The livestock registration system according to claim 1, further comprising a registration information storage unit configured to store the registered first identifier and the first image data as registration information.

12. The livestock registration system according to claim 11, further comprising an input information acquisition unit configured to acquire at least one of second image data or information associated with a second identifier, wherein at least one of the second image data or the second identifier corresponds to user input information;

a matching unit configured to match the input information against the registration information to generate a matching result; and an output unit configured to output the matching result.

13. The livestock registration system according to claim 12, further comprising a feature data extraction unit configured to extract feature data of at least one of the first image data included in the registration information or the second image data included in the input information, wherein the matching unit is further configured to match the second image data included in the input information with the first image data included in the registration information based on the input information that includes the second image data, and the feature data of the second image data included in the input information and the feature data of the first image data included in the registration information.

14. The livestock registration system according to claim 1, wherein the registration unit is further configured to register registration information, wherein the registration information is based on the physical feature of the target livestock animal at a time of the acquisition of the first image data and the registration information is registered in association with the image data.

15. The livestock registration system according to claim 1, wherein the image data acquisition unit is further configured to acquire a plurality of pieces of the first image data, wherein a photographing date and a photographing time of each of the plurality of pieces of the first image data is different, and the registration unit is further configured to register the photographing date and the photographing time of the plurality of pieces of the first image data in association with the plurality of pieces of the first image data.

16. A registration method for livestock, comprising:

acquiring, based on a first condition, image data obtained by capture of an image of a target livestock animal of a plurality of livestock animals;

acquiring a plurality of individual identification signals transmitted from a plurality of transmission apparatuses attached to the plurality of livestock animals, wherein the plurality of individual identification signals comprises a plurality of identifiers;

determining an individual identification signal of the plurality of individual identification signals, wherein the determined individual identification signal includes a specific identifier of the plurality of identifiers, and the determined individual identification signal satisfies a second condition associated with the first condition; and registering the specific identifier of the determined individual identification signal and the image data, wherein the specific identifier is registered in association with the image data, the specific identifier of the determined individual identification signal is acquired at a reception timing, the reception timing corresponds to a first timing of the capture of the image of the target livestock animal, the first condition corresponds to a distance of the capture of the target livestock animal, wherein the image of the target livestock animal includes a physical feature of the target livestock animal, and the second condition corresponds to a signal strength of the determined individual identification signal, wherein the signal strength of the determined individual identification signal is highest among signal strengths of the plurality of individual identification signals.

* * * * *